United States Patent
Lull et al.

(10) Patent No.: US 7,273,063 B2
(45) Date of Patent: *Sep. 25, 2007

(54) METHODS AND APPARATUS FOR PRESSURE COMPENSATION IN A MASS FLOW CONTROLLER

(75) Inventors: John Michael Lull, Claremont, CA (US); Chiun Wang, Cerritos, CA (US); Joseph A. Saggio, Jr., Anaheim Hills, CA (US)

(73) Assignee: Celerity, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/148,053

(22) Filed: Jun. 8, 2005

(65) Prior Publication Data

US 2005/0223813 A1    Oct. 13, 2005

Related U.S. Application Data

(62) Division of application No. 10/622,080, filed on Jul. 17, 2003.

(60) Provisional application No. 60/397,285, filed on Jul. 19, 2002.

(51) Int. Cl.
  *F17D 3/01* (2006.01)
  *G01F 1/00* (2006.01)

(52) U.S. Cl. .................. 137/12; 137/486; 137/487.5; 73/861

(58) Field of Classification Search .................. 73/861, 73/861.42, 861.52; 137/486, 487, 487.5, 137/488
See application file for complete search history.

(56) References Cited

U.S. PATENT DOCUMENTS 3,532,862 A    10/1970    Dahlin (Continued)

FOREIGN PATENT DOCUMENTS

EP    0 110 325 A1    6/1984

(Continued)

OTHER PUBLICATIONS

Tison, S.A., "Accurate Flow Measure in Vacuum Processing," Solid State Technology, Cowan Publ, Corp., Washington, US, vol. 39, No. 10, Oct. 1, 1996, pp. 73-74, 78, 80, 83.

(Continued)

*Primary Examiner*—Harshad Patel
(74) *Attorney, Agent, or Firm*—Lowrie, Lando & Anastasi, LLP.

(57) ABSTRACT

Performance of mass flow controller may be vulnerable to pressure transients in a flow path to which the controller is coupled for the purpose of controlling the fluid flow. A system and method are provided for reducing or eliminate performance degradations, instabilities, and/or inaccuracies of a mass flow controller caused by changes in the pressure environment. In particular, a method and system are provided for compensating for pressure transients in the pressure environment of a flow path and mass flow controller.

36 Claims, 20 Drawing Sheets

U.S. PATENT DOCUMENTS

| | | | |
|---|---|---|---|
| 3,671,725 A | 6/1972 | Bakke | |
| 3,786,492 A | 1/1974 | Carleton | |
| 4,253,480 A | 3/1981 | Kessel et al. | |
| 4,434,933 A | 3/1984 | Tamura | |
| 4,658,855 A | 4/1987 | Doyle | |
| 4,672,997 A | 6/1987 | Landis et al. | |
| 4,679,585 A | 7/1987 | Ewing | |
| 4,877,051 A | 10/1989 | Day | |
| 4,928,048 A | 5/1990 | Doyle | |
| 4,938,658 A | 7/1990 | Blotenberg | |
| 4,947,889 A | 8/1990 | Ishikawa et al. | |
| 5,048,332 A | 9/1991 | Ishikawa et al. | |
| 5,062,446 A | 11/1991 | Anderson | |
| 5,100,100 A | 3/1992 | Benson et al. | |
| 5,107,441 A | 4/1992 | Decker | |
| 5,129,418 A | 7/1992 | Shimomura et al. | |
| 5,141,021 A | 8/1992 | Shimomura et al. | |
| 5,158,263 A | 10/1992 | Shimizu et al. | |
| 5,222,417 A | 6/1993 | Sato | |
| 5,249,117 A | 9/1993 | Greenough et al. | |
| 5,279,154 A | 1/1994 | Vavra et al. | |
| 5,357,811 A | 10/1994 | Hoang | |
| 5,394,755 A | 3/1995 | Sudo et al. | |
| 5,441,076 A | 8/1995 | Moriya et al. | |
| 5,445,035 A | 8/1995 | Delajoud | |
| 5,524,084 A | 6/1996 | Wang et al. | |
| 5,605,178 A | 2/1997 | Jennins | |
| 5,660,207 A | 8/1997 | Mudd | |
| 5,662,143 A | 9/1997 | Caughran | |
| 5,669,408 A | 9/1997 | Nishino et al. | |
| 5,684,245 A | 11/1997 | Hinkle | |
| 5,765,283 A | 6/1998 | Mudd | |
| 5,791,369 A | 8/1998 | Nishino et al. | |
| 5,816,285 A | 10/1998 | Ohmi et al. | |
| 5,850,850 A | 12/1998 | Mudd | |
| 5,865,205 A | 2/1999 | Wilmer | |
| 5,868,159 A | 2/1999 | Loan et al. | |
| 5,878,765 A | 3/1999 | Lange | |
| 5,911,238 A | 6/1999 | Bump et al. | |
| 5,944,048 A | 8/1999 | Bump et al. | |
| 5,950,668 A | 9/1999 | Baumann | |
| 5,975,126 A | 11/1999 | Bump et al. | |
| 5,988,217 A | 11/1999 | Ohmi et al. | |
| 6,044,701 A | 4/2000 | Doyle et al. | |
| 6,074,691 A | 6/2000 | Schmitt et al. | |
| 6,119,710 A | 9/2000 | Brown | |
| 6,128,541 A | 10/2000 | Junk | |
| 6,138,708 A | 10/2000 | Waldbusser | |
| 6,142,163 A | 11/2000 | McMillin et al. | |
| 6,152,168 A | 11/2000 | Ohmi et al. | |
| 6,155,283 A | 12/2000 | Hansen et al. | |
| 6,158,679 A | 12/2000 | Ohmi et al. | |
| 6,178,995 B1 | 1/2001 | Ohmi et al. | |
| 6,216,726 B1 | 4/2001 | Brown et al. | |
| 6,217,506 B1 | 4/2001 | Phillips et al. | |
| 6,289,923 B1 | 9/2001 | Ohmi et al. | |
| 6,302,130 B1 | 10/2001 | Ohmi et al. | |
| 6,314,992 B1 | 11/2001 | Ohmi et al. | |
| 6,343,617 B1 | 2/2002 | Tinsley et al. | |
| 6,389,364 B1 | 5/2002 | Vyers | |
| 6,404,612 B1 | 6/2002 | Pattantyus | |
| 6,445,980 B1 | 9/2002 | Vyers | |
| 6,449,571 B1 | 9/2002 | Tarig et al. | |
| 6,450,190 B2 | 9/2002 | Ohmi et al. | |
| 6,561,218 B2 | 5/2003 | Mudd | |
| 6,601,005 B1 | 7/2003 | Eryurek et al. | |
| 6,631,334 B2 | 10/2003 | Grosshart | |
| 6,640,822 B2 | 11/2003 | Tinsley et al. | |
| 6,712,084 B2 | 3/2004 | Shajii et al. | |
| 6,810,308 B2 | 10/2004 | Shajii et al. | |
| 6,868,862 B2 | 3/2005 | Shajii et al. | |
| 2002/0198668 A1 | 12/2002 | Lull | |
| 2003/0234045 A1 | 12/2003 | Shajii et al. | |
| 2003/0234046 A1 | 12/2003 | Shajii et al. | |
| 2003/0234047 A1 | 12/2003 | Shajii et al. | |
| 2003/0234048 A1 | 12/2003 | Shajii et al. | |
| 2003/0236638 A1 | 12/2003 | Shajii et al. | |
| 2003/0236643 A1 | 12/2003 | Shajii et al. | |
| 2004/0074311 A1 | 4/2004 | Lull et al. | |
| 2004/0204885 A1 | 10/2004 | Wang | |
| 2004/0256003 A1 | 12/2004 | Shajii et al. | |
| 2005/0000570 A1 | 1/2005 | Mohammed et al. | |

FOREIGN PATENT DOCUMENTS

| | | |
|---|---|---|
| EP | 0 281 947 A2 | 9/1988 |
| EP | 0 834 723 A1 | 4/1998 |
| EP | 0 890 828 A1 | 1/1999 |
| WO | WO97/11297 A1 | 3/1997 |
| WO | WO 01/04580 A2 | 1/2001 |
| WO | WO 01/04582 A1 | 1/2001 |
| WO | WO 01/04715 A1 | 1/2001 |
| WO | WO 01/04716 A1 | 1/2001 |
| WO | WO 01/04717 A1 | 1/2001 |
| WO | WO 01/04923 A1 | 1/2001 |
| WO | WO 02/086632 A | 10/2002 |

OTHER PUBLICATIONS

PCT International Search Report mailed Jun. 4, 2004 (citing references 5,524,084, 5,062,446; EP 0 834,723, 6,138,708, 6,155,283, 5,249,117, 6,128,541, 6,217,506, 6,389,364, 4,928,048, 3,671,725, 4,938,658, WO 02/086632).

PCT Partial Search Report (citing referenced EP 0 834,723, 6,155,283, EP 0 890,828, Tison-"Accurate Flow Measure in Vacuum Processing").

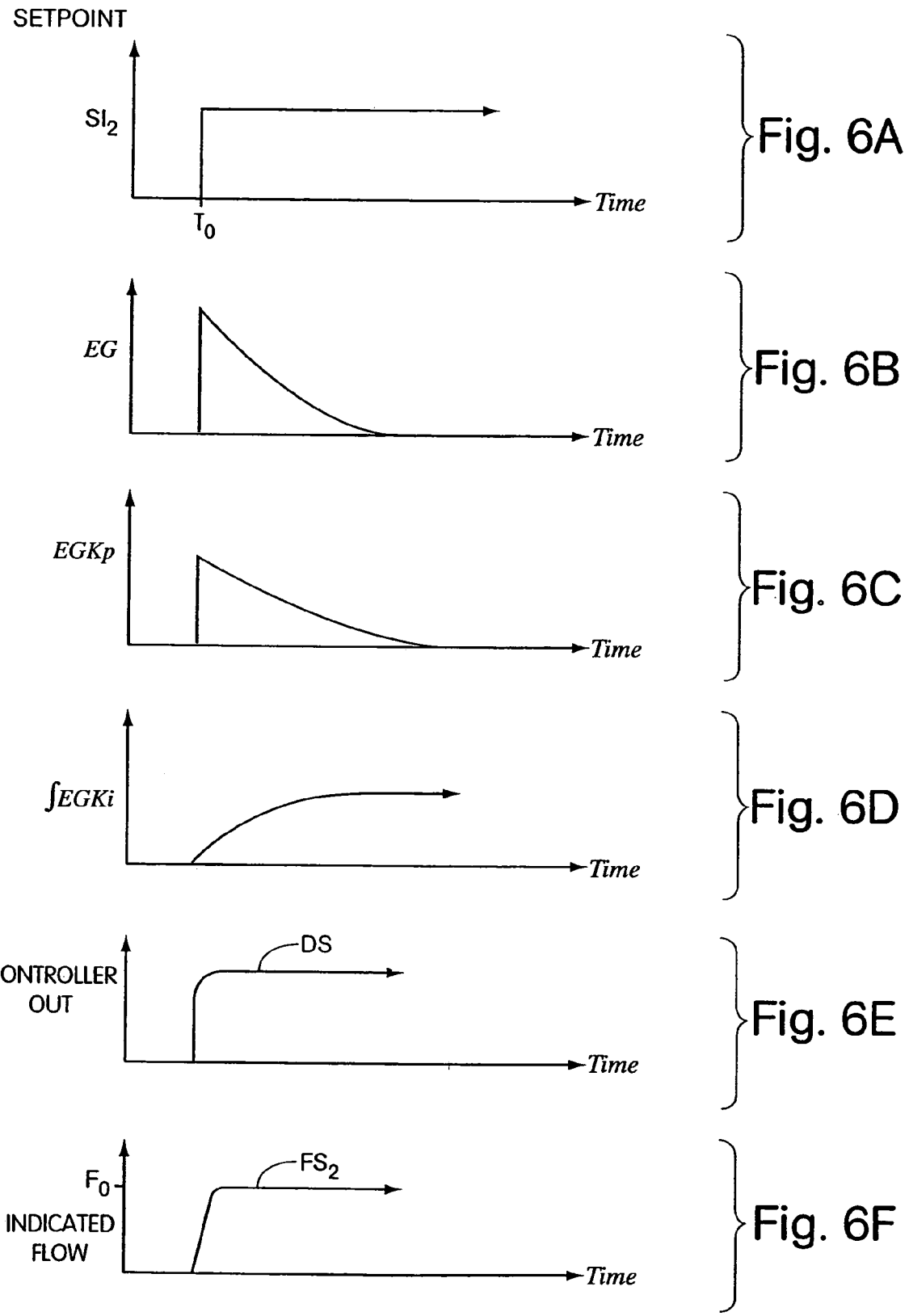

METHODS AND APPARATUS FOR PRESSURE COMPENSATION IN A MASS FLOW CONTROLLER

RELATED APPLICATIONS

This application is a divisional of U.S. application Ser. No. 10/622,080, entitled "METHODS AND APPARATUS FOR PRESSURE COMPENSATION IN A MASS FLOW CONTROLLER," filed on Jul. 17, 2003, now allowed, which claims benefit under U.S.C. § 119(e) of U.S. Provisional Application Ser. No. 60/397,285, entitled "METHODS AND APPARATUS FOR PRESSURE COMPENSATION IN A MASS FLOW CONTROLLER," filed on Jul. 19, 2002. Each of these applications is herein incorporated by reference in its entirety.

FIELD OF THE INVENTION

The present invention relates generally to a method and system for controlling the flow rate of a fluid, and more particularly to methods and systems involving mass flow controllers.

BACKGROUND OF THE INVENTION

Many industrial processes require precise control of various process fluids. For example, in the pharmaceutical and semiconductor industries, mass flow controllers are used to precisely measure and control the amount of a process fluid that is introduced to a process chamber. The term fluid is used herein to describe any type of matter in any state that is capable of flow. It is to be understood that the term fluid applies to liquids, gases, and slurries comprising any combination of matter or substance to which controlled flow may be of interest.

Conventional mass flow controllers generally include four main portions: a flow meter, a control valve, a valve actuator, and a controller. The flow meter measures the mass flow rate of a fluid in a flow path and provides a signal indicative of that flow rate. The flow meter may include a mass flow sensor and a bypass. The mass flow sensor measures the mass flow rate of fluid in a sensor conduit that is fluidly coupled to the bypass. The mass flow rate of fluid in the sensor conduit is approximately proportional to the mass flow rate of fluid flowing in the bypass, with the sum of the two being the total flow rate through the flow path controlled by the mass flow controller. However, it should be appreciated that some mass flow controllers may not employ a bypass, as such, all of the fluid may flow through the sensor conduit.

In many mass flow controllers, a thermal mass flow sensor is used that includes a pair of resistors that are wound about the sensor conduit at spaced apart positions, each having a resistance that varies with temperature. As fluid flows through the sensor conduit, heat is carried from the upstream resistor toward the downstream resistor, with the temperature difference being proportional to the mass flow rate of the fluid flowing through the sensor conduit and the bypass.

A control valve is positioned in the main fluid flow path (typically downstream of the bypass and mass flow sensor) and can be controlled (e.g., opened or closed) to vary the mass flow rate of fluid flowing through the main fluid flow path, the control being provided by the mass flow controller. The valve is typically controlled by a valve actuator, examples of which include solenoid actuators, piezoelectric actuators, stepper actuators, etc.

Control electronics control the position of the control valve based upon a set point indicative of the mass flow rate of fluid that is desired to be provided by the mass flow controller, and a flow signal from the mass flow sensor indicative of the actual mass flow rate of the fluid flowing in the sensor conduit. Traditional feedback control methods such as proportional control, integral control, proportional-integral (PI) control, derivative control, proportional-derivative (PD) control, integral-derivative (ID) control, and proportional-integral-derivative (PID) control are then used to control the flow of fluid in the mass flow controller. In each of the aforementioned feedback control methods, a control signal (e.g., a control valve drive signal) is generated based upon an error signal that is the difference between a set point signal indicative of the desired mass flow rate of the fluid and a feedback signal that is related to the actual mass flow rate sensed by the mass flow sensor.

Many conventional mass flow controllers are sensitive to component behavior that may be dependent upon any of a number of operating conditions including fluid species, flow rate, inlet and/or outlet pressure, temperature, etc. In addition, conventional mass flow controllers may exhibit certain non-uniformities particular to a combination of components used in the production of the mass flow controller which results in inconsistent and undesirable performance of the mass flow controller.

To combat some of these problems, a mass flow controller may be tuned and/or calibrated during production. Production generally includes operating the mass flow controller on a test fluid under a set of operating conditions and tuning and/or calibrating the mass flow controller so that it exhibits satisfactory behavior.

As is known to those skilled in the art, the process of tuning and/or calibrating a mass flow controller is an expensive, labor intensive procedure, often requiring one or more skilled operators and specialized equipment. For example, the mass flow sensor portion of the mass flow controller may be tuned by running known amounts of a known fluid through the sensor portion and adjusting certain filters or components to provide an appropriate response. A bypass may then be mounted to the sensor, and the bypass is tuned with the known fluid to reflect an appropriate percentage of the known fluid flowing in the main fluid flow path at various known flow rates. The mass flow sensor portion and bypass may then be mated to the control valve and control electronics portions and then tuned again, under known conditions.

When the type of fluid used by an end-user differs from that used in tuning and/or calibration, or when the operating conditions, such as inlet and outlet pressure, temperature, range of flow rates, etc., used by the end-user differ from that used in tuning and/or calibration, the operation of the mass flow controller is generally degraded. For this reason, additional fluids (termed "surrogate fluids") and or operating conditions are often tuned or calibrated, with any changes necessary to provide a satisfactory response being stored in a lookup table.

Although the use of additional tuning and/or calibration with different fluids and at different operating conditions can be used to improve the performance of the mass flow controller, this type of surrogate tuning and/or calibration is time consuming and expensive, as the tuning and/or calibration procedures must be repeated for at least each surrogate fluid and likely must be repeated for a number of different operating conditions with each surrogate fluid. Furthermore, because the surrogate fluids only approximate the behavior of the various types of fluids that may be used by the end-user, the actual operation of the mass flow controller at an end-user site may differ substantially from that during tuning and/or calibration. Considering the wide range of industries and applications employing mass flow controllers, the process fluid and operating conditions applied to the mass flow controller by an end user are likely to be different than the test fluids and operating conditions upon which a mass flow controller was tuned and/or calibrated, despite tuning and/or calibration of the mass flow controller with a number of different surrogate fluids and operating conditions. Therefore, an apparatus is needed, that is insensitive to operating conditions and does not require as much calibration and/or tuning.

A flow path to which a mass flow controller is coupled to control fluid flow may include a portion where the flow meter senses flow, the portion having a bypass and a sensor conduit as described in the foregoing. The flow path is often provided with a pressure regulator to control the pressure at the inlet side of the flow path. Typically, the pressure regulator is provided upstream of the portion of the flow path to which the flow meter is coupled.

The pressure regulator maintains a desired inlet pressure of the flow path. Pressure regulators generally do not operate error free and may introduce pressure transients, or other deviations from the desired pressure into the flow path. These deviations may have deleterious effects on the performance of the mass flow controller. Often the mass flow controller must absorb these undesirable pressure transients as best as possible, and these undesirable transients typically degrade the accuracy of control and quality of performance of the mass flow controller.

SUMMARY OF THE INVENTION

One aspect of the present invention includes a method in a flow controller including a flow sensor coupled to a fluid flow path having an inlet side and an outlet side, the flow sensor being adapted to provide a sensor output signal indicative of a sensed fluid flow through the flow path, a method comprising acts of measuring at least one pressure of the flow path, and adjusting the sensor output signal based on the act of measuring the at least one pressure. According to one embodiment, the method further comprises an act of forming at least one pressure signal based on the at least one pressure. According to one embodiment, the method further comprises an act of filtering the at least one pressure signal to provide a false flow signal that emulates a response of the flow sensor due to pressure changes in the flow path. According to one embodiment, the method further comprises an act of adjusting the sensor output includes an act of subtracting the false flow signal from the sensor output signal.

Another aspect of the present invention includes a method of modifying a sensor output signal from a flow sensor, the method comprising acts of constructing a false flow signal corresponding to a response of the flow sensor due to changes in pressure based on at least one pressure measurement of the flow path, and subtracting the false flow signal from the sensor output signal. According to one embodiment, the method further comprises an act of providing a pressure signal indicative of the at least one pressure measurement. According to one embodiment, the method further comprises the act of constructing a false flow signal includes an act of delaying the pressure signal such that it is substantially aligned in time with the sensor output signal. According to one embodiment, the method further comprises the act of constructing the false flow signal includes an act of differentiating the pressure signal. According to one embodiment, the method further comprises an act of constructing the false flow signal includes an act of filtering the pressure signal with at least one filter, the at least one filter having a transfer function that emulates a response of the flow sensor to the pressure change in the flow path. According to one embodiment, the at least one filter includes a plurality of $2^{nd}$-order filters connected in series, and an output from each of the plurality of $2^{nd}$-order filters are scaled and summed to provide the false flow signal.

One aspect of the present invention includes a method of removing false flow information from a sensor output signal provided by a flow sensor coupled to a flow path, the false flow information resulting from the flow sensor responding to flow changes caused by pressure transients. The method comprises acts of measuring at least one pressure in the flow path, providing at least one pressure signal indicative of the at least one pressure measurement, constructing a false flow signal from the at least one pressure signal, and subtracting the false flow signal from the sensor output signal to provide a flow signal indicative of the fluid flow in the fluid path.

One aspect of the present invention includes a method of dead volume compensation, the method comprising acts of predicting a response of a sensor to a fluid filling a dead volume due to pressure changes in a fluid flow path, and modifying a sensor output signal provided by the sensor based on the predicted response to essentially remove false flow information from the sensor output signal.

Another aspect of the present invention includes a method of determining a flow rate of a fluid flowing in a conduit, comprising acts of a) sensing a flow rate of the fluid flowing in the conduit, b) measuring a change in pressure of the fluid flowing in the conduit, c) determining an effect of the change in pressure on the flow rate of the fluid sensed by act (a), and modifying the sensed flow rate of the fluid based upon the effect of the change in pressure to determine the flow rate of the fluid flowing in the conduit.

Yet another aspect of the present invention relates to a flow meter comprising a flow sensor adapted to measure fluid flow in a flow path, the flow sensor providing a sensor output signal in response to sensed fluid flow in the flow path, at least one pressure transducer to measure at least one pressure in the flow path, the at least one pressure transducer providing at least one pressure signal related to the respective at least one measured pressure, a compensation filter to receive the at least one pressure signal, the compensation filter adapted to construct a false flow signal approximating a response of the flow sensor to pressure transients in the flow path, and a subtractor to receive the sensor output signal and the false flow signal and to provide a flow signal related to the difference between the sensor output signal and the false flow signal. According to one embodiment of the present invention, the compensation filter includes a delay block that delays the at least one pressure signal to be substantially aligned in time with the response of the flow sensor to pressure transients, and wherein the delay block provides at least one delayed pressure signal. According to one embodiment of the present invention, the compensation filter includes a differentiator to receive the delayed pressure signal, the differentiator being adapted to determine a derivative of the delayed pressure signal to provide a derivative signal.

Another aspect of the present invention relates to a compensation filter for generating a false flow signal from a pressure signal, the compensation filter comprising a differentiator receiving a pressure signal indicative of a pressure in a fluid path, the differentiator being adapted to determine a derivative of the pressure signal to provide a derivative signal, and at least one filter having a transfer function adapted to transform the derivative signal into a false flow signal indicative of false flow information generated by the flow sensor in response to pressure transients.

One aspect of the present invention relates to a method of compensating for fluid pressure induced changes in the position of the controlled portion of a valve, the method comprising acts of measuring at least one pressure in a valve environment, providing at least one pressure signal indicative of the at least one pressure measurement, respectively, calculating a displacement of the controlled portion of the valve based on the at least one pressure signal, and generating a compensation drive level to move the controlled portion of the valve an amount having an opposite sign of and substantially equal in magnitude to the calculated displacement.

Another aspect of the present invention includes a method of preventing the movement of the controlled portion of the a valve due to pressure transients, the method comprising acts of predicting a displacement a pressure transient will force the controlled portion of a valve to move based on at least one pressure measurement of a valve environment, and moving the controlled portion of the valve to counter-act the predicted displacement.

One aspect of the present invention includes an apparatus coupled to a flow path, the apparatus comprises a pressure measurement device to measure at least one pressure in a flow path environment and to provide at least one pressure signal indicative of the at least one measured pressure, and displacement compensation means for receiving the at least one pressure signal and for providing a displacement compensation signal indicating a drive level to compensate for valve displacement of a valve coupled to the flow path caused by pressure changes in the flow path environment.

According to one embodiment, the displacement compensation means comprises means for calculating the displacement compensation signal based on a force valve model. According to another embodiment, the force valve model includes a magnetic model of the valve. According to one embodiment, the force valve model has a parameter that indicates a pressure gradient in the valve environment.

According to one aspect of the invention, a flow meter is provided comprising a flow sensor adapted to sense fluid flow in a fluid flow path and to provide a sensor output signal indicative of the sensed fluid flow, at least one pressure transducer adapted to measure at least one pressure in a fluid flow path environment and to provide at least one pressure signal indicative of the at least one measured pressure, and a compensation filter to receive the at least one pressure signal and to construct a false flow signal related to the at least one pressure signal.

According to one embodiment, the false flow signal is constructed to recreate false flow information resulting from the flow sensor response to flow fluctuations caused by pressure transients in the flow path. According to another embodiment, the compensation filter includes a transfer function that emulates a response of the flow sensor to pressure transients in the flow path. According to one embodiment, the false flow signal is subtracted from the sensor output signal to provide a flow signal. According to another aspect of the invention, in a mass flow controller coupled to a flow path, the mass flow controller having a control loop including a flow meter, a controller, a valve actuator and a valve, a method is provided comprising acts of measuring at least one pressure in a fluid path environment, providing at least one pressure signal indicating at least one pressure measurement, determining at least one compensation signal based on at least one pressure measurement, and applying the at least one compensation signal to the control loop of the mass flow controller.

According to one embodiment, the method further comprises an act of determining at least one compensation filter includes constructing a false flow signal to recreate false flow information resulting from a response of the flow meters to pressure transients in the flow path environment. According to another embodiment, the method further comprises an act of applying the at least one compensation signal to the control loop includes an act of applying the false flow signal to the control loop to compensate for the flow meters response fluctuations in fluid flow due to pressure transients in the flow path. According to a further embodiment, the method further comprises an act of determining the at least one compensation signal includes determining a displacement compensation signal indicative to a drive level to compensate for a valve displacement due to pressure transients. According to one embodiment, the method further comprises an act of determining the at least one compensation signal includes determining a false flow signal and a displacement compensation signal.

According to yet another aspect of the invention, a mass flow controller is provided comprising a flow meter adapted to sense fluid flow in a fluid flow path and provide a flow signal indicative of the mass flow rate in the flow path, a controller coupled to the flow meter and adapted to provide a drive signal based at least in part on the flow signal, a valve actuator adapted to receive the drive signal from the controller, a valve adapted to be controlled by the valve actuator and coupled to the fluid flow path, at least one pressure transducer to measure at least one pressure in a mass flow controller environment and to provide at least one pressure signal indicative of measurement of the at least one pressure, and at least one compensation means to receive at least one pressure signal and to provide at least one compensation signal to the control loop to compensate for effects of a pressure changes in the mass flow controller environment, wherein the control loop of the mass flow controller includes the flow meter, the controller, the valve actuator, and the valve.

According to one embodiment, the at least one transducer measures an inlet pressure of the flow path and provides an inlet pressure signal. According to one embodiment, the at least one compensation means includes a compensation filter to receive the inlet pressure signal and to construct a false flow signal from the inlet pressure signal. According to another embodiment, the flow meter includes a flow sensor adapted to sense fluid flow in the flow path and adapted to provide a sensor output signal indicative of the sensed fluid flow. According to another embodiment, the compensation filter has a transfer function that emulates the response of the flow sensor to fluid flow resulting from changes in inlet pressure.

According to another embodiment, the false flow signal is constructed to recreate a false flow information component of the sensor output signal resulting from changes in inlet pressure. According to one embodiment, the flow signal is determined by subtracting the false flow signal from the sensor output signal. According to one embodiment, the compensation means includes displacement compensation means that receives the inlet pressure signal and provides a displacement compensation signal indicative of a drive level to maintain a controlled portion of the valve substantially motionless in a pressure environment of the valve. According to one embodiment, the displacement compensation signal is added to the drive signal to compensate for valve displacement resulting from pressure gradients in the pressure environment of the valve. According to one embodiment, the displacement compensation signal is based in part on a force model of the valve. According to one embodiment, the force model of the valve includes a magnetic model of the valve.

According to one embodiment, the force model of the valve includes a parameter for at least one pressure drop across the valve. According to one embodiment, the compensation means includes a compensation filter receiving at least one pressure signal and providing a false flow signal constructed to recreate false flow information resulting from the flow meter responding to pressure transients and displacement compensation means to receive at least one pressure signal and to provide a displacement compensation signal indicative of a drive level to compensate for valve displacement caused by a pressure change.

One aspect of the present invention includes a method of configuring a mass flow controller for operation with process operating conditions that differ at least in part from test operating conditions used during production of the mass flow controller, the method comprises acts of establishing a response of the mass flow controller with the test operating conditions, and modifying at least one control parameter of the mass flow controller based on the process operating conditions such that the response of the mass flow controller operating with the process operating conditions does not substantially change.

According to one embodiment, the method further comprises the act of modifying the at least one control parameter includes an act of determining a plurality of process gain terms associated with a plurality of components of the mass flow controller based on the process operating conditions, the plurality of components forming a control loop of the mass flow controller. According to one embodiment, the method further comprises the act of determining the plurality of process gain terms includes an act of determining a process reciprocal gain term formed by taking a reciprocal of a product of the plurality of process gain terms, the process reciprocal gain term being a function of at least one variable operating condition. According to one embodiment, the method further comprises at least one variable operating condition includes at least one pressure in the mass flow controller environment. According to one embodiment, the method further comprises at least one variable operating condition includes an inlet pressure. According to one embodiment, the method further comprises at least one variable operating condition includes a set point.

One aspect of the present invention includes a computer readable medium encoded with a program for execution on a processor, the program, when executed on the processor performing a method of configuring a mass flow controller for operation with a set of process operating conditions that differ at least in part from a set of test operating conditions used to establish a response of the mass flow controller during production, the method comprises acts of receiving as an input at least one of process fluid species information and process operating conditions, and modifying at least one control parameter of the mass flow controller based on the input such that the response of the mass flow controller does not substantially change when operated with the process operating conditions.

According to one embodiment, that act of modifying the at least one control parameter includes an act of determining a plurality of process gain terms associated with a plurality of components of the mass flow controller operating with the process operating conditions, the plurality of components forming a control loop of the mass flow controller. According to one embodiment, the act of determining the plurality of gain terms includes an act of determining a process reciprocal gain term formed by taking a reciprocal of a product of the plurality of gain terms, the process reciprocal gain term being a function of at least one variable operating condition. According to one embodiment, the at least one variable operating condition includes at least one pressure in the mass flow controller environment. According to one embodiment, the at least one variable operating condition includes an inlet pressure. According to one embodiment, at least one variable operating condition includes a set point.

In another aspect of the invention, a mass flow controller is provided having a control loop. The mass flow controller comprises a flow meter adapted to sense fluid flow in a fluid flow path and provide a flow signal indicative of the mass flow rate in the flow path, a controller coupled to the flow meter and adapted to provide a drive signal based at least in part on the flow signal, a valve actuator adapted to receive the drive signal from the controller, a valve adapted to be controlled by the valve actuator and coupled to the fluid flow path, wherein the control loop of the mass flow controller includes the flow meter, the controller, the valve actuator, and the valve, and wherein the control loop is adapted to have a substantially constant control loop gain term with respect to at least one variable operating condition during operation.

According to one embodiment, the at least one variable operating condition includes at least one pressure in the mass flow controller environment. According to one embodiment, the at least one variable operating condition includes an inlet pressure. According to one embodiment, the at least one variable operating condition includes a set point.

According to another aspect of the invention, a compensation filter is provided for generating a false flow signal from a pressure signal. The compensation filter comprises a plurality of filters, at least two of which are connected in series, and wherein a respective output of each of the at least two filters are scaled and summed. In one embodiment of the invention, the compensation filter further comprises a differentiator that is adapted to differentiate the pressure signal, and which provides a differentiated signal to the plurality of filters. According to another embodiment, the compensation filter further comprises a delay that delays the pressure signal, and which provides a delayed pressure signal to the plurality of filters.

BRIEF DESCRIPTION OF THE DRAWINGS

In the drawings:

FIGS. 6a–6f illustrate signal waveforms of a number of the signals shown in FIG. 4;

DETAILED DESCRIPTION OF THE INVENTION

Figure 1:
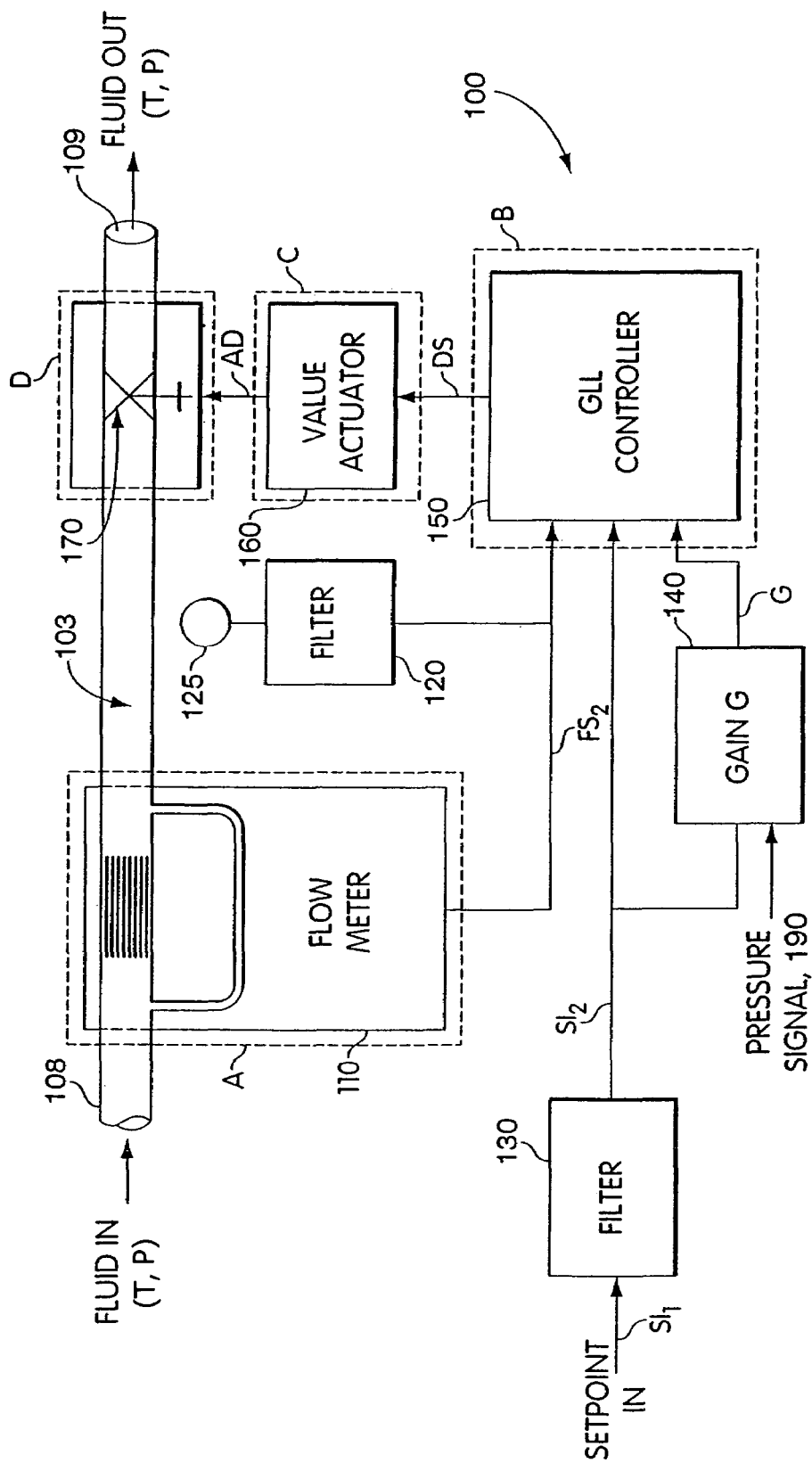
FIG. 1 illustrates a schematic block diagram of an example mass flow controller with which various aspects of the present invention may be implemented.

This application contains subject matter that is related to U.S. patent application Ser. No. 10/131,603, entitled SYSTEM AND METHOD FOR A MASS FLOW CONTROLLER, filed Apr. 24, 2002, which is herein incorporated by reference in its entirety.

Typically a fluid flow path exists in a pressure environment. The pressure environment may include the pressure at the inlet side of the flow path (referred to as inlet pressure), and pressure at the outlet side of the valve (referred to as outlet pressure), and other pressures within the environment. For example, the pressure environment of the flow path may also include pressure differentials such as, for example, the pressure drop across a bypass or across a valve. The pressure environment may also include various pressure transients including pulses introduced by a regulator, turbulence caused by the geometry of a flow sensor, or various other pressure perturbations. However, the pressure environment is not often monitored. As such, performance of mass flow controller may be vulnerable to pressure transients in a flow path to which the controller is coupled for the purpose of controlling the fluid flow.

According to one aspect of the present invention, Applicants have recognized that measurements of the pressure environment of a flow path may be used to reduce or eliminate performance degradations, instabilities, and/or inaccuracies of a mass flow controller caused by changes in the pressure environment. As such, Applicants have developed various methods for compensating for pressure transients in the pressure environment of a flow path and mass flow controller. As discussed in the foregoing, a mass flow controller typically includes a flow meter that senses the fluid flow in a fluid flow path. The flow rate sensed by the flow meter is often part of a feedback control loop that controls the flow rate of a fluid being provided to a process (e.g., a semiconductor fabrication process) at the outlet side of the flow path.

In many cases, the actual flow rate provided to the process must be accurately controlled. However, the pressure transients may cause local fluctuations in the fluid flow that are sensed by the flow meter. These local fluctuations may not be an accurate indication of the actual flow rate being provided to the process. This false flow information is then provided to the control loop of a mass flow controller. The controller may then adjust the flow rate provided to the process in response to the false flow information. As such, the controller may momentarily lose control of the process and/or provide undesired flow rates to the process.

As used herein, the term false flow refers to fluid flow that does not correspond to the actual flow provided to a process. For example, local variations or fluctuations in fluid flow that are not substantially experienced at the outlet side of a flow path is considered false flow. As such, false flow information generally describes an indication of flow that does not correspond to the flow rate being provided to a process.

According to one embodiment of the invention, it is appreciated that may be advantageous to measure the pressure of the flow path (e.g., the inlet pressure) and provide a control system that incorporates this information. More particularly, to reduce the performance degradation due to pressure transients, it may be desirable to measure the pressure in the flow path and adjust control parameters of a mass flow controller in response to the changes in pressure.

One embodiment of the present invention includes measuring the inlet pressure of a flow path and providing the inlet pressure measurement to the mass flow controller. For instance, a pressure transducer may be coupled to the flow path to provide a pressure signal indicative of the inlet pressure of the flow path.

Applicants have recognized and appreciated that by providing a pressure signal to a mass flow controller, various deficiencies in the conventional operation of the mass flow controller can be addressed. Accordingly, applicants have identified various methods of utilizing a pressure signal to improve the performance and accuracy of a mass flow controller. One method according to one embodiment of the present invention includes compensating for spurious flow signals that may occur due to pressure transients in a fluid path coupled to a mass flow controller.

One problem associated with pressure transients in a flow path that may have deleterious effects on a mass flow controller is described below. When the pressure in a flow path changes, fluid accelerates down the pressure gradient in order to fill the volume, referred to as dead volume, created by the change in pressure. A sensor of a flow meter may register an increase in fluid flow due to this local acceleration of the fluid into the dead volume. However, this is considered a false flow of fluid because this flow is not indicative of the flow being provided to the process. As such, the sensor output signal from the sensor carries false flow information that is propagated to the control loop of the mass flow controller. As discussed above, this false flow information may have undesirable consequences with respect to the accuracy and performance of the mass flow controller.

Figure 12A:
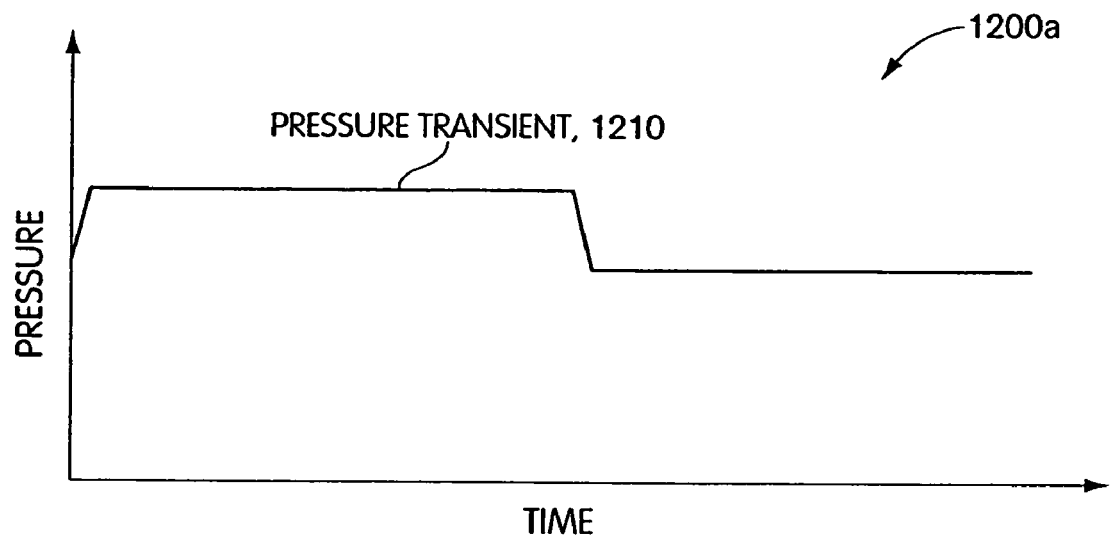
FIG. 12A illustrates a case in which a pressure transient in the shape of a pressure pulse is introduced at an inlet side of a flow path.
Figure 12B:
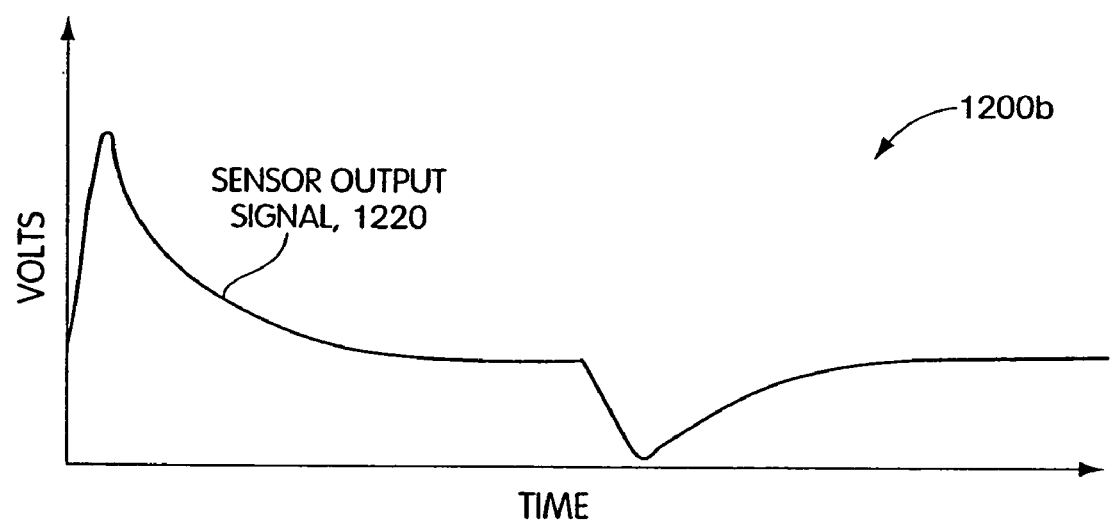
FIG. 12B shows a sensor output as a function of time resulting from the pressure transient shown in FIG. 12A.

FIG. 12A illustrates a case in which a pressure transient in the shape of a pressure pulse is introduced at an inlet side of a flow path. Graph 1200a shows a plot of a pressure pulse 1210 as a function of time. Pressure pulse 1210 is introduced to the inlet side of the flow path. As a result, the flow sensor responds with sensor output signal 1220 as shown in graph 1200b of FIG. 12B. Assuming that the actual flow (i.e., the flow being delivered to the process) of the flow path has not changed, the spike in the sensor output signal contains a large false flow component with respect to the actual flow. As such, the mass flow controller reacts to the flow spike accordingly and may momentarily lose control of the process.

According to one embodiment of the present invention, applicants have recognized that pressure measurements in the flow path may be utilized to anticipate false flow indications and compensate for the negative impact they may incur on a mass flow controller. One embodiment of the present invention includes a method for controlling flow including measuring the pressure in a fluid flow path and adjusting an output signal provided by a flow sensor coupled to the flow path based on the pressure measurements.

By analyzing a flow sensor's response fluid flow fluctuations caused by pressure transients, Applicants have developed methods for generating a false flow signal that recreates the false flow component of a flow signal provided by a flow sensor in response to a pressure transient. This generated false flow signal may be used by a system to compensate for the spike in flow sensor output. For instance, this signal may be used by a compensator to reduce induced value drive motion resulting from the spike in output.

FIGS. 11A–D illustrate one embodiment of the invention for generating a false flow signal from a pressure signal indicative of the pressure measured in a fluid flow path. The false flow signal can then be subtracted from the flow signal provided by the flow sensor to produce an indicated flow signal that does not include the false flow information. As such, the false flow information is prevented from causing the controller to respond erroneously (e.g., by providing unwanted flow to the process).

Figure 11A:
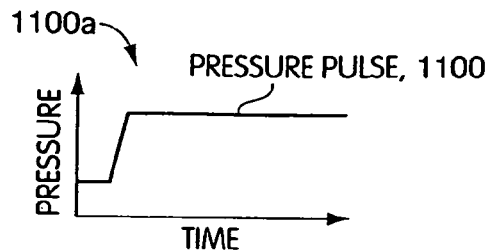
FIG. 11A is a graph of a pressure pulse introduced at an inlet side of a flow path as a function of time.
Figure 11B:
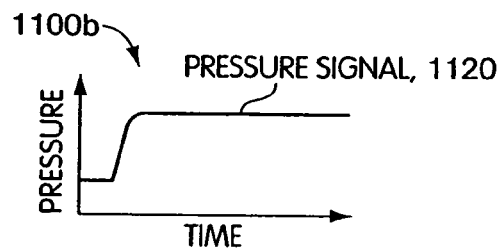
FIG. 11B is a graph of a pressure signal resulting from the pressure pulse shown in FIG. 11A.

Graph 1100a shown in FIG. 11A illustrates a pressure transient, and in particular, a pressure pulse 1110, that a flow path may experience during operation. Graph 1100b of FIG. 11B shows a pressure signal 1120 resulting from pressure pulse 1110. The pressure signal may be measured by a pressure measurement device (e.g., a pressure transducer) coupled to the flow path and adapted to measure the pressure at some portion of the flow path.

Figure 11C:
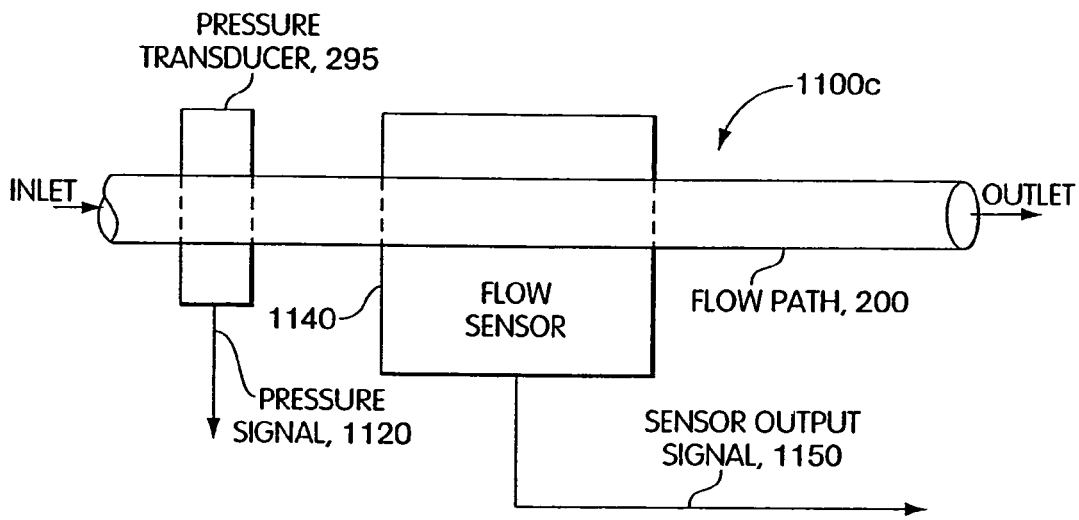
FIG. 11C illustrates a flow path having a pressure tranducer to detect pressure changes according to one embodiment of the invention.

FIG. 11C shows a system 1100c having a flow path 200 with a flow sensor 1140 being coupled to flow path 200 to sense fluid flow in flow path 200. As shown, pressure pulse 1100 is introduced to the flow path 200 (e.g. by non-ideal performance of an upstream regulator) at the inlet of flow path 200. Pressure pulse 1100 may cause a local fluctuation in the fluid flow sensed by flow sensor 1140. Flow sensor 1140, in turn, produces a sensor output signal 1150 that is corrupted with false flow information.

Figure 11D:
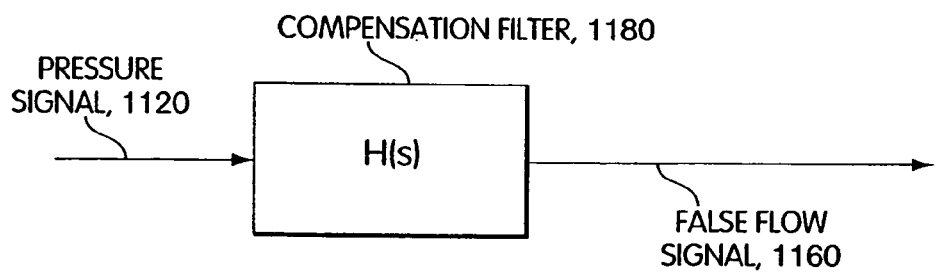
FIG. 11D shows a compensation filter that compensates for false flow information according to one embodiment of the invention.

According to one aspect of the present invention, a compensation filter is provided that compensates for the false flow information. In one embodiment of the invention, as shown in FIG. 11D, a compensation filter 1180 is provided that receives the pressure signal 1120 produced by transducer 295 and produces a false flow signal 1160. Because filter 1180 receives pressure information indicative of the pressure in a portion of the flow path, compensation filter 1180 can predict the response the flow sensor will have to the fluid flow fluctuations resulting from the pressure transient.

As such, filter 1180 may construct a false flow signal that closely resembles the false flow information produced by the sensor. More particularly, filter 1180 recreates the false flow information produced by flow sensor 1140 and provides this information as false flow signal 1160. False flow signal 1160 can then be subtracted from the sensor output signal 1150 to effectively remove the effects of pressure pulse 1100. In one embodiment, a false flow signal includes a transfer function that emulates the behavior of the flow sensor in response to flow fluctuations caused by pressure transients.

Figure 8:
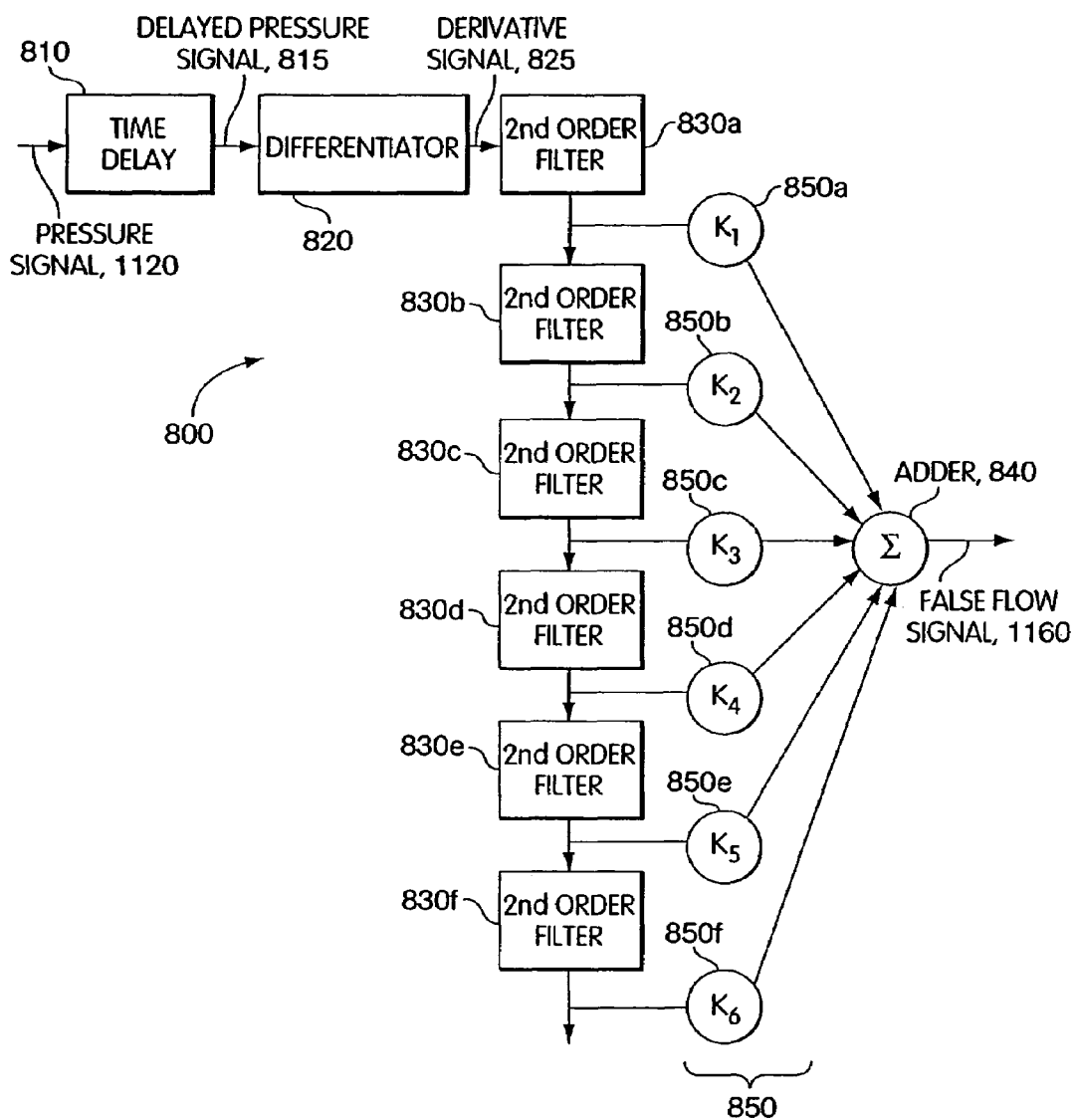
FIG. 8 illustrates a compensation filter according to one embodiment of the present invention.

According to one embodiment of the present invention, a compensation filter 800 is provided that emulates the behavior of the flow sensor. More particularly, FIG. 8 shows a compensation filter 800 that includes a time delay block 810, a differentiator 820, a series-connected bank of $2^{nd}$-order filters 830a–f (collectively, item 830), and an adder 840. Compensation filter 800 receives pressure signal 1120 and provides it to time delay block 810. Time delay block 810 delays the pressure signal such that the delayed output signal is aligned in time with a sensor output signal (not shown). In particular, some finite amount of time elapses between a pressure transient and when a flow sensor responds to the pressure transient (i.e., there is a delay between a pressure pulse and when the false flow information appears on the sensor output signal). As such, the pressure signal may be delayed such that the generated false flow signal is subtracted off the proper portion of the sensor output signal.

Delay block 810 provides a delayed pressure signal 815 to differentiator 820 which calculates a derivative of the delayed pressure signal 815 and provides a derivative signal 825 to a series of second-order filters 830. The derivative of the delayed pressure signal is calculated because the false flow resulting from a pressure transient is proportional to the pressure gradient resulting from a pressure transient. In addition, the derivative of the delayed pressure signal ensures that a constant pressure results in a zero false flow signal. That is, when the pressure signal is constant, the compensation filter has no effect on the sensor output signal.

Derivative signal 825 is provided to the first second order filter 830a in the series of filters 830. The output of each second order filter is provided as the input to the next second order filter in series 830. In addition, the output from each second-order filter is tapped off and provided to a respective gain block 850a–850f that scales the respective output of each filter by a respective constant gain factor $K_n$.

Each of the scaled outputs from the individual $2^{nd}$-order filters contributes to the construction of false flow signal 1160. Adder 840 sums the contributions of the scaled outputs and provides the false flow signal 1160. In one embodiment, false flow signal 1160 is a recreation of the false flow information provided by a flow sensor in response to pressure transients. As such, false flow signal 1160 may be subtracted from the sensor output to compensate for this false flow information.

It should be appreciated that the number of filters and type of filters illustrated in FIG. 8 is not limiting. Indeed, any filter configuration of any order and arrangement may be used to provide a false flow signal. The configuration illustrated in FIG. 8 has been shown to provide sufficient control over characteristics of the false flow signal that Applicants have found useful such as dead time, rise time, overshoot and parabolic attributes such that a false flow signal closely resembling the false flow information superimposed on the sensor output signal in response to a pressure transient may be recreated. However, other filter designs and arrangements that will occur to those skilled in the art may be applicable and are considered to be within the scope of the present invention. For instance, the order of several components may be different (e.g., delay block 810, differentiator 820), and/or one or more of these blocks may be eliminated altogether.

In one example, design of one embodiment of the filters shown in FIG. 8 are described in more detail below. A generalized second order transfer function of the second order filters can be represented as:

$$K/(s^2+2\xi\omega_n s+\omega_n^2) \quad (1)$$

Where:
K=Gain
s=Laplace Operator
$\omega_n$=Natural Frequency
$\xi$=Damping Factor Scaling factors may be added such that each filter can be tailored independent of each other. As such, the filter bank 830 may be optimized to provide a different response in terms of "height" (gain), "width" (frequency response) and over/undershoot (damping) such that the shape of the constructed false flow signal can be "dialed" and by changing the scaling factors $\xi$, $\omega$, and $\delta$.

One exemplary specific transfer function can be represented as:

$$K\delta\omega_n^2/(s^2+2\xi\delta\omega_n s+\delta^2\omega_n^2) \quad (2)$$

The K term in the transfer function is illustrated as a constant gain factor $K_n$. As such, the output from each second order filter is multiplied by $K_n$ and provided to adder 840. Adder 840 sums the contributions from each filter to provide false flow signal 1160. False flow signal 1160 is subtracted from the sensor output signal to provide an indicated flow signal. As such, the false flow information superimposed on the flow signal due to pressure transients is subtracted off by the constructed false flow signal leaving a flow signal indicative of the actual flow supplied to the process at the outlet side of the flow path.

Mass flow controllers are often vulnerable to instability due to factors including non-linearities in the various components of the mass flow controller dependencies on various operating conditions of a mass flow controller, or other factors. The term operating condition applies generally to any of various conditions that can be controlled and that may influence the operation of a mass flow controller. In particular, operating conditions apply to various external conditions that can be controlled independent of a particular mass flow controller. Exemplary operating conditions include, but are not limited to, fluid species, set point or flow rate, inlet and/or outlet pressure, temperature, etc.

However, it should be appreciated that other internal conditions may be present during the operation of a mass flow controller such as signal characteristics, system noise, or perturbations that cannot be controlled independent of a particular flow controller. In particular, various signals employed by the mass flow controller may have frequency components containing many different frequencies. However, the frequency composition of a signal is inherent to the signal and is not considered to be controllable independent of a particular mass flow controller. Accordingly, such conditions, unless specifically stated otherwise, are not considered to be encompassed within the term operating conditions as used herein.

The term mass flow rate, fluid flow, and flow rate is used interchangeably herein to describe the amount of fluid flowing through a unit volume of a flow path (e.g. flow path 103 of FIG. 1), or a portion of the flow path, per unit time (i.e., fluid mass flux).

The term species applies generally to the properties of a specific instance of a fluid. A change in species applies to a change in at least one property of a fluid that may change or affect the performance of a mass flow controller. For example, a change in species may include a change in fluid type (e.g., from nitrogen to hydrogen), a change in the composition of a fluid (e.g., if the fluid is a combination of gases or liquids, etc.), and/or a change in the state of the fluid or combination of fluids. The term species information applies generally to any number of properties that define a particular fluid species. For example, species information may include, but is not limited to, fluid type (e.g. hydrogen, nitrogen, etc.), fluid composition (e.g., hydrogen and nitrogen), molecular weight, specific heat, state (e.g., liquid, gas, etc.), viscosity, etc.

Often a mass flow controller comprises several different components (i.e., a flow sensor, feedback controller, valve etc.) coupled together in a control loop. Each component that is part of the control loop may have an associated gain. In general, the term gain refers to the relationship between an input and an output of a particular component or group of components. For instance, a gain may represent a ratio of a change in output to a change in input. A gain may be a function of one or more variables, for example, one or more operating conditions and/or characteristics of a mass flow controller (e.g., flow rate, inlet and/or outlet pressure, temperature, valve displacement, etc.) In general, such a gain function is referred to herein as a gain term. A gain term, and more particularly, the representation of a gain term may be a curve, a sample of a function, discrete data points, point pairs, a constant, etc.

Each of the various components or group of components of a mass flow controller may have an associated gain term. A component having no appreciable gain term can be considered as having a unity gain term. Relationships between gain terms associated with the various components of a mass flow controller is often complex. For example, the different gain terms may be functions of different variables (i.e., operating conditions and/or characteristics of the components), may be in part non-linear, and may be disproportionate with respect to one another.

Accordingly, the contributions of each gain term associated with the components around a control loop of a mass flow controller is itself a gain term. This composite gain term may itself be a function of one or more variables and may contribute, at least in part, to the sensitivity of the mass flow controller with respect to change in operating conditions and/or characteristics of the various components of the mass flow controller.

According to one embodiment of the present invention, a mass flow controller is provided having a control loop with a constant loop gain. According to one embodiment, the constant loop gain is provided by determining a reciprocal gain term by forming the reciprocal of the product of the gain terms associated with one or more components in the control loop of the mass flow controller and applying the reciprocal gain term to the control loop. According to one embodiment, the pressure signal is used to adjust the gain in the mass flow controller (e.g., in a GLL controller associated with the mass flow controller) to provide a constant gain.

A constant loop gain as used herein describes a gain of a control loop of a mass flow controller that remains substantially constant with respect to one or more operating conditions of the mass flow controller. In particular, a constant loop gain does not vary as a function of specific operating conditions associated with a mass flow controller, or as a function of the individual gain terms associated with the control loop. It should be appreciated that a constant loop gain may not be precisely constant. Imprecision in measurements, computation and calculations may cause the constant loop gain to vary. However, such variation should be considered encompassed by the definition of a constant loop gain as used herein. Further, a constant loop gain may not necessarily be constant over all operating ranges or conditions. However, one benefit of having a constant loop gain over operating conditions includes the mass flow controller being able to operate (and be tuned and calibrated) for one fluid and not need to be tuned and/or calibrated for other fluids and/or operating conditions.

It should further be appreciated that the gain of certain components of the mass flow control may vary with operating frequency, and that signals of the mass flow controller may have frequency components at many different frequencies. However, frequency is not considered an operating condition, and as such, is not considered as a condition over which a constant loop gain remains constant.

Following below are more detailed descriptions of various concepts related to, and embodiments of, methods and apparatus according to the present invention for control and configuration of a mass flow controller. Such a flow controller with which various aspects may be implemented is described with particularity in U.S. patent application Ser. No. 10/131,603, entitled SYSTEM AND METHOD FOR A MASS FLOW CONTROLLER, filed Apr. 24, 2002, incorporated by reference herein in its entirety. Although various aspects of the present invention may be implemented in the mass flow controller described therein, it should be appreciated that any mass flow controller may be used, and the invention is not limited to being implemented in any particular mass flow controller.

It should also be appreciated that various aspects of the invention, as discussed above and outlined further below, may be implemented in any of numerous ways, as the invention is not limited to any particular implementation. Examples of specific implementations are provided for illustrative purposes only.

In the following description, various aspects and features of the present invention will be described. The various aspects and features are discussed separately for clarity. One skilled in the art will appreciate that the features may be selectively combined in a mass flow controller depending on the particular application.

A. Control of a Mass Flow Controller

FIG. 1 illustrates a schematic block diagram of a mass flow controller according to one embodiment of the present invention. The mass flow controller illustrated in FIG. 1 includes a flow meter 110, a Gain/Lead/Lag (GLL) controller 150, a valve actuator 160, and a valve 170.

The flow meter 110 is coupled to a flow path 103. The flow meter 110 senses the flow rate of a fluid in the flow path, or portion of the flow path, and provides a flow signal FS2 indicative of the sensed flow rate. The flow signal FS2 is provided to a first input of GLL controller 150.

In addition, GLL controller 150 includes a second input to receive a set point signal SI2. A set point refers to an indication of the desired fluid flow to be provided by the mass flow controller 100. As shown in FIG. 1, the set point signal SI2 may first be passed through a slew rate limiter or filter 130 prior to being provided to the GLL controller 150. Filter 130 serves to limit instantaneous changes in the set point in signal SI1 from being provided directly to the GLL controller 150, such that changes in the flow take place over a specified period of time. It should be appreciated that the use of a slew rate limiter or filter 130 is not necessary to practice the invention, and may be omitted in certain embodiments of the present invention, and that any of a variety of signals capable of providing indication of the desired fluid flow is considered a suitable set point signal. The term set point, without reference to a particular signal, describes a value that represents a desired fluid flow.

Based in part on the flow signal FS2 and the set point signal SI2, the GLL controller 150 provides a drive signal DS to the valve actuator 160 that controls the valve 170. The valve 170 is typically positioned downstream from the flow meter 110 and permits a certain mass flow rate depending, at least in part, upon the displacement of a controlled portion of the valve. The controlled portion of the valve may be a moveable plunger placed across a cross-section of the flow path, as described in more detail with respect to FIG. 16. The valve controls the flow rate in the fluid path by increasing or decreasing the area of an opening in the cross section where fluid is permitted to flow. Typically, mass flow rate is controlled by mechanically displacing the controlled portion of the valve by a desired amount. The term displacement is used generally to describe the variable of a valve on which mass flow rate is, at least in part, dependent. As such, the area of the opening in the cross section is related to the displacement of the controlled portion, referred to generally as valve displacement.

The displacement of the valve is often controlled by a valve actuator, such as a solenoid actuator, a piezoelectric actuator, a stepper actuator etc. In FIG. 1, valve actuator 160 is a solenoid type actuator, however, the present invention is not so limited, as other alternative types of valve actuators may be used. The valve actuator 160 receives drive signal DS from the controller and converts the signal DS into a mechanical displacement of the controlled portion of the valve. Ideally, valve displacement is purely a function of the drive signal. However, in practice, there may be other variables that affect the position of the controlled portion of the valve.

Figure 10:
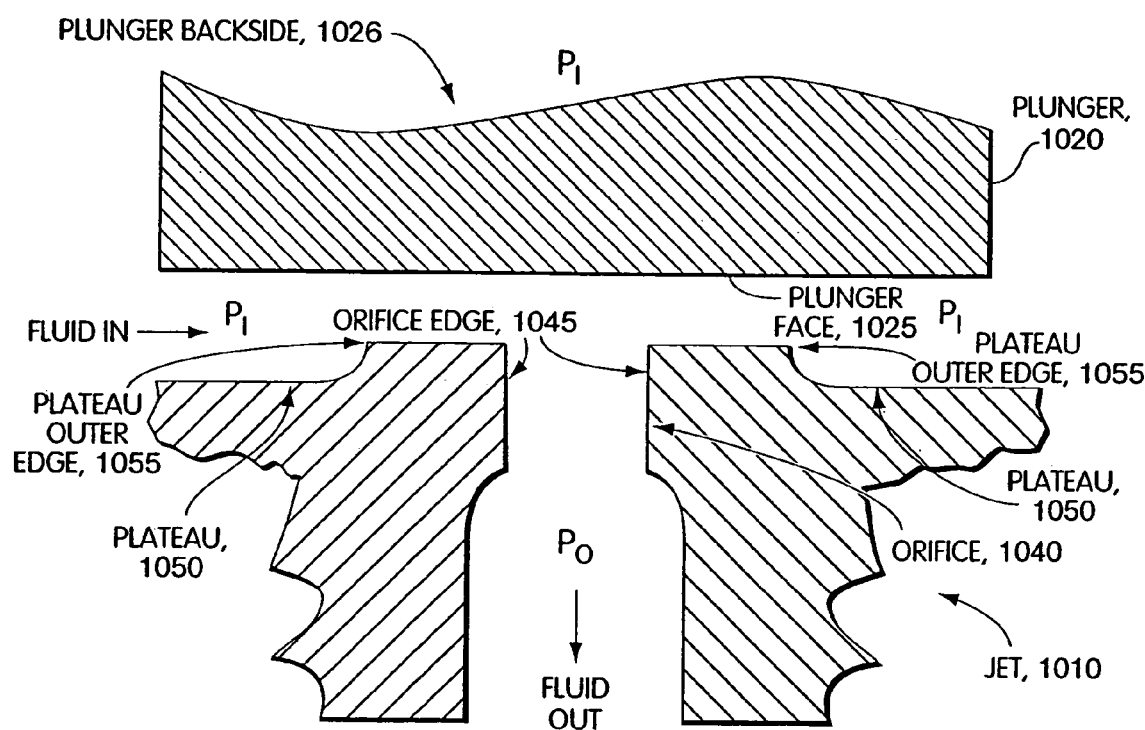
FIG. 10 illustrates a free floating plunger.

For example, in the valve illustrated in FIG. 10, a pressure differential between the backside of the plunger 1026 and the face of the plunger 1025, over the jet orifice 1040 and plateau 1050 attempts to force the plunger towards the jet. The plunger face over the orifice experiences a pressure substantially equal to the outlet pressure of the flow path. From the edge of the orifice 1045 to the outer edge of the plateau 1055, the plunger face experiences a pressure gradient, with pressure at the outer edge of the plateau substantially equal to the inlet pressure less any pressure drop through the sensor bypass. The remainder of the plunger, including the backside, experiences a pressure substantially equal to the inlet pressure less any pressure drop through the sensor bypass. Accordingly, the plunger 1020 will experience a pressure dependent force that can be expressed as: Force=$(P_I-P_O)*A$, where, $P_I$ is equal to the inlet pressure, $P_O$ is equal to the outlet pressure, and A is equal to the effective area of the plunger. The effective area of the plunger may change from valve to valve is typically within the range of the area of the orifice and the area of the orifice plus the plateau.

As such, when the valve experiences a pressure transient, this force changes and the plunger may undergo undesirable displacement. That is the plunger may be displaced by some amount different than the valve displacement that is desired by the control loop. This undesirable displacement may provide a fluid flow to the process having a component that is unintended. In addition, this undesired displacement may cause the control loop to oscillate as described below.

However, if pressure transients that may cause undesirable movement of the controlled portion of the valve can be detected, then the drive signal applied to the valve actuator can be adjusted to compensate for this undesired valve displacement. Stated differently, the drive signal may be adjusted such that it has a component indicative of the drive level necessary to keep the plunger stationary under a detected pressure transient.

Accordingly, one embodiment according to the present invention includes determining a displacement compensation signal from a pressure measurement, wherein the displacement compensation signal is the drive level necessary to prevent the plunger from moving due to pressure transients. The displacement compensation signal is then added to the valve drive signal. As such, the valve drive signal applied to the valve has a component indicating the valve displacement desired by the control loop of the mass flow controller and a component indicating the drive level necessary to hold the plunger steady in the pressure environment recorded by the pressure measurements.

The term pressure environment refers generally to various pressures that a valve experiences. As the different portions of the valve may "see" different pressures and at different times, the term pressure environment is meant to refer to the entire set of pressures that may affect a force on the valve. Similarly, a valve environment refers to the set of forces that act on the valve and may include pressures, magnetic forces, spring forces, mechanical forces etc., as described in further detail below.

One embodiment according to the present invention involves using a force model of the valve to predict the pressure induced valve displacement from a pressure signal indicative of at least one pressure measurement in the valve environment.

Figure 9:
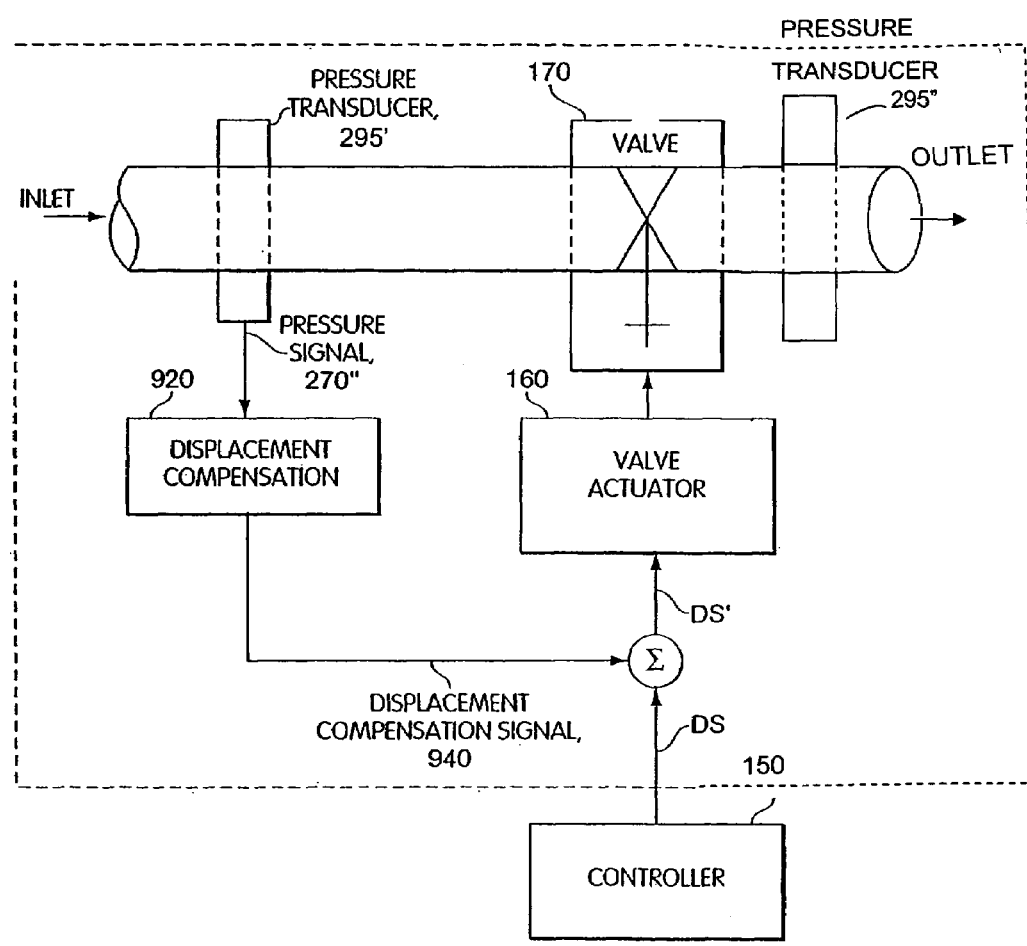
FIG. 9 illustrates one method of pressure induced valve displacement compensation according to one embodiment of the invention.

FIG. 9 illustrates one method of pressure induced valve displacement compensation. FIG. 9 illustrates the outlet side of a flow path 200. Valve 170 is coupled to the flow path to control the fluid flow through the outlet to a process. Valve actuator 160 controls the displacement of the valve depending on the drive level indicated by drive signal DS'. For example, valve and valve actuator pair 170 and 160 may be the same as that described in connection with FIG. 1.

In addition, a pressure transducer 295' is coupled to the flow path. The pressure transducer measures at least one pressure in the valve environment. The pressure transducer 295' provides at least one pressure signal indicative of at least one pressure in the valve environment (e.g., inlet pressure, outlet pressure, etc.). For the purpose of this example, the pressure transducer measures the inlet pressure of the flow path and provides pressure signal 270" indicating the inlet pressure. While the pressure transducer 295' is illustrated as being upstream from the valve, it should be appreciated that it may be placed downstream of the valve, for example, as illustrated by a pressure transducer 295" in FIG. 9. In addition, more than one pressure transducer may be disposed along the flow path in order to measure any desirable pressure in the valve environment and to output an associated pressure signal indicative of the pressure measurement.

Pressure signal 270" is provided to displacement compensation block 920. The displacement compensation block 920 determines a drive level sufficient to substantially counter-act a pressure induced displacement effected on the valve by the pressure environment indicated by pressure signal 270". Displacement compensation block 920 provides displacement compensation signal to summation block 950. At summation block 950, the displacement compensation signal is added to the drive signal DS issued from a controller 150. For example, controller 150 may be a GLL controller as illustrated in FIG. 1. The summed drive signal DS' is then provided to the valve actuator which mechanically displaces the controlled portion of the valve according to drive signal DS'.

As such, drive signal DS' has a component that effectively zeroes out the force effect the pressure environment has on the valve displacement and a component provided by the control loop. As such, the net valve displacement resulting from the valve environment is the displacement desired by the control loop of the mass flow controller.

Figure 13:
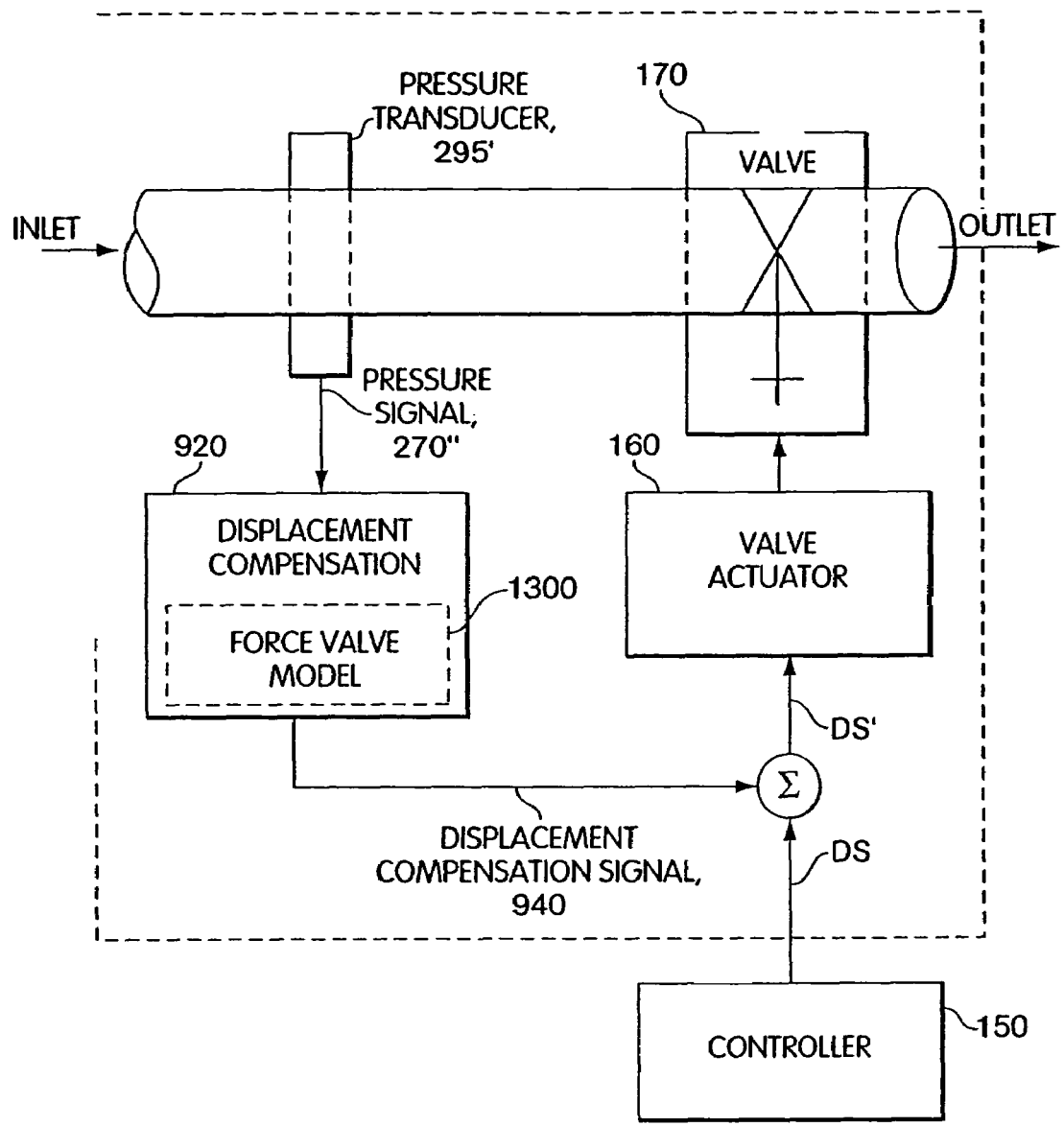
FIG. 13 illustrates one method of pressure induced valve displacement compensation according to one embodiment of the invention.

In one embodiment of displacement compensation, a force model of a valve is used in order to determined the pressure induced displacement of the valve in a pressure environment. FIG. 13 is similar to FIG. 9, however, the displacement compensation 920' includes a force model 1300 that models the forces in the valve environment. On suitable force model for a valve operating with a free floating plunger is described in the section E. entitled "Force Valve Model."

Many different force models may be formulated to predict pressure induced valve displacement in a pressure environment. Force models may vary with respect to the type of valve and conditions under which the valve is intended to operate. The invention is not limited to any particular force model.

As discussed above, the various components of the mass flow controller may have a gain term associated with the operation thereof. For example, FIG. 1 illustrates gain terms A, B, C and D associated with the flow meter 110, the GLL controller 150, the valve actuator 160, and valve 170, respectively. These components and their associated input and output signals, in particular, flow signal FS2, drive signal DS, valve signal AD, and the fluid flowing in the flow path 103, form a control loop of the mass flow controller. The gains A, B, C, and D, in turn, are associated with the relationship between said inputs and outputs. It should be appreciated that the gain terms around this control loop contribute to a composite control loop gain.

Typically, this control loop gain term is the product of the gain terms around the control loop (i.e., the control loop gain term is equal to the product A*B*C*D). As used herein, a composite gain term describes any gain term comprising the contributions of a plurality of individual gain terms. The notation for a composite gain term used herein will be appear as the concatenation of the symbols used to represent the individual gain terms contributing to the composite gain term. For example, the control loop gain term describe above will be represented as gain term ABCD. Unless otherwise noted, the notation described above for a composite gain term is assumed to be the product of its constituent gain terms.

The individual gain terms associated with a control loop of a mass flow controller may have differing characteristics and dependencies resulting in a composite gain term that may have multiple dependencies. These dependencies or variables may include set point or flow rate, fluid species, temperature, inlet and/or outlet pressure, valve displacement, etc. Applicants have recognized and appreciated that a mass flow controller having an arbitrary control loop gain term may be vulnerable to instability and may be sensitive to changes in some or all of the dependencies mentioned above. Below is a description of each of the exemplary gain terms illustrated in FIG. 1.

Gain term A is associated with the flow meter and represents the relationship between the actual fluid flow through the mass flow controller and the indicated flow (e.g., FS2) of the flow meter (e.g., change in indicated flow divided by change in actual fluid flow). Gain term A is calibrated to be a constant function of at least flow rate. However, this constant may depend at least upon the fluid species with which the mass flow controller operates.

Gain term B is associated with the GLL controller and represents the relationship between the indicated flow signal FS2 received from the flow meter and the drive signal DS provided to the valve actuator. Gain term B is related to the various gains and constants used in the feedback control of the GLL controller.

Gain term C is associated with the valve actuator and represents the relationship between a drive signal and the displacement of the valve. Gain C may include the combination of two separate gains including the gain associated with the conversion of a drive signal to an electrical current or voltage control signal, and the gain associated with the control signal and the mechanical displacement of the controlled portion of the valve.

Gain term D is associated with the valve and represents the relationship between a flow rate of the mass flow controller and valve displacement (e.g., a change in flow rate divided by a change in valve displacement.) Gain term D may be dependent on a variety of operating conditions including fluid species, inlet and outlet pressure, temperature, valve displacement, etc. According to one aspect of the present invention described in more detail below, a physical model of a valve is provided that facilitates the determination of a gain term associated with the valve with arbitrary fluids and operating conditions.

Gain term G is a reciprocal gain term formed from the reciprocal of the product of gain terms A, C, and D. As will be appreciated further from the discussion herein, gain term G permits the mass flow controller to operate in a consistent manner irrespective of operating conditions by providing to a control loop of the mass flow controller a constant loop gain.

According to one aspect of the present invention, a system gain term is determined for a particular mass flow controller by determining the composite gain term of various components around the control loop of the mass flow controller. A reciprocal gain term is formed by taking the reciprocal of the system gain term. This reciprocal gain term is then applied to the control loop such that the control loop operates with a constant loop gain. Thus, as the various gain terms around the control loop vary, the reciprocal gain term may be varied in order to maintain a constant loop gain.

Because the loop gain of the mass flow controller is held constant irrespective of the type of fluid used with the mass flow controller, and irrespective of the operating conditions with which the mass flow controller is operated, the response of the mass flow controller with different fluids and/or operating conditions can be made stable and to exhibit the same behavior as that observed during production of the mass flow controller on a test fluid and test operating conditions.

Unless otherwise noted, the system gain term is the composite of gain terms around the control loop associated with various components of the mass flow controller that inherently vary as a function of one or more operating conditions. For example, the system gain term in FIG. 1 is composite gain term ACD.

In block 140 of FIG. 1, a reciprocal gain term G is formed by taking the reciprocal of system gain term ACD and applying it as one of the inputs to the GLL controller. It should be appreciated that the reciprocal gain term may be the reciprocal of fewer than all of the gain terms associated with the various components around the control loop of the mass flow controller. For example, improvements in control and stability may be achieved by forming the reciprocal of composite gain terms AC, AD, CD etc. However, in preferred embodiments, gain term G is formed such that the loop gain remains a constant (i.e., gain G is the reciprocal of the system gain term).

According to one aspect of the invention, pressure may be sensed at the inlet, and a pressure signal (e.g., pressure signal 190) may be produced that can be used in association with a mass flow controller. For example, a pressure signal may be produced that can be used in a flow sensor portion of the mass flow controller to compensate for spurious indications due to pressure transients. Further, the pressure signal may be used for feed forward control of the valve. Also, the pressure signal may be used to adjust the gain in a GLL controller.

Figure 2:
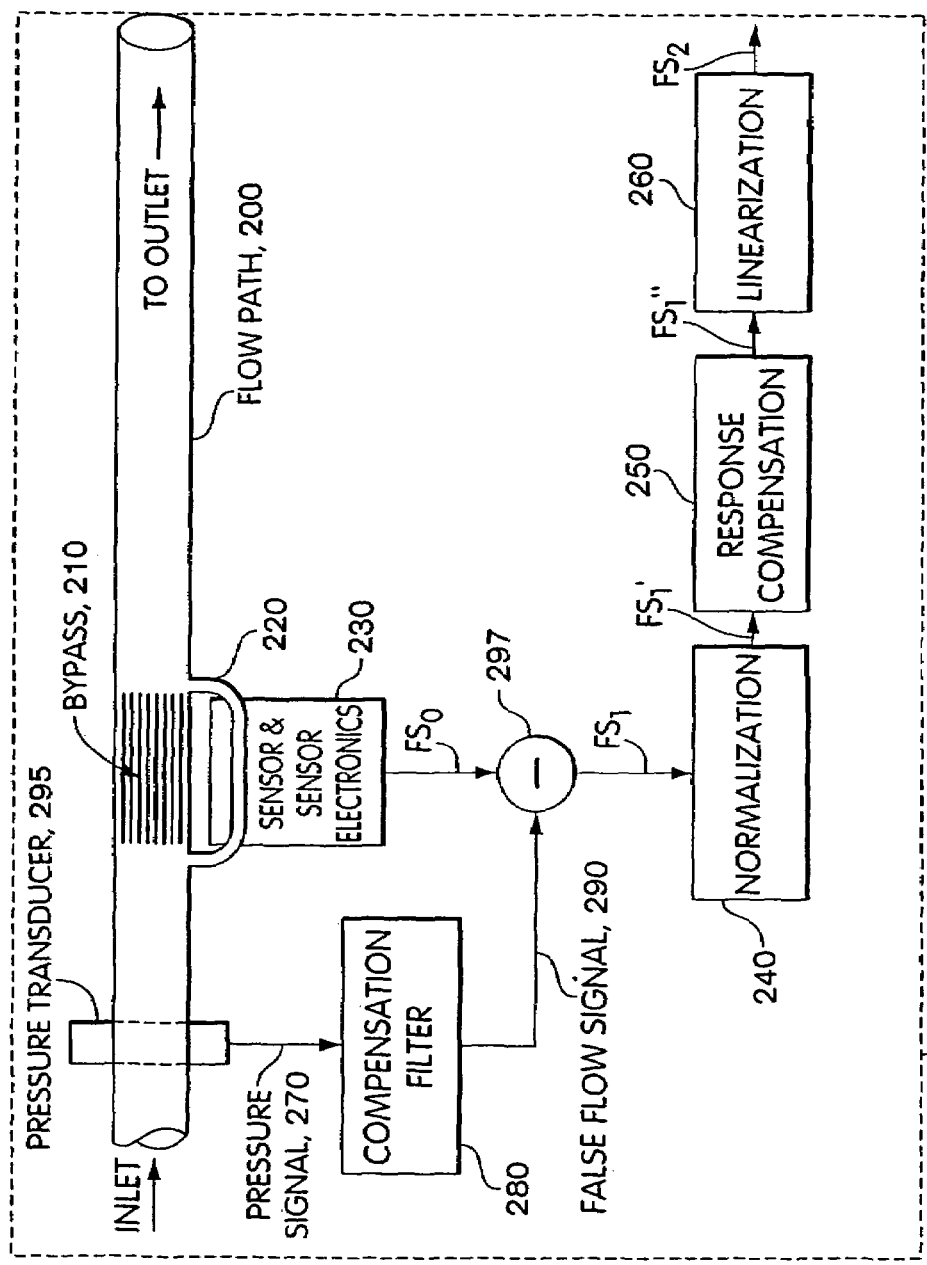
FIG. 2 is a more detailed schematic block diagram of the flow meter shown in FIG. 1.

FIG. 2 illustrates a more detailed schematic block diagram of the flow meter 110. A flow meter refers generally to any of various components that sense flow rate through a flow path, or a portion of a flow path, and provide a signal indicative of the flow rate. The flow meter 110 of FIG. 2 includes a bypass 210, a sensor and sensor electronics 230, a normalization circuit 240 to receive the sensor signal FS1 from the sensor and sensor electronics 230, a response compensation circuit 250 coupled to the normalization circuit 240, and a linearization circuit 260 coupled to the response compensation circuit 250. The output of linearization 260 is the flow signal FS2 as illustrated in the mass flow controller of FIG. 1.

Although not shown in FIG. 2, in some embodiments, the sensor signal FS1 may be converted to a digital signal with the use of an analog to digital (A/D) converter so that all further signal processing of the mass flow controller 100 may be performed by a digital computer or digital signal processor (DSP). Although in one preferred embodiment, all signal processing performed by the mass flow controller 100 is performed digitally, the present invention is not so limited, as analog processing techniques may alternatively be used.

In FIG. 2, a sensor conduit 220 diverts some portion of the fluid flowing through the flow path, with the remainder and majority of the fluid flowing through the bypass. Sensor and sensor electronics 230 are coupled to the sensor conduit and measure the flow rate through the conduit. A pressure transducer 295 is coupled to flow path 200 upstream of the bypass to measure the inlet pressure at the inlet side of the flow path 200. Pressure transducer 295 provides a pressure signal 270 indicative of the inlet pressure.

As discussed in the foregoing, pressure transients may cause local fluctuations in the fluid flow that is sensed by sensor and sensor electronics 230. However, this is considered false flow information as it is not indicative of the flow rate provided to the process at the outlet side of the flow path. As such, flow signal FS0 may be corrupted with false flow information resulting from transients in the inlet pressure. For example, flow signal FS0 may contain false flow information resulting from local fluid flow fluctuation caused by fluid rushing to fill a dead volume caused by a pressure pulse or other pressure transient.

In order to mitigate the effects of the false flow information, compensation filter 280 receives pressure signal 270 from pressure transducer 295 and constructs false flow signal 290. False flow signal 290 is constructed to model the erroneous response of sensor and sensor electronics 230 due to fluid flow fluctuations caused by pressure transients. That is to say, false flow signal 290 is constructed to equal or closely approximate the false flow information superimposed on the flow signal as a result of pressure transients. One suitable compensation filter was described in detail with respect to FIGS. 8 and 12. The false flow signal 290 is then subtracted off flow signal FS0 (e.g., by subtractor 297) to provide sensor signal FS1 having the false flow information effectively removed.

Sensor signal FS1 is then further processed in order to provide indicated flow signal FS2. In particular, the amount of fluid flowing through the conduit is proportional to the fluid flowing in the bypass. However, within the range of flow rates with which a mass flow controller is intended to operate, the relationship between the flow rate in the conduit and the flow rate in the bypass may not be linear.

In addition, thermal sensors measure flow rate by detecting temperature changes across an interval of the conduit. Accordingly, in some embodiments, particularly those that implement thermal sensors, there may exist temperature dependencies, particularly at the two extremes of the range of flow rates with which a mass flow controller operates (referred to herein as zero flow and full scale flow, respectively).

Normalization circuit 240 receives the sensor signal FS1 and corrects for potential temperature dependence at zero flow and at full scale flow. In particular, when no fluid is flowing through the conduit and/or bypass (i.e., zero flow), the sensor may produce a non-zero sensor signal. Furthermore, this spurious indication of flow may depend on temperature. Similarly, the sensor signal FS1 may experience fluctuation that is dependent on temperature at full-scale flow. Correction for temperature dependent variation in the signal FS1 at zero flow may be performed by measuring the value of the sensor signal FS1 at zero flow at a number of different temperatures, and then applying a correction factor to the signal FS1 based upon the temperature of the sensor. Corrections for temperature dependent variation of sensor signal FS1 at full-scale flow may be performed in a similar manner based upon measurements of the sensor signal at different values of temperature and applying an appropriate correction factor based on the temperature.

In addition, temperature dependencies may be similarly measured for characteristic points along the entire range at which a mass flow controller is desired to operate. Accordingly, a correction curve that is a function of flow rate and temperature may be fit to the measurements taken a zero flow, full scale flow, and any number of characteristic points in between. This correction curve may provide correction for temperature dependencies across the range of flow rate with which the mass flow controller is intended to operate. In addition, a knowledge of the fluid being used and known sensor property variations with temperature may be utilized to provide or enhance the correction factors and/or correction curves of normalization 240.

The normalization circuit 240 may also provide a fixed normalization gain to the signal FS1 so that at full scale flow through the sensor conduit, a specific value is obtained for normalized signal FS1', and at zero flow, another specific value (e.g. zero) is obtained.

In one embodiment, for example, normalization 240 ensures that at zero flow through the sensor conduit, normalized signal FS1' has a value of 0.0, and at full scale flow through the conduit, normalized signal FS1' has a value of 1.0. It should be appreciated that any value may be chosen for normalized signal FS1' at zero flow and at full scale flow, as values used herein are exemplary only.

It should be appreciated that normalized signal FS1' may have poor dynamic characteristics, such that in response to a step change in fluid flow, the signal FS1' is delayed in time and smoothed relative to the actual flow through the flow sensor. This is because thermal flow sensors typically have a slow response time as the thermal changes take place over a relatively long period of time.

Figure 3:
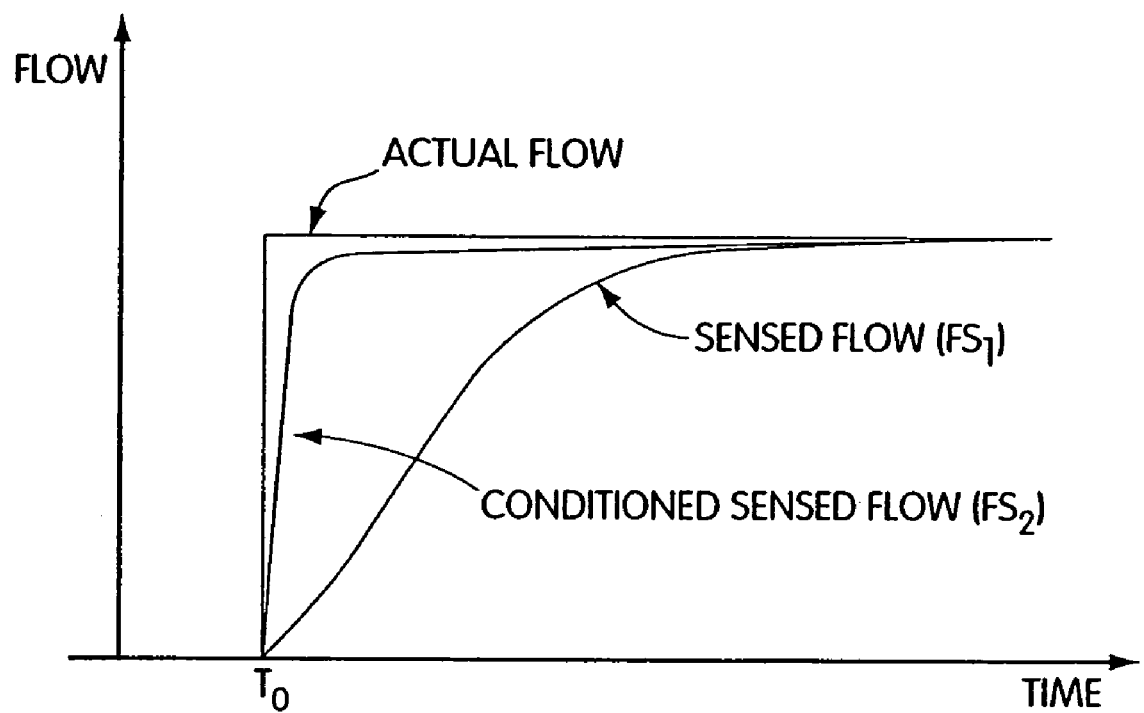
FIG. 3 illustrates various output signals of a mass flow sensor in response to a step change in flow according to an embodiment of the present invention.

FIG. 3 is an illustration of this behavior in which time is plotted on the horizontal or X-axis and flow is plotted on the vertical or Y-axis. As shown in FIG. 3, in response to a unit step change in actual flow through the thermal mass flow sensor, the signal FS1 provided by the sensor is delayed in time and smoothed.

In order to correct for these sensor effects and provide better dynamic response to changes in fluid flow, normalized signal FS1' is provided to response compensation circuit 250. The response compensation circuit 250 is functionally a filter that is approximately an inverse of the transfer function of the sensor and sensor electronics 230. The response compensation circuit 250 may be adjusted or tuned so that the conditioned signal FS1" provided by the response compensation circuit 250 has a predetermined rise time, has a predetermined maximum level of overshoot and/or undershoot, and levels out within a predetermined time frame, and/or is tuned for other characteristics that may be desirable for a particular implementation of a mass flow controller.

As shown in FIG. 3, the compensated signal FS1" has a profile that more closely reflects the profile of the step change in fluid flow through the sensor illustrated in the drawing. The flow meter of the mass flow controller may be adjusted to provide such a compensated signal during production of the mass flow controller. In particular, the dynamic response may be tuned during a sensor tuning step discussed in detail further below.

As discussed briefly above, the proportion of fluid flowing through the sensor conduit relative to the fluid flowing through the bypass may be dependent upon the flow rate of the fluid. In addition, non-linearities in the sensor and sensor electronics further complicate the relationship between actual fluid flow and the sensed flow signal provided by the sensor at different flow rates. The result is that a curve representing sensed flow versus fluid flow may not be linear.

It should be appreciated that many of these non-linearities carry through normalization 240 and response compensation 250. Accordingly, the immediate discussion is germane to any of sensor signals FS1, FS1', and FS1". The term sensor output will be used herein to describe the sensor signal before it has been linearized (i.e., preceding linearization 260.) In particular, and unless otherwise indicated, sensor output describes the signal produced by the sensor and that has been normalized and compensated (e.g., FS1"), for example, by normalization 240 and response compensation 250, respectively, but that has not been linearized. It should also be appreciated that normalization and compensation steps need not respect the order in which they are applied in FIG. 2, and are in fact interchangeable.

Linearization 260 corrects for the non-linearities of the sensor output (i.e., FS1"). For example, linearization 260 provides a flow signal that will have a value of 0 at zero flow, 0.25 at 25% of full scale flow, 0.5 at 50% of full scale flow, 1.0 at full scale flow etc. Linearization 260 provides the flow signal FS2 provided to an input of GLL controller 150 as illustrated in FIG. 1. The term indicated flow will be used herein to describe generally the flow signal provided by a flow meter after it has been linearized (e.g. flow signal FS2).

Although there are a number of ways to linearize the sensor output, such as polynomial linearization, piece-wise linear approximation, etc., in one embodiment of the present invention, a spline is used to linearize this signal, and in particular, a cubic spline. A discussion of cubic splines is given in Silverman B. W. entitled "Some Aspects of the Spline Smoothing Approach to Non-Parametric regression Curve Fitting", published in the Journal of the Royal Statistics Society and is herein incorporated by reference in its entirety.

According to this aspect of the present invention, the actual output signal FS1 from the sensor and sensor electronics 230 is measured at a number of different (and known) flow rates on a test fluid or gas, and the measured flow rate is plotted against the known flow rate for all measurement points. This plotting of the measured flow rate versus the known flow rate defines the transfer function of the sensor and sensor electronics 230, and a cubic spline is then fit to the inverse of the transfer function of the sensor and sensor electronics 230. The measured value of the sensor output is then used as an input to the cubic spline to provide a normalized, compensated, and linearized indicated flow signal (e.g., FS2).

As will be discussed in further detail below, the linearization circuit 260 may include a linearization table (not shown) to facilitate linearization of the sensor output. In an alternative embodiment of the present invention, a cubic spline is fit to the transfer function of the sensor and sensor electronics 230 itself, rather than its inverse.

After compensating for non-linearities in the sensor and sensor electronics 230, and for the changing fraction of fluid flow that goes through the sensor conduit 220, the conditioned flow signal FS2 is provided to the GLL controller 150 and may also be provided to a filter 120 (FIG. 1) for display. An illustration of the conditioned flow signal FS2 is referenced "conditioned sensed flow (FS2)" and shown in FIG. 3.

As shown in FIG. 1, a gain term A is associated with the flow meter 110. This gain term represents the relationship between the fluid flowing in the flow path 103 and the indicated flow (i.e., flow signal FS2). In particular, gain term A is the ratio of change in indicated flow to change in actual fluid flow. It should be appreciated from the discussion of the flow meter 110 above, that this relationship (i.e., a curve of fluid flow versus indicated flow) has been made to be linear. Thus, the ratio of change in indicated flow to change in actual fluid flow (i.e., the derivative of the curve of fluid flow versus indicated flow) is a constant function of flow rate. Thus, gain term A is a constant for a particular fluid species.

Since gain A is a constant, and since indicated flow has been defined at a particular value at full scale flow, gain A can be determined for a particular fluid based upon the full scale flow associated with the fluid used during production of the mass flow controller. In the exemplary flow meter where indicated flow has been adjusted to have a value of 1.0 at full scale flow, gain A is simply the reciprocal of full scale flow.

It should be appreciated that full scale flow through a mass flow controller may change as a result of operating the mass flow controller with a different fluid. Hence, the mass flow controller will have a full scale range dependent on fluid species. Therefore, though gain A is a constant function of at least flow rate, this constant may change upon operation of the mass flow controller with a different fluid species.

However, Applicants have determined how the gain associated with the flow meter (e.g., gain term A) changes with fluid species. As discussed above, the gain of the flow meter can be directly calculated from full scale range (i.e., the full scale flow of the mass flow controller). Thus, determining the full scale range for a process fluid allows for a direct determination of the gain of the flow meter. The full scale range of a process fluid may be determined by applying a conversion factor to the full scale range associated with a test fluid. The conversion factor may be derived empirically from measurements with the particular fluid for which the full scale range is being determined.

Figure 4:
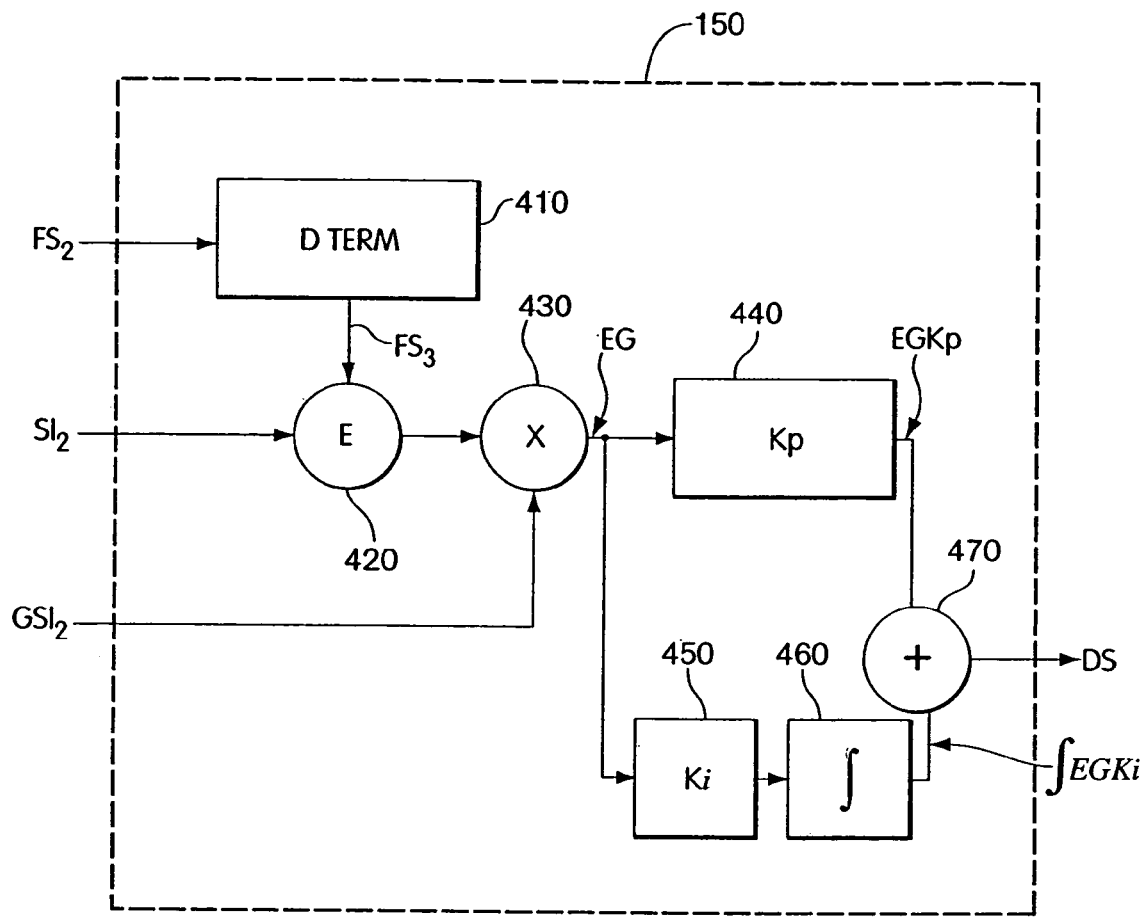
FIG. 4 is a more detailed schematic diagram of the Gain/Lead/Lag controller circuit shown in FIG. 1.

FIG. 4 illustrates details of one embodiment of the GLL controller 150. Although controller 150 is described herein as being a gain/lead/lag (GLL) controller, it should be appreciated that the present invention is not so limited. For example, the various aspects of the present invention may be used with other types of feedback controllers, such as proportional integral differential (PID) controllers, proportional integral (PI) controllers, integral differential (ID) controllers, etc. It should also be appreciated that numerous mathematical equivalents to the GLL controller 150 illustrated in FIG. 4 may alternatively be used, as the present invention is not limited to the specific controller structure illustrated therein.

The GLL controller 150 receives three input signals: the flow signal FS2 (also referred to as indicated flow); the set point signal SI2; and the reciprocal gain term G. As noted above, the set point signal SI2 may first be passed through a slew-rate limiter or filter 130 to prevent instantaneous changes in the set point signal from being provided to the GLL controller.

As noted in the foregoing, the Gain G 140 is a reciprocal gain term formed by taking the reciprocal of the product of the gain terms associated with various components around a control loop of the mass flow controller (i.e., the reciprocal of the system gain term), as discussed in detail herein. Gain G may be applied anywhere along the control loop and is not limited to being applied at the input of the controller of a mass flow controller. However, reciprocal gain term G may be conveniently applied to the input of the GLL controller as illustrated in FIGS. 1 and 4.

According to one embodiment of the present invention, gain term G may be determined by a microprocessor or digital signal processor associated with the mass flow controller. The processor may be integrated into the mass flow controller or may be external, as discussed below.

As shown in FIG. 4, the flow signal FS2 is provided to a differentiator or D-term circuit 410. Because the circuit 410 is not identically a differentiator, it is referred to as a "D-term" circuit herein. Indeed, within the D-term circuit 410, the flow signal FS2 is differentiated, low pass filtered, and multiplied by a constant and then summed with the conditioned flow signal FS2. It should be appreciated that the present invention is not limited to the particular implementation of the D-term circuit 410 described herein, as other types of differentiator circuits may be used. Functionally, the D term circuit 410 provides a modified flow signal FS3 that is "sped up" relative to the conditioned signal FS2, thereby constituting the "lead" in the GLL controller 150. The D term circuit 410 also provides damping. As should be appreciated by those skilled in the art, the D-term circuit 410 functionally provides a modified flow signal FS3 that is indicative of how the flow signal is changing and how quickly.

The modified flow signal FS3 is then provided, along with the set point signal SI2 to a subtraction circuit 420 that takes the modified flow signal FS3 and the set point signal S12, and generates an error signal E based upon their difference. The error signal E is then multiplied by the gain term G (hence the word "gain" in a gain/lag/lead GLL controller) and provided to a proportional gain term 440 and an integral gain term 450.

The proportional gain term multiplies the signal EG by a fixed constant $K_P$, and then provides the output signal $EGK_P$ to a summing circuit 470. The proportional gain term 440 is used to functionally provide a component of the drive signal to move the control valve 170 a certain fixed amount based upon the signal EG, thereby allowing the control valve 170 to make up ground quickly upon a change in the error signal E.

The proportional gain term 440 also provides damping, helping to prevent ringing in the drive signal DS and in the resulting flow. For example, as the error signal E decreases, and the output signal from the integrator 460 is increasing, the value of the error signal E multiplied by $K_P$ decreases, as the constant $K_P$ is preferably less than unity, thereby decreasing the amount of overshoot that occurs.

The integral gain term 450 multiplies the signal EG by another fixed constant $K_I$, and then provides the output signal $EGK_I$ to an input of the integrator 460. The integrator 460 integrates the signal $EGK_i$ and provides the integrated output to a second input of the summing circuit 470. Functionally, the output of the integrator 460 provides a signal that is indicative of the error signal E over time, and represents how the error signal has changed in the past (hence the word "lag" in a gain/lead/lag GLL controller). Given an error signal E, the integrator 460 starts out at a specific slope, and as the indicated flow (e.g., FS2) increases (assuming a new and higher set point has been input), the error signal E decreases, such that the integrator 460 stops integrating, (i.e., slows down how fast it's changing) and the component of the drive signal output from the integrator 460 stops increasing. The integrated output signal $EGK_I$ is then summed with the output of the proportional gain term $EGK_P$ in summing circuit 470, and the summed output signal DS is provided as a drive signal to the valve actuator 160.

In addition, a pedestal (not shown) may be provided to preset the integrator 460 to a particular value when the controller is transitioning from a zero flow to a controlled flow state. The pedestal describes a value that when added to the integrator will provide a drive level DS that is just below the drive level necessary to open the valve and permit flow. In this manner, the time that would have been necessary for the integrator to ramp up to the pedestal value can be eliminated and the controller will have an increased response time to transitions between zero flow and controlled flow.

Figure 5:
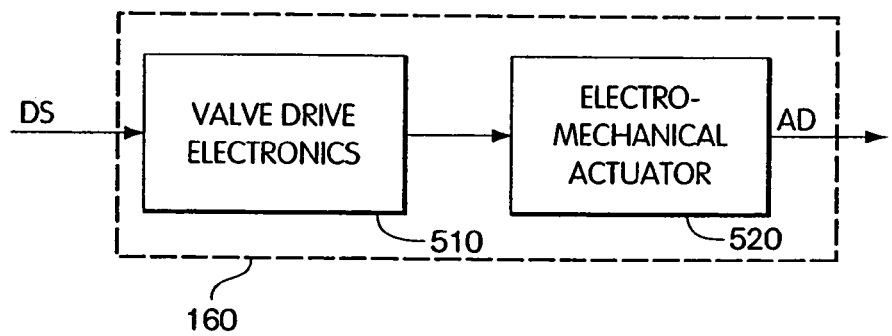
FIG. 5 is a more detailed schematic block diagram of the valve actuator shown in FIG. 1.

As shown in FIG. 5, the output of the summing circuit is provided to the valve actuator 160 which generally includes a valve drive electronics circuit 510 that is coupled to an electro-mechanical actuator 520. Any suitable valve drive electronics circuit 510 may be used to receive the drive signal DS and convert the drive signal DS to a voltage, current, or other signal capable of moving the valve 170 to a desired position to give the desired rate of flow. Further, the valve drive circuit 510 may include any suitable valve drive actuation circuit known in the art for driving solenoid actuated control valves, piezoelectrically actuated control valves, etc. According to one embodiment of the present invention utilizing a solenoid actuated control valve, the valve drive electronics circuit 510 may include circuitry that reduces the impact of hysteresis in the solenoid actuated control valve as described further in detail below.

FIG. 6 is an illustration of a number of the signals described above with respect to FIG. 4 in which the horizontal or X-axis represents time and the vertical or Y-axis represents the identified signal level. As shown in FIG. 6A, at a time $T_0$, a step change (to the level $F_0$) in the set point in signal SI2 is provided. At this time, the error signal E rises to the level $F_0$, as the error signal E is equal to the difference between the conditioned flow signal FS2 (which is still at its prior state), and the value of the set point in signal SI2, which is now at a value of $F_0$. The error signal times the gain term G (i.e., signal EG) thus steps to a high value and then decreases with time in the manner shown in FIG. 6B. As the output of the proportional gain term 440 is the signal EG multiplied by the constant $K_P$ (which is less than unity), the signal $EGK_P$ has a similar shape, although slightly reduced in amplitude, as shown in FIG. 6C. As shown in FIG. 6D, at the time $T_0$, the integrated output signal $EGK_I$ is zero, but quickly starts ramping upward due to the magnitude of the error signal E. The output of the summing circuit 470, representing the sum of the output signal $EGK_P$ and the integrated output signal $EGK_I$ is labeled DS and is shown in FIG. 6E. Based upon the drive signal DS provided to the valve drive and valve drive electronics circuit 160, the control valve 170 is opened an increased amount and the indicated flow signal (e.g., flow signal FS2) starts increasing to the new level of the set point in S12. As time progresses, the error signal E decreases, the output signal $EGK_P$ of the proportional gain term 440 decreases, as does the integrated output signal $EGK_I$, and the rate of flow is established at the level of the new set point.

Ideally, it is desired to get a step response in the true flow in response to a step input applied to the set point in of the mass flow controller. Although this is not practically possible, embodiments of the present invention may be used to provide a consistent response in response to a step input in the set point, irrespective of whether the step input represents a 2% step or a 100% step relative to full scale flow, irrespective of the fluid being used, and irrespective of the inlet or outlet pressure, etc. To obtain this consistency, embodiments of the present invention provide a mass flow controller having a constant loop gain.

It should be appreciated from the foregoing that while various gains associated with the components along a control loop of a mass flow controller may vary as functions of different variables, and may depend upon a variety of different operating conditions, consistent and stable operation of a mass flow controller can be attained for a set of operating conditions by providing the control loop of the mass flow controller with a constant loop gain.

It should be appreciated that various aspects of the control of a mass flow controller may be implemented using a microprocessor. For example, GLL controller 150 may be implemented as a microprocessor, digital signal processor etc. Likewise, the determination of various control parameters such as the reciprocal gain term (e.g., gain term G) may be provided by a microprocessor. Various aspects of the control of a mass flow controller may be implemented in software, firmware or hardware using techniques that are well known in the art.

B. Mass Flow Controller Configuration

It should be appreciated that in many cases, in order for a mass flow controller to operate consistently and in a stable manner, the mass flow controller must be tuned and/or calibrated during production. Manual tuning and/or calibration is often a time consuming, labor intensive, and expensive process. In addition, when a process requires that the mass flow controller be configured to operate with a different fluid species and/or operating conditions than that used during production, the performance of a mass flow controller will rarely exhibit the same behavior observed during production of the mass flow controller, even if the mass flow controller was tuned and calibrated on a number of process fluids. In other words, the mass flow controller may have a different response when operating with a fluid and/or operating conditions other than that with which the mass flow controller was tuned and/or calibrated.

According to one aspect of the present invention, a method of configuring a mass flow controller is provided that permits the response of the mass flow with a process fluid and/or process operating conditions to be made substantially the same as the response for which the mass flow controller was tuned and/or calibrated with a test fluid and test operating conditions.

In one embodiment of the present invention, during tuning and/or calibration of a mass flow controller with a single test fluid and a set of test operating conditions, configuration data is obtained. This configuration data may be used to configure the mass flow controller to operate with an arbitrary process fluid and/or operating conditions, thus alleviating performance degradation due to operation with a fluid and/or operating conditions other than those used during production, and obviating expensive and time-consuming tuning and/or calibration of the mass flow controller on multiple surrogate fluids.

Figure 7A:
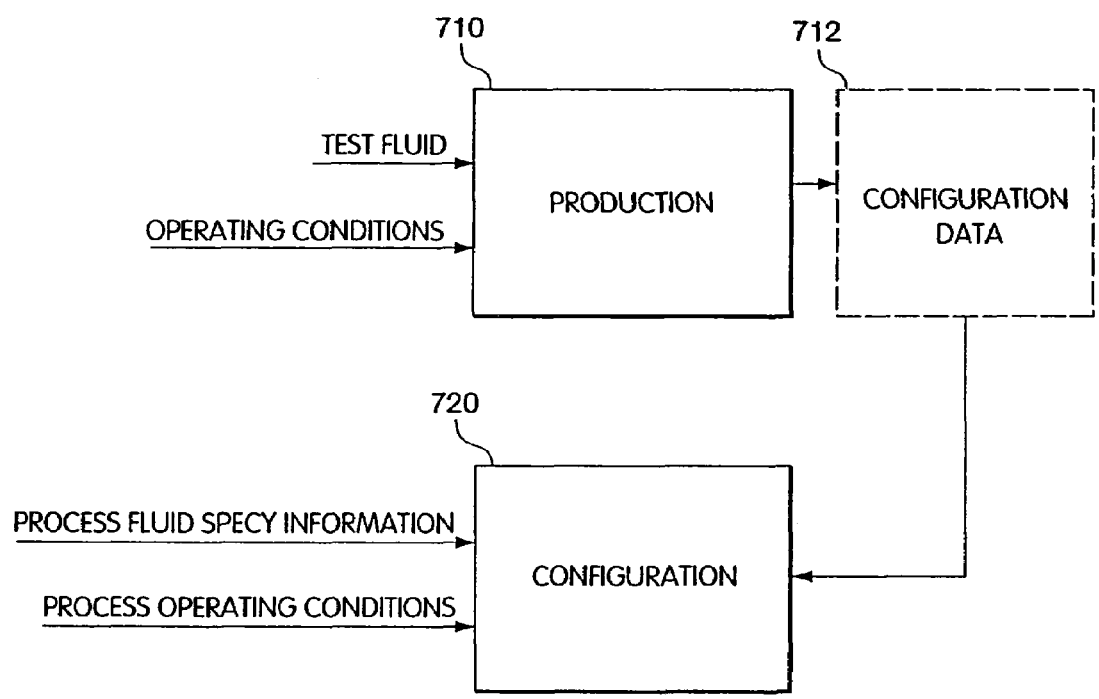
FIGS. 7a–7f illustrate a method of configuring a mass flow sensor for operation with a process fluid and/or process operating conditions according to an embodiment of the present invention.

Providing a mass flow controller that is capable of operating with arbitrary fluids and operating conditions and exhibiting a satisfactory response often involves steps including an initial production of the mass flow controller and a subsequent configuration of the mass flow controller. FIG. 7a illustrates production and configuration steps according to one embodiment of the present invention.

The term production, as used herein and when applied to a mass flow controller, describes generally the various tasks involved in preparing a mass flow controller for operation on a specific fluid species and a particular set of operating conditions. Production may include building the mass flow controller from various components, operating the mass flow controller on a test fluid under test operating conditions, and tuning and/or calibrating various components and/or control parameters of the mass flow controller such that the mass flow controller exhibits satisfactory behavior and performance (i.e., has a satisfactory response) with the test fluid and test operating conditions.

The term configuration or configuring, as used herein and when applied to a mass flow controller, describes generally the various steps involved in adapting a mass flow controller for operation with an arbitrary fluid under arbitrary operating conditions. In particular, configuration describes steps involved in adapting a mass flow controller for operation with a fluid other than the fluid with which the mass flow controller underwent production (referred to herein as a "process fluid" and a "test fluid", respectively), and under conditions that may be different than the set of operating conditions used during production of the mass flow controller (referred to herein as "process operating conditions" and "test operating conditions", respectively), such that the response of the mass flow controller is substantially the same as that observed during production. It should be appreciated that configuration of a mass flow controller may be performed at any time after production, and in any location, including, but not limited to, the manufacturing site (e.g., to configure the mass flow controller for a particular known application), or the field (e.g., at an end user's site of operation).

In general, the term satisfactory response refers to a response of a mass flow controller that performs within a set of given tolerances of a particular mass flow control process or task. In particular, the dynamic and static response of the mass flow controller performs within a range of tolerances for which the mass flow controller was intended to operate.

A mass flow controller may be tuned and/or calibrated during production to have a satisfactory response for an arbitrary set of tolerances. Thus, the response of a mass flow controller after tuning and/or calibration on a test fluid and a set of test operating conditions, unless otherwise stated, should be considered to have a satisfactory response for that test fluid and operating conditions. However, the response may change substantially when the mass flow controller is operated with a different fluid and/or operating conditions, such that the response is no longer satisfactory.

In general, a mass flow controller is considered to have the same response on a test fluid and test operating conditions and on a process fluid and/or process operating conditions when both responses are satisfactory (i.e., both responses perform within the tolerances for which the mass flow controller was intended to operate).

As illustrated in FIG. 7a, during production 710, the mass flow controller is operated with a test fluid under a set of test operating conditions. Characteristics of the operation of the mass flow controller are obtained and stored as configuration data 712. The configuration data 712 may be obtained during various tuning and/or calibration steps of production 710, as described in further detail with respect to FIGS. 7b–7f.

The term tuning describes steps that involve providing satisfactory dynamic response and behavior to fluid flow and a change in fluid flow and/or change in desired fluid flow (i.e., a change in set point). The term calibration refers generally to steps that involve providing a satisfactory steady-state or static response of a mass flow controller.

The term configuration data applies generally to information obtained during tuning and/or calibration of a mass flow controller. In particular, configuration data describes characteristics of and/or measurements taken from a mass flow controller during operation with a test fluid and test operating conditions. Configuration data obtained during production of a mass flow controller may then be used to configure the mass flow controller on a process fluid and/or process operating conditions.

As discussed briefly above, the terms test fluid and test operating conditions are used to describe a fluid and operating conditions that were used during production of a mass flow controller. The terms process fluid and process operating conditions describe fluids and operating conditions desired, typically, by an end user for a particular application of the mass flow controller.

It should be appreciated that the same type or types of fluids and operating conditions may be used for both test and process purposes. However, because a mass flow controller cannot be tuned on every fluid and/or under all operating conditions, certain aspects of the invention involve a mass flow controller being tuned and/or calibrated on a particular test fluid and under a particular set of test operating conditions during production such that the mass flow controller can be configured to operate with a different fluid and/or operating conditions thereafter. Accordingly, it should be understood that the term "process fluid" is not used to describe different types of fluids, but rather to demonstrate that the fluid may differ from the fluid with which the mass flow controller was tuned and/or calibrated. Similarly, the term "process operating conditions" describe a set of operating conditions that may not be the same as the test operating conditions with which the mass flow controller was tuned and/or calibrated. One, some, or all of a set of process operating conditions may differ from the test operating conditions.

In configuration step 720, the configuration data 712 obtained during production may be used to facilitate configuration of the mass flow controller on a process fluid and/or process operating conditions. According to one embodiment, configuration data 712 is used during configuration 720 to determine control parameters associated with the mass flow controller that enable operation of the mass flow controller with a process fluid and/or process operating conditions. In particular, the configuration data 712 obtained during a production step 710 is used to determine control parameters that facilitate the configuration of the mass flow controller with a process fluid and process operating conditions, such that the mass flow controller exhibits a satisfactory response (i.e., the mass flow controller is configured to have substantially the same response with the process fluid and/or process operating conditions as that observed during production using the test fluid and test operating conditions).

The term control parameter as used herein refers generally to parameters associated with the mass flow controller that facilitate the operation of the mass flow controller. Control parameters may include, but are not limited to, filter coefficients, gain terms, controller constants, linearization curves etc. In particular, control parameters refer to parameters that may need change, modification, or addition when a mass flow controller is configured for operation with an arbitrary process fluid and/or process operating conditions (i.e., configured to exhibit a satisfactory response).

As used herein, the phrase "configured for operation" is intended to describe configuring a mass flow controller in such a way that when operated, the mass flow controller exhibits a satisfactory response (i.e., mass flow controllers having unsatisfactory responses are not generally considered operational).

It should be appreciated that, in general, production 710 need only be done once and with a single test fluid and a set of test operating conditions. However, configuration 720 may be repeated any number of times during the lifetime of a mass flow controller. In particular, whenever it is desirable to operate the mass flow controller with a different process fluid and/or operating conditions, it may be desirable to repeat configuration 720 with the new process fluid and/or process operating conditions such that the mass flow controller exhibits a satisfactory response with the new process fluid and/or process operating conditions.

It should be further appreciated that production and configuration of different types of mass flow controllers and different mass flow controller implementations may require different steps. However, production should include steps such that the mass flow controller has been properly characterized and a satisfactory response established for operation with a set of test operating conditions, and that sufficient configuration data has been obtained to facilitate subsequent configuration of the mass flow controller. Likewise, configuration in general should include steps necessary to establish substantially the same response when operating with a set of process operating conditions as that observed during production.

Figure 7B:
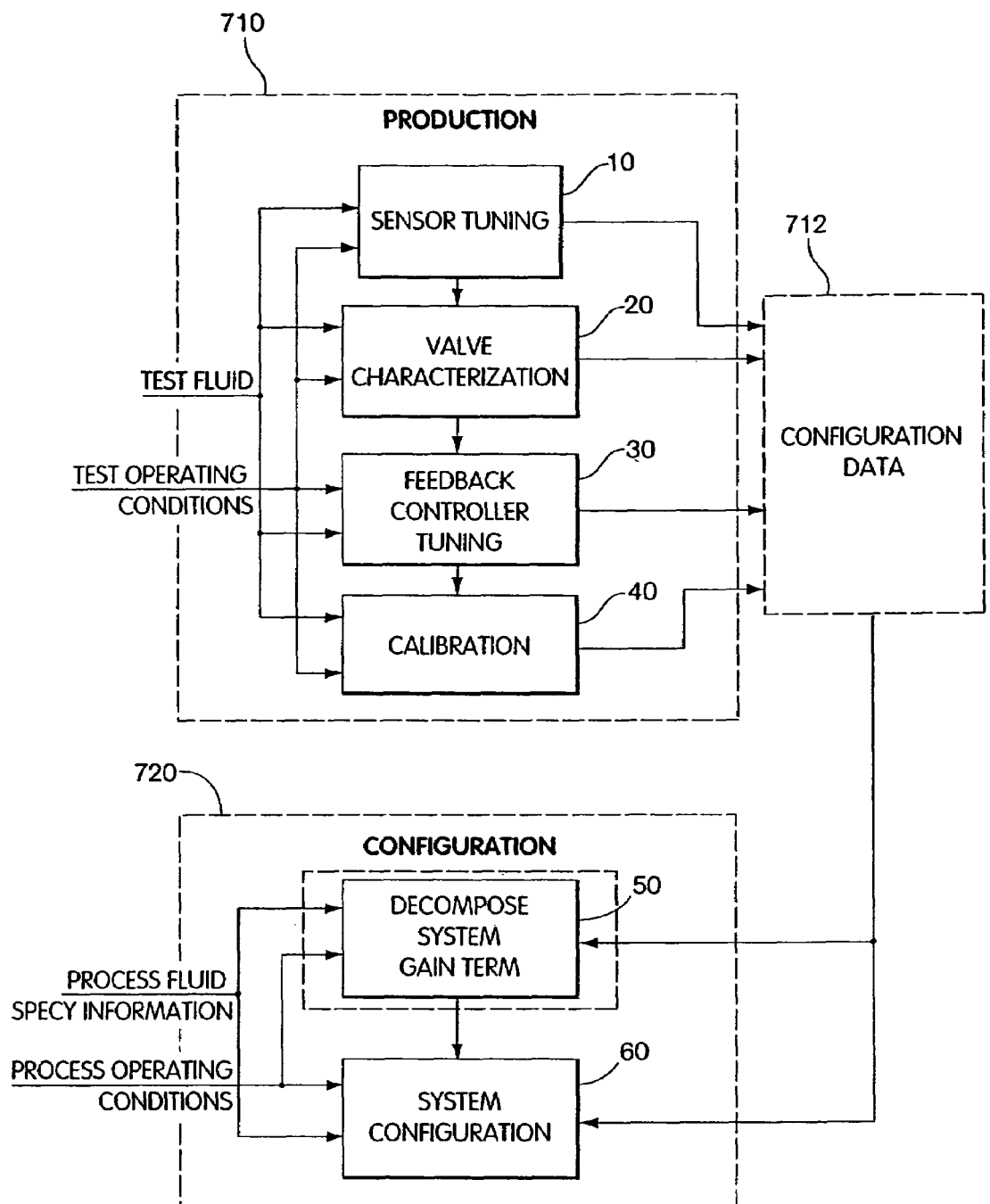

FIG. 7b illustrates a block diagram according to one embodiment that includes various steps that may be performed during the production and the configuration (e.g. steps 710 and 720 in FIG. 7a) of a mass flow controller. Production 710 may include a sensor tuning step 10, a valve characterization step 20, a feedback controller tuning step 30, and a calibration step 40. It should be appreciated that production 710 may include other steps that are not shown in production 710, for example, steps involved with building the mass flow controller, such as bypass matching etc., that are known in the art.

In the various exemplary steps 10–40 of production 710, the mass flow controller is characterized and a satisfactory response is established on a set of test operating conditions. Configuration data is obtained during production that facilitates configuration of the mass flow controller for operation with a set of process operating conditions, as describe further in detail below.

In sensor tuning step 10, the flow meter of a mass flow controller is tuned such that it exhibits a satisfactory dynamic response. In particular, the various components of the flow meter are tuned such that the sensor output (e.g. FS1") responds satisfactorily to changes in flow through the sensor. For example, as discussed in connection with FIG. 2, sensor tuning may include providing normalization and response compensation filter coefficients, correction curves, and/or gains such that the flow meter responds to fluid steps with a sensor output having a step shape that closely resembles the step changes in fluid flow in the flow path. In addition, the compensation filter 280 may be tuned to provide a false flow signal that closely approximates the sensor and sensor electronics response to pressure transients. Information obtained during tuning step 10, such as filter coefficients, correction curves and/or gain terms may be stored as configuration data 712.

According to on embodiment, the mass flow controller includes at least one digital filter. This digital filter can be programmed to implement a compensation filter to compensate for false flow indications resulting from pressure transients (e.g., compensation filter 280 described in FIGS. 8 and 12).

In particular, the filter's transform function(s) (e.g., Equations 6 and/or 7) can be implemented during sensor tuning step 10 by programming the digital filter as follows:

$$J_0 = (2J_{n-1} - J_{n-2}) + [(I - J_{n-1})Q - (J_{n-1} - J_{n-2})]P \qquad (3)$$

With:
$P = 4t\xi\omega_p/(t^2\omega_p^2 + 2t\xi\omega_p + 1)$,
$Q = t(\omega_p/\xi)$, and
$t = T_{sample}/2$.

Where:
$\omega_p$: Pole frequency. Controls rise/fall time and "width of lobe. Also effects height (gain) of lobe.
$\xi$: Damping factor. Controls amount of overshoot. Also effects width and height of lobe.
K: Gain. Sets each of the filter section's portion of the algorithm output. Effects height of response
t: Sampling Period T divided by 2.

The $J_o$ results from taking the bilinear transform of the filter transfer function(s). In particular, the transfer function of Equation 7. The values of P and Q are calculated such that compensation filter constructs a desired false flow signal. Parameters $\omega_p$, $\xi$, and K, referred to herein as modifiable parameters can be varied in order to tune the filter to provide a false flow signal suitable to compensate for false flow information superimposed on a sensor output signal.

One method of tuning these parameters during production is described below. During production pressure pulses are introduced to the sensor and a response of the sensor is recorded. In addition, the response of a pressure transducer to the pulses is also recorded. The modifiable parameters are then adjusted to fit the output of the filter to the recorded response of the sensor. For example, a least-squares fit may be used to minimize the error between the filter output and the recorded sensor response.

Various optimization methods will occur to those skilled in the art that can be used to adjust filter parameters without departing from the scope of the invention. The method described herein is one of method that performs a least-squares fit.

A set of default parameters is chosen for the filter. For the purpose of this example, the compensation filter to be tuned is similar to that described in connection with FIG. 8. As such, each of the six second order filters will have three modifiable parameters to tune, for a total of eighteen parameters. An exemplary set of default parameters is shown below.

| Parameter | Filter 1 | Filter 2 | Filter 3 | Filter 4 | Filter 5 | Filter 6 |
|---|---|---|---|---|---|---|
| K (no units) | 0 | 0 | .295 | .225 | .11 | .2 |
| $\omega_p$ (rad/sec) | 600 | 200 | 63 | 63 | 30 | 2 |
| $\xi$ (no units) | 1 | 1 | .56 | .79 | 1 | 1 |

The pressure readings from the pressure transducer corresponding to the pressure pulses introduced to the sensor are input to the default compensation filter to having the default parameters to provide a default waveform. A matrix W is then generated to store information related to how the default waveform varies with respect to changes in the modifiable parameters. The matrix W is generated by individually varying the modifiable parameters by some $\Delta$ (e.g., by 1% of the default values) and generating waveforms from the filter with the varied parameters. Each of these waveforms is then subtracted from the default waveform to produce a difference waveform. As such, 18 difference waveforms are provided for tuning the filter described in FIG. 8. These difference waveforms are each stored as an entry in the matrix W providing a matrix having M×N dimensions where N is the number of modifiable parameters and M is the number of samples taken from the filter output. Therefore the matrix contains information describing each parameters effect of the filter output.

As is well known in the art, optimization of 18 parameters may be computationally expensive. As such, the number of modifiable parameters has been reduced by recognizing the significance of the contribution of each parameter. The actual reduction of parameters may vary depending on the implementation and desired characteristics and control of the filter output.

Filter 1 and 2 are primarily used for the delay they provide. As such, the gain terms for these filters may not need to be varied from their default values. Reducing the gain terms to be optimized to $K_3$, $K_4$, $K_5$, and $K_6$. Filters 1, 2, 5 and 6 will always retain a "damping" factor of 1. As such, only $\xi_3$ and $\xi_4$ may need to be optimized. In addition, it may only be necessary to vary $\omega_3$ and to scale the other frequency parameters to reserve the relationship shown in the table illustrating exemplary default values. Accordingly, the number of modifiable parameters that need to be optimized is reduced to $K_3$, $K_4$, $K_5$, $K_6$, $\xi_3$, $\xi_4$, $\omega_3$, making the computational task tractable. The resulting matrix according to this exemplary reduction of parameters results in a M×7 matrix.

As discussed in the foregoing matrix W describes how the filter output changes with respect to changes in the modifiable parameters. From this information a set of changes in the modifiable parameter may be solved for such that satisfies the expression:

$$W^*\text{ParameterDelta}=\text{WaveformError} \quad \text{(Equation 9)}$$

and, $$\text{WaveformError}=(\text{SensorOutput}-\text{DefaultWaveform}) \quad \text{(Equation 10)}$$

Where:
SensorOutput=The output from the sensor due to a pressure pulse
DefaultWaveform=The output of the compensation filter with default parameters
W=The generated difference matrix (M×N)
ParameterDelta (N×1)=A column vector describing a change in each of the N modifiable parameters.

Equation 9 may be true in some best fit sense and may not represent absolute equality. ParameterDelta may be solved for according to any number of methods that will occur to those skilled in the art. The changes to the N modifiable parameters stored in the ParameterDelta vector are then added to the values of the default parameters to provide the final values of the compensation filter to be stored in the digital filter used with the tuned sensor.

ParameterDelta may be solved for by iteration. As such it may be necessary to update the DefaultWaveform after each iteration and to provide a CurrentParameter vector to store the accumulated ParameterDelta values. If n is the iteration then,
CurrentParameter$_0$=Default Parameters
CurrentParameter$_n$=CurrentParameter$_{n-1}$+ParameterDelta$_n$
DefaultWaveform$_n$=Filter output using the values stored in CurrentParameter$_n$
WaveformError$_n$=(SensorOutput−Default Waveform$_n$)

Various methods of tuning the parameters of a compensation filter will occur to those skilled in the art. However, the invention is not limited to the method by which the parameters of the filter are obtained. The various methods and approaches to obtaining a compensation filter are considered to be in within scope of the invention.

In valve characterization step 20, the mass flow controller is characterized sufficiently such that it can be configured to operate in a consistent and stable manner in response to changes in various operating conditions and/or characteristics. According to one embodiment, a system gain term of a control loop of the mass flow controller may be determined and a reciprocal of the system gain term determined and applied to the control loop to provide a constant loop gain. In addition, measurements made during the determination of the system gain term may be stored as configuration data and later used during configuration, as discussed further in detail below with respect to FIG. 7c.

In feedback controller tuning step 30, the control and control electronics associated with the feedback controller are tuned such that the mass flow controller exhibits satisfactory dynamic response to changes in set point. According to one embodiment, the various PID parameters discussed in connection with FIG. 4 may be set such that the GLL controller exhibits desirable dynamic characteristics such as settling time, maximum overshoot and undershoot, etc.

In calibration step 40, the mass flow controller is calibrated such that it exhibits satisfactory steady-state response. According to one embodiment, the mass flow controller is calibrated to provide a linear relationship between the actual fluid flow through the mass flow controller and the flow indicated by the flow meter (e.g. flow signal FS2, also called indicated flow) across the range of flow rates with which the mass flow controller was intended to operate.

In the exemplary steps 50 and 60 illustrated in configuration 720, the configuration data obtained during production 710 and information about the process operating conditions with which the mass flow controller is to be configured for operation is used to modify control parameters of the mass flow controller such that the response established during production does not substantially change when operating the mass flow controller with the process operating conditions.

As illustrated in FIG. 7b, configuration 720 of the mass flow controller may include a system gain decomposition step 50, and a system configuration step 60. In the system gain decomposition step 50, a system gain term is obtained and then decomposed into its constituent gain terms based, at least in part, on the configuration data obtained during production 710 of the mass flow controller.

However, system gain decomposition step 50 may not be necessary in some implementations of a mass flow controller and represents only one method by which a model of actuator behavior may be provided to system configuration step 60.

Accordingly, it should be appreciated that in the examples discussed herein, steps involving measurement and subsequent decomposition of a system gain term may be unnecessary under circumstances where gain terms associated with various components of a mass flow controller can be obtained directly. For example, in some mass flow controllers, a stepper actuator may be employed from which the associated gain term may be directly obtained from the mechanical design of the actuator. In such a case, measurement of a system gain during production (e.g. recording CDA' during valve characterization step 20 in FIG. 7c) and decomposition of the system gain term during configuration (e.g. step 50) can be omitted since the information provided by decomposing the system gain term (e.g., gain term C) can be obtained directly from the actuator itself.

The method of obtaining system gain term information during production and decomposing the system gain term during configuration, however, provides a method for configuring a mass flow controller that, in general, may be applied to any implementation of a mass flow controller to provide, for instance, a model of the actuator, where no other may be available, or such information cannot be directly obtained. As such, details of this method have been incorporated into production and configuration steps described in the embodiments illustrated in FIGS. 7c–7f. However, aspects of the invention are not limited to using this method, nor is it limited to mass flow controllers where this method may be necessary.

In the system configuration step 60, control parameters are determined for a process fluid and/or process operating conditions for which the mass flow controller is being configured, such that the mass flow controller exhibits a satisfactory response when operating with the process fluid and/or process operating conditions. According to one embodiment, a reciprocal gain term may be formed from the reciprocal of the product of the individual gain terms associated with various components of the mass flow controller operating with the process operating conditions. The gain terms may be determined from a physical model of the valve and the valve actuator. The reciprocal gain term may be applied to a control loop of the mass flow controller to provide a constant loop gain.

Further details of exemplary production steps and configuration steps are now described in connection with FIGS. 7c–7f.

Figure 7C:
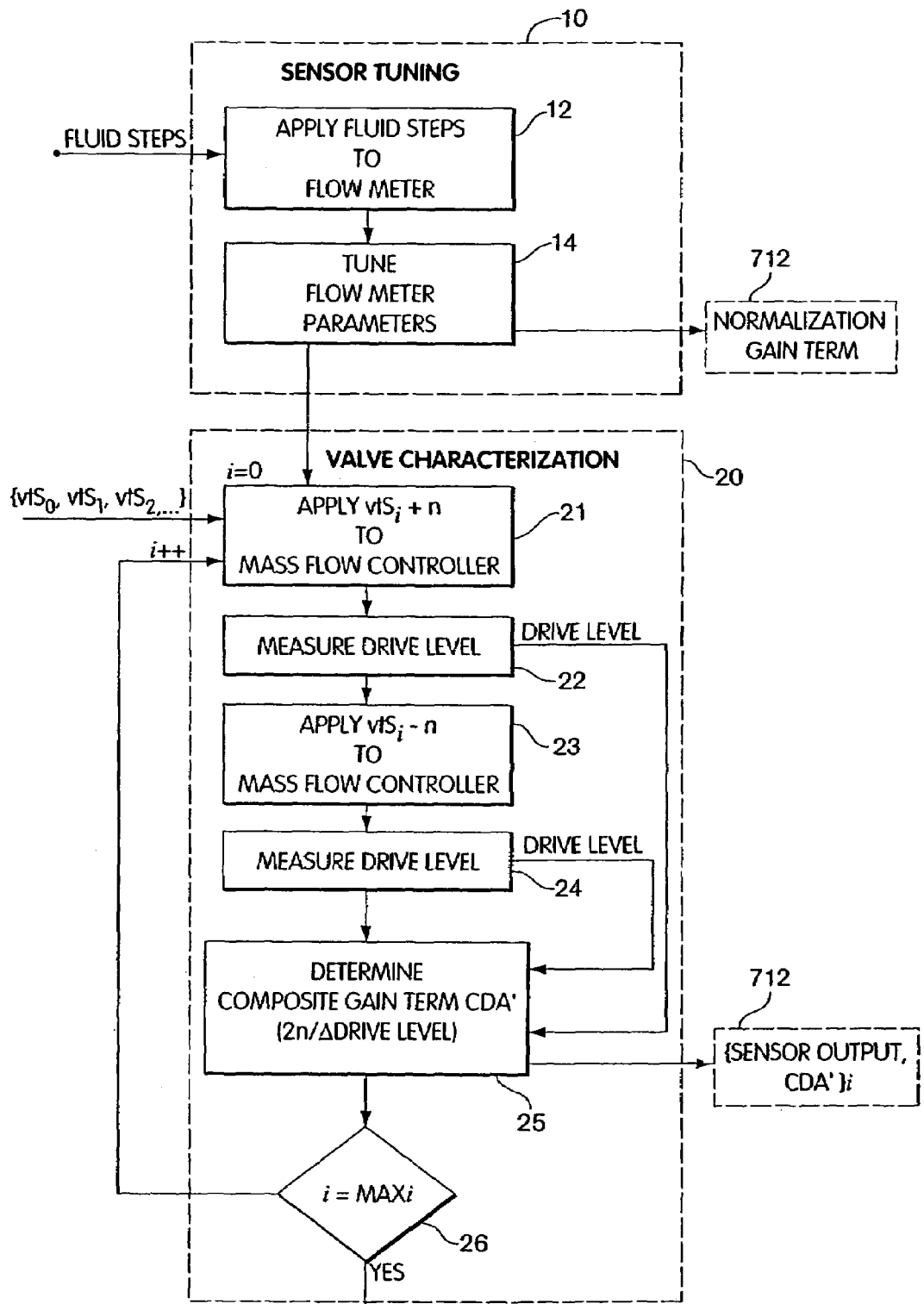
Figure 7D:
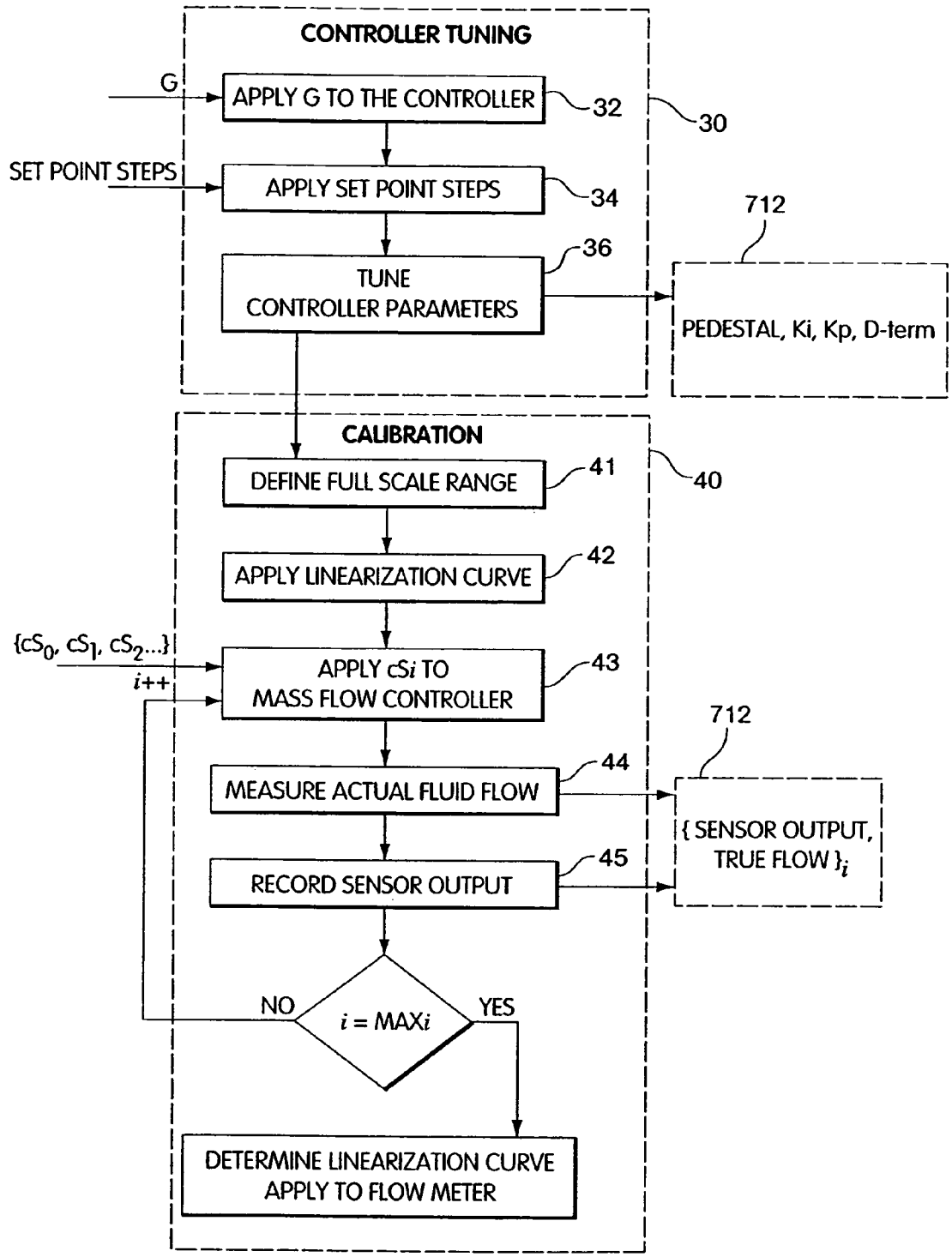

FIGS. 7c and 7d illustrate one exemplary procedure for obtaining configuration data during tuning and/or calibration of a mass flow controller during production.

Figure 7E:
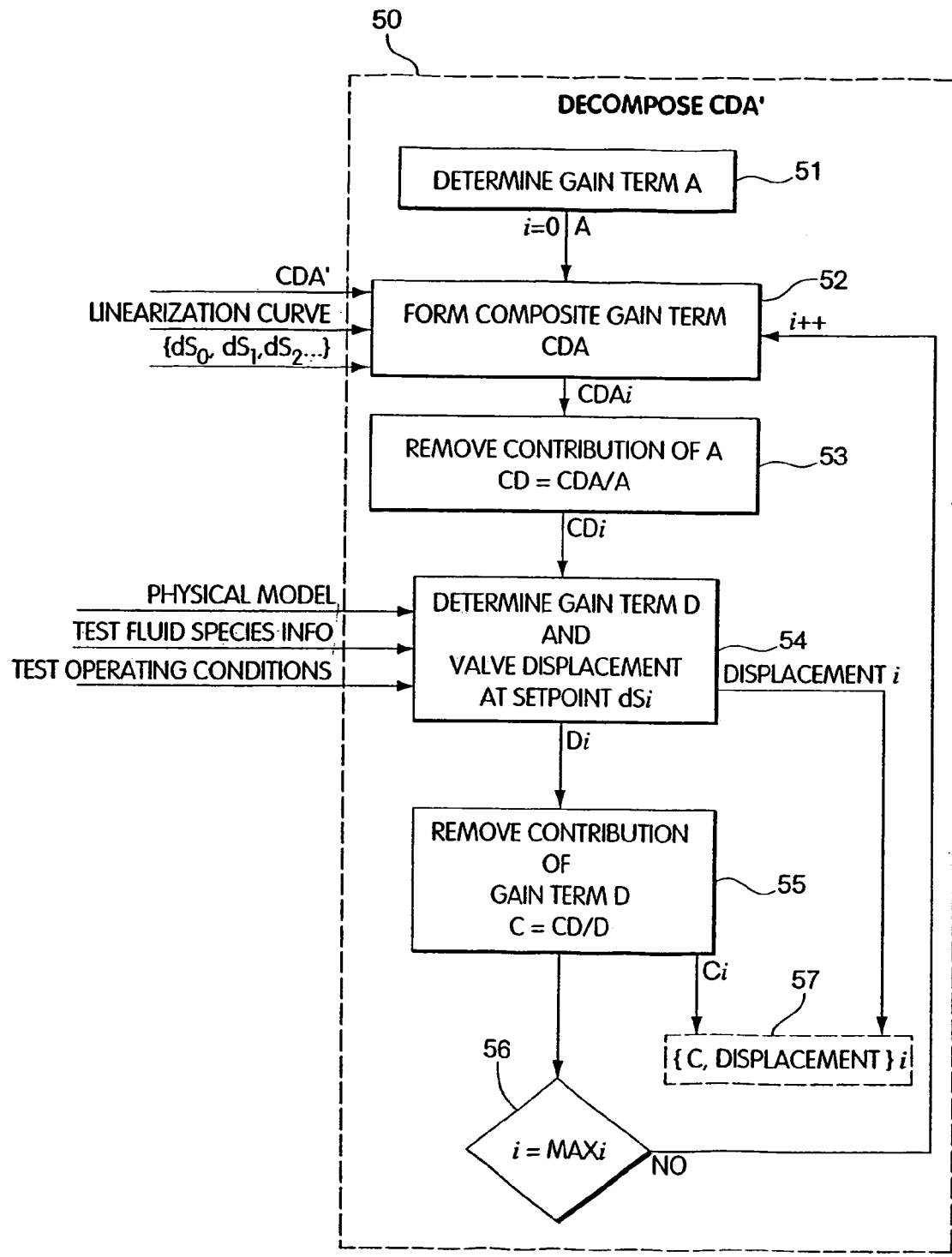
Figure 7F:
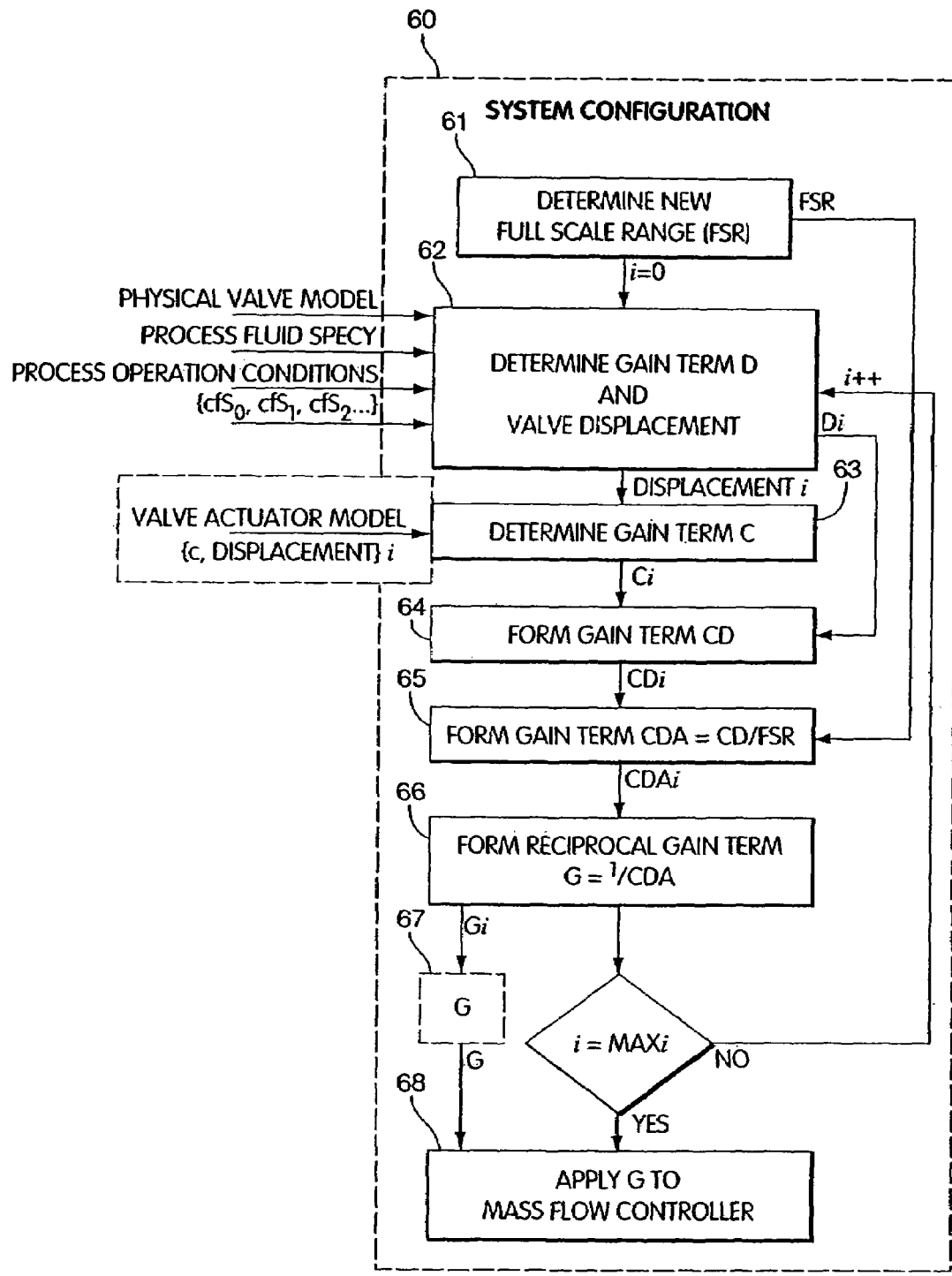

FIGS. 7e and 7f illustrate another exemplary procedure for configuring the mass flow controller to operate on a process fluid and/or process operating conditions different from those with which the mass flow controller was tuned and/or calibrated.

The procedures for production and configuration illustrated in FIGS. 7c–7f may be applied to a mass flow controller similar to that illustrated in FIG. 1. However, it should be appreciated that these aspects of the present invention are not so limited, and may be applied to a variety of mass flow controllers having a variety of different components and operating characteristics.

In FIGS. 7c–7f, exemplary information that may be stored as configuration data during the production of a mass flow controller are illustrated under the heading "Configuration Data" and placed within blocks labeled 712. It should be appreciated that the information illustrated in the drawings is not limiting, nor should it be considered a requirement. Each implementation of a mass flow controller may have a different set of configuration data that facilitates the configuration of the mass flow controller for operation with a process fluid and/or process operating conditions.

FIG. 7c illustrates further details of a sensor tuning step 10 and a valve characterization step 20 according to one embodiment of the present invention. In sensor tuning step 10, the flow meter of a mass flow controller is tuned such that it exhibits satisfactory dynamic response, for example, to a fluid step. A fluid step refers to a change in fluid flow having the characteristics of a step function, including both positive and negative steps in fluid flow.

In step 12, fluid steps are applied to the flow sensor. The flow sensor is then tuned in step 14, such that in response to a fluid step, a step-shaped flow signal is provided. Desirable characteristics of this step-shaped flow signal may include rise time, settling time, maximum overshoot and undershoot, etc. For example, referring back to the mass flow controller described with respect to FIGS. 1 and 2, the step of tuning the flow sensor may include tuning of sensor and sensor electronics 230, normalization 240, and response compensation 250. For example, the filter coefficients of the response compensation filter 250 may be tuned to reshape the signal as shown in FIG. 3. It should be appreciated that in general, each implementation of a mass flow controller may have a different set of parameters that may be tuned. However, the intent of the sensor tuning process 10 is to ensure that the flow sensor exhibits satisfactory dynamic characteristics. As shown in FIG. 7c, the normalization gain associated with providing a sensor output of 1.0 for full scale flow through the sensor conduit may be recorded as configuration data.

In the valve characterization process 20, a test fluid is provided to the mass flow controller at different set points of a set of selected set points at a known inlet and outlet pressure. At each set point the resulting drive level is recorded. The term drive level describes the value of the drive signal provided to the valve actuator. For instance, the drive level may be the measured value of an electrical current or a voltage potential. The drive level may also be the value of a digital control signal that may be converted into an electrical signal to control the mechanical displacement of the valve. Signal DS in FIG. 1 is an example of a drive signal, the value of which is the drive level.

In one embodiment, a GLL controller that has not been tuned, but that is known to converge, is used during this step. Accordingly, each set point in the set of selected set points will converge to the sensor output. In some embodiments, the sensor output and drive level information recorded during this step is used to calculate a composite gain term of the mass flow controller. For example, in valve characterization step 20 of FIG. 7c, a composite gain term CDA' corresponding to the product of the gain terms associated with the valve actuator 160, the valve 170, and the flow meter 110 is calculated from information obtained during the characterization of the valve.

In step 21, a series of set points from a selected set of set points is provided to the mass flow controller. The set of selected set points may be chosen in any suitable manner. For example, in one embodiment, the set of selected set points are various fractions of full-scale flow that account, at some level, for the range with which the mass flow controller is intended to operate. The selected set points need not be evenly spaced out across the range of values. In addition, any number of set points may be selected. In general, the number of set points selected should be sufficient to adequately characterize the valve actuator over the range with which the mass flow controller was intended to operate.

Each of the various selected sets of set points illustrated in FIGS. 7c–7f need not be identical to one another. In order to illustrate that the set points need not be the same in each set, the subscripts vt, cb, and cf, for example, have been used to indicate set points chosen for the valve characterization, calibration, and configuration steps, respectively. However, it should be appreciated that these sets may be in part or entirely the same.

In step 21, a first set point $_{vt}S_0$ is chosen from a selected set of set points $\{_{vt}S_0, _{vt}S_1, _{vt}S_2, \ldots\}$. A small deviation n is chosen as an offset to the set points $_{vt}S_1$. Then, $_{vt}S_0+n$ is applied to the controller and the controller is allowed to converge. When the controller converges, sensor output will equal the applied set point. In step 22, the resulting drive level is recorded for set point $_{vt}S_1$.

In step 23, $_{vt}S_0-n$ is applied to the controller and allowed to converge. The resulting drive level is again recorded as shown in step 24. In step 25, a composite gain term CDA' is determined. For example, the composite gain term may be determined by taking a change in the two set points (i.e., 2n) and dividing the change by a change in the drive levels recorded in steps 22 and 24. This ratio represents the composite gain term CDA' for set point $_{vt}S_0$. Gain terms C and D, as described in the foregoing, are associated with the valve actuator and valve respectively. Gain term A' is associated with the flow meter and represents the gain of the flow meter without the contribution of linearization 260 (i.e., the gain associated with sensor output). The sensor output value to which the mass flow controller converged for each set point $_{vt}S_1$, and the composite gain term CDA' determined at that set point may be stored as configuration data.

Steps 21–25 are repeated for each of the set points $_{vt}S_i$ in the set of selected set points. The result is a set of point pairs $\{\text{sensor output}, CDA'\}_i$. In one embodiment, the set of point pairs $\{\text{sensor output}, CDA'\}_i$ is recorded as configuration data for the manual tuning of the mass flow controller. In addition, for each CDA' recorded in step 20, a reciprocal gain term G=1/CDA' may be formed. This reciprocal gain term G may be provided to the controller in the succeeding controller tuning step to provide stability to the controller.

In the feedback controller tuning step 30, the various parameters associated with the feedback controller of the mass flow controller are tuned to provide satisfactory dynamic response to a series of fluid steps provided to the mass flow controller. It should be appreciated that each implementation of a mass flow controller may have a different method of control (e.g., GLL, PID, ID, etc.). One exemplary procedure for tuning a feedback controller of a mass flow controller is now described with respect to the GLL controller depicted in FIG. 4.

In step 32, the reciprocal gain term G formed from the measurements made in step is applied to the GLL controller. In step 34, fluid steps are provided to the mass flow controller by stepping the set point. For example, $SI_2$ in FIG. 1 is modified by a set of different changes in set points $\Delta S_i$. The different $\Delta S_i$ may be chosen such that the controller is tuned appropriately for large step changes (e.g., a $\Delta S_i$ of 100% of full scale flow) and small step changes (e.g., a $\Delta S_i$ of 5% of the full scale flow). The number and magnitude of the various $\Delta S_i$ may differ for each implementation and according to the differing operating requirements of a particular mass flow controller implementation.

In step 36, the various parameters of the GLL controller are set such that the GLL controller responds satisfactorily to the different changes in set point as defined by the various $\Delta S_i$. For example, parameters including the PID constants $K_p$, $K_i$, etc., may be tuned to provide a desired response to changes in set point. Various characteristics of the controller that may be tuned include, but are not limited to, rise time, maximum overshoot/undershoot, settling time, etc.

In calibration step 40, having tuned the sensor and controller for a desired dynamic response, and having obtained the composite gain CDA' for various set points, the mass flow controller undergoes a calibration step to ensure that the mass flow controller has a satisfactory steady-state response. The mass flow controller is calibrated, in part, such that the relationship between actual fluid flow and indicated flow is linear. In addition, configuration data may be obtained that facilitates the configuration of the mass flow controller on a process fluid and/or process operating conditions as described in calibration step 40 of FIG. 7b.

In step 41 of calibration step 40, a full scale range is defined for the mass flow controller. According to one embodiment, the actual fluid flow is measured corresponding to a sensor output of 1.0. An approximate linearization curve is provided such that at the defined full scale flow, indicated flow will have a value at or near 1.0. The approximate linearization curve is then applied to the flow meter 110. It should be appreciated that the values of 1.0 for maximum sensor output and indicated flow are exemplary and may be replaced with any desired number.

In step 43, a first set point $_{cb}S_0$ is chosen from a set of selected set points $\{_{cb}S_0, _{cb}S_1, _{cb}S_2, \ldots\}$ and applied to the mass flow controller. The actual fluid flow in the flow path (e.g., flow path 103) resulting from the set point is then measured. Corresponding to each set point, the sensor output and actual fluid flow are recorded. It should be appreciated that fractional flow (i.e. actual fluid flow divided by the full scale range associated with the test fluid) may be recorded instead of actual fluid flow if more convenient, and that the relevant information is present in both representations. Steps 41 and 43 are then repeated for each of the sets points $_{cb}S_i$ in the set of selected set points, resulting in a set of point pairs {sensor output, actual fluid flow}$_i$ that may be stored as configuration data as illustrated in step 44 and 45.

The relationship between the point pairs {sensor output, actual fluid flow}$_i$ describes the non-linearities associated with the sensor and between the proportion of fluid flowing through the sensor conduit and through the mass flow controller at different flow rates. Accordingly, a linearization curve may be determined from these point pairs in order to ensure that the relationship between fluid flow and indicated flow is linear. In one embodiment, a set of points that corrects for the non-linearities associated with point pairs {sensor output, actual fluid flow}$_i$ is determined. A cubic spline is fit to the set of points such that a linearization curve that is continuous and passes through the point (0,0) (i.e., fluid flow=0 and sensor output=0) is provided. In step 46, the linearization curve is applied to the mass flow controller. It should be appreciated that a number of other curve fit methods may alternatively be used, including, but not limited to, piece-wise linear approximation, polynomial approximation, etc.

During steps 10–40, configuration data has been recorded from the various production steps of the mass flow controller on a test fluid and test operating conditions. The configuration data contains information that facilitates configuration of the mass flow controller for operation with a process gas and/or process operating conditions. It should be appreciated that the set of configuration data recorded during a manual tuning of a mass flow controller may differ depending on the particular implementation of the mass flow controller, and may differ from that illustrated in FIGS. 7c and 7d. Accordingly, configuration data for any particular implementation of a mass flow controller merely describes data obtained during production of a mass flow controller that facilitates the configuration of the mass flow controller for operation with a process fluid and/or process operating conditions.

For example, in the embodiment illustrated in FIGS. 7c and 7d, the configuration data recorded during steps 10–40 includes sensor tuning parameters, the single gain from the sensor tuning step, tuning conditions, calibration conditions, a set of point pairs {sensor output, CDA'}$_i$, a set of point pairs {sensor output, actual fluid flow}$_i$, and a full scale range for the test fluid.

In the valve characterization step 20, the point pairs {sensor output, CDA'}$_i$ were recorded. As discussed above, the composite gain term CDA' is the product of the gain terms associated with the valve actuator, the valve and the flow meter, respectively. However, the individual contributions of gain terms C, D and A' to the composite gain term CDA' are unknown. Also, it is noteworthy that A' is only a portion of the total gain term A associated with the flow meter.

In system gain decomposition 50, the individual gain terms that contribute to the composite gain term CDA' are isolated from the composite gain term in order that they may be determined for a process fluid and/or process operating condition in the succeeding system configuration step 60. However, it should be appreciated that steps 51–56 may not be necessary for certain implementations of a mass flow controller where, for instance, an accurate model of a valve actuator is available, or the gain associated with the actuator for a set of process operating conditions may be directly obtained. As discussed above, system gain decomposition 50 provides a more general method of modeling the behavior of the valve actuator (e.g., a method of obtaining gain term C for a set of process operating conditions.)

In step 51 gain term A is determined. In the previously described embodiment, the flow meter has been tuned and/or calibrated such that 25% of full scale flow results in an indicated flow of 0.25, 50% of full scale flow results in an indicated flow of 0.5, 75% of full scale flow results in an indicated flow of 0.75 etc. The relationship between the fluid flow in the flow path and the indicated flow is linear, hence the gain associated with the flow meter (i.e., gain A) is a constant.

Accordingly, gain A can be directly determined in step 51 by dividing indicated flow by fluid flow at any desired point, the simplest being full scale flow and the associated indicated flow of 1 ensured by the linearization curve. Thus, in embodiments wherein the maximum indicated flow is unity, gain A is equal to the reciprocal of full scale range (i.e., the value of full scale flow through the mass flow controller for a particular fluid species). In general, gain A is equal to the maximum indicated flow value divided by the full scale range associated with a particular fluid species.

In step 52, composite gain term CDA is formed. Gain term A' is the gain associated with the flow meter without the contribution of the linearization curve while gain term A is a gain associated with the flow meter including the linearization curve. Therefore, the relationship between A' and A is by definition the linearization curve. Hence, the composite gain term CDA can be directly determined by adding in the contribution of the linearization curve, which is to say, by multiplying CDA' by the gain term associated with the linearization curve (e.g., multiplying CDA' by the derivative of the linearization curve). In each iteration of step 52, gain term CDA$_i$ is formed at set point $_dS_i$ and provided to step 53.

In step 53, the contribution of gain term A is removed. Since both the composite gain term CDA and the individual gain term A (the reciprocal of full scale range) are now known, the contribution of gain term A can be divided out from composite gain term CDA, leaving composite gain term CD associated with the valve actuator and the valve. As illustrated in step 53, gain term CD$_i$ is formed at set point $_dS_i$ and provided to step 54.

As discussed in the foregoing, gain C is the change in valve displacement divided by the corresponding change in the drive signal (e.g., DS provided by the GLL controller). Gain D is the change in fluid flow divided by the corresponding change in valve displacement.

In step 54, gain term D is determined and valve displacement is calculated at a selected set of set points. In order to further differentiate composite gain term CD, a physical model of the valve is employed to determine the valve displacement necessary to achieve a particular fluid flow under a particular set of operating conditions (i.e., to determine gain D). One physical model of the valve that may be used to make this determination is illustrated and described in Section D. below, entitled "Physical Valve Model". It should be appreciated that different valves and valve types may have different physical models. Furthermore, there may be more than one physical model that may be used to model the characteristics of any particular valve. Accordingly, the present invention is not limited to any particular valve model.

In one embodiment, gain D is determined by calculating the valve displacement necessary to achieve each fluid flow represented by a set of selected set points {$_dS_0$, $_dS_1$, $_dS_2$, . . . }. A deviation n may be chosen and the gain term D determined by calculating the valve displacement at $_dS_i$−n and $_dS_i$+n and forming the ratio of change in set point to change in valve displacement (e.g., 2n/Δdisplacement). Additionally, the displacement at $_dS_i$ may be determined or the values of displacement at $_dS_i$−n and $_dS_i$+n averaged in order to determine a displacements at $_dS_i$. As illustrated, in each iteration of step 54, gain term $D_i$ and the displacements of the valve at set point $_aS_i$ are determined.

In step 55, gain term D is divided out of composite gain term CD, thus isolating gain term C. In addition, a set of point pairs $\{C, \text{displacement}\}_i$ is generated to provide a model of the behavior of the actuator with the set of test operating conditions used during production 710. It is known that gain term C (the gain associated with the valve actuator) is not usually directly dependent on process fluid and/or process operating conditions, though it may be a function of valve displacement. In each iteration of step 55, the gain term $C_i$ is formed by removing the contribution of gain term $D_i$ for displacement calculated at set point $_aS_i$ and stored in the set $\{C, \text{displacement}\}_i$.

Steps 52–55 are repeated for each of the selected set points $_aS_i$ such that a set of points pairs $\{C, \text{displacement}\}_i$ is generated that provides information about the behavior of the valve actuator under the set of test operating conditions to the succeeding configuration step.

In system configuration step 60, control parameters are determined for a process fluid and/or process operating conditions. The physical model considers fluid species, inlet and outlet pressure, temperature, etc. Accordingly, gain D can be calculated for a process fluid and/or process operating conditions by providing the fluid species information and process operating conditions to the physical model and calculating the displacements necessary to achieve the various representative fluid flow values. From the displacements determined from the physical model of the valve and model of the behavior of the valve actuator, gain term C may be calculated for the process fluid and/or process operating conditions. In one embodiment, the model of the behavior of the actuator is the point pairs $\{C, \text{displacement}\}_i$ generated in system gain decomposition step 50. However, in embodiments where the behavior of the valve is known or can be directly measured, gain C can be directly determined from the valve. Thus, having obtained both gain terms C and D, the composite gain term CD may be formed. Subsequently, gain A can be calculated by determining a full scale range for the process fluid. Accordingly, the system gain term CDA can be determined for the process fluid and/or process operating conditions.

The reciprocal of the system gain term may be formed and applied to a control loop of a GLL controller (e.g., gain term G). It should be appreciated that G may be a function of one or more operating conditions of the mass flow controller, such as set point, inlet and/or outlet pressure, temperature, etc. Reciprocal gain term G may be applied to the GLL controller such that the control loop of the mass flow controller has a constant loop gain with respect to at least the one or more operating conditions of which G is a function. Hence, the mass flow controller has been configured to operate on a process fluid and/or process operating conditions, as discussed further in detail below.

In step 61, a full scale range associated with a process fluid with which the mass flow controller is to be configured is determined. One method of determining full scale range is to calculate a conversion factor based on the specific heat ratios of the process fluid and the test fluid times the full scale range associated with the test fluid. It should be appreciated that other methods may be appropriate for calculating a full scale range associated with a particular process fluid. For example, the full scale range associated with a particular process fluid may be directly measured if appropriate.

In step 62, gain term D is determined for a process fluid and/or process operating conditions from a physical model of the valve by applying process fluid species information and/or process operating conditions to the physical model and calculating the displacement necessary to achieve a set of representative flow values $\{_{cf}S_0, _{cf}S_1, _{cf}S_2, \ldots \}$. As discussed above, gain D may be determined by choosing a deviation n and calculating the valve displacement at $_{cf}S_i - n$ and $_{cf}S_i + n$ and forming the ratio of change in set point to change in valve displacement (e.g., $2n/\Delta\text{displacement}$). Additionally, the displacement at $_{cf}S_i$ may be determined or the values of displacement at $_{cf}S_i - n$ and $_{cf}S_i + n$ averaged in order to determine a displacements at $_{cf}S_i$. Accordingly, in each iteration of step 62, gain term $D_i$ and displacement$_i$ of the valve at set point $_{cf}S_i$ are determined for the process fluid and/or process operating conditions.

In step 63, gain term C is determined for a process fluid and/or process operating conditions. In some embodiments of the present invention gain C may be directly measured from the actuator itself. Alternatively, gain term C may be determined from the information stored in the point pairs $\{C, \text{displacement}\}_i$ generated in system gain decomposition step 50. In either case, in each iteration of step 63, $C_i$ is determined at displacements corresponding to set point $_{cf}S_i$ for the process fluid and/or operating conditions.

In step 64, gain term D is multiplied with gain term C to produce composite gain term CD. As illustrated, in each iteration of step 64, the product of gain term $C_i$ from step 53 and gain term $D_i$ from step 52 is taken to form composite gain term $CD_i$ at set point $_{cf}S_i$.

In step 65, the contribution of gain term A is removed. Since gain term A is simply the reciprocal of full scale range, composite gain term CD can be divided by the process full scale range associated with the process fluid to form system gain term CDA. As illustrated, in each iteration of step 65, composite gain term $CD_i$ is divided by the full scale range to form system gain term $CDA_i$ at set point $_{cf}S_i$.

In step 66, the reciprocal of system gain term CDA is calculated to form reciprocal gain term G. As illustrated, in each iteration of step 66, the reciprocal $CDA_i$ is formed and the resulting $G_i$ at set point $_{cf}S_i$ is provided to block 67 to form reciprocal gain term G. It should be appreciated that gain term G may be represented by any number of techniques. For example, a curve may be fit to the points $G_i$, the points $G_i$ may be stored in a look-up table, or gain term G may be represented in any manner discussed above in connection with the definition of a gain term, or otherwise. In addition, gain term G may be a function of one or more operating conditions. In the embodiment illustrated in FIG. 7f, gain term G is a function of set point. However, gain G may additionally be a function of more than one operating condition depending on the needs of a particular implementation of a mass flow controller.

Steps 62–66 are repeated for each of the selected set points $\{_{cf}S_0, _{cf}S_1, _{cf}S_2, \ldots \}$ in order to determine reciprocal gain term G for the process fluid and/or process operating conditions with which the mass flow controller is being configured to operate.

In step 68 reciprocal gain term G is applied to a control loop of the mass flow controller to provide a constant loop gain with respect to at least set point. In general, gain term G will provide a constant loop gain with respect to at least the operating conditions for which it is a function.

It should be appreciated that by determining the system gain of the mass flow controller based on information for the process fluid and/or process operating conditions, and by applying a reciprocal gain term of the system gain to a control loop of the mass flow controller, the mass flow controller has been configured for operation with the process fluid and/or process operating conditions. In other words, the mass flow controller will exhibit the same response observed after production of the mass flow controller with a test fluid and test operating conditions when operating with the process fluid and/or process operating conditions, that is to say, the mass flow controller, when operating with the process fluid and/or process operating conditions, will exhibit a satisfactory response.

It should be appreciated that the process of configuring a mass flow controller may be automated through the use of a computer. For example, steps 50 and 60 may be controlled entirely by a program stored in memory and executed on a processor of a computer, such as a personal computer. Hence, a mass flow controller may be automatically configured for operation with arbitrary process fluids and/or process operating conditions.

The term automatic or automatically as used herein applies generally to a state of being enacted primarily by or under the control of a computer or processor. In particular, automatic tasks, steps, processes, and/or procedures do not require extensive operator involvement or supervision. Accordingly, an automatic configuration of a mass flow controller describes a configuration of a mass flow controller for operation with a process fluid and/or process operating conditions that does not require manual involvement. Configuration of a mass flow controller under the control of a computer program is to be considered an automatic configuration.

It should be appreciated that routine tasks such as connecting a mass flow controller to a computer or processor, initiating the execution of a program, etc. are, in general, done manually. However, such tasks are considered routine and may be part of an automatic configuration of a mass flow controller.

Figure 14:
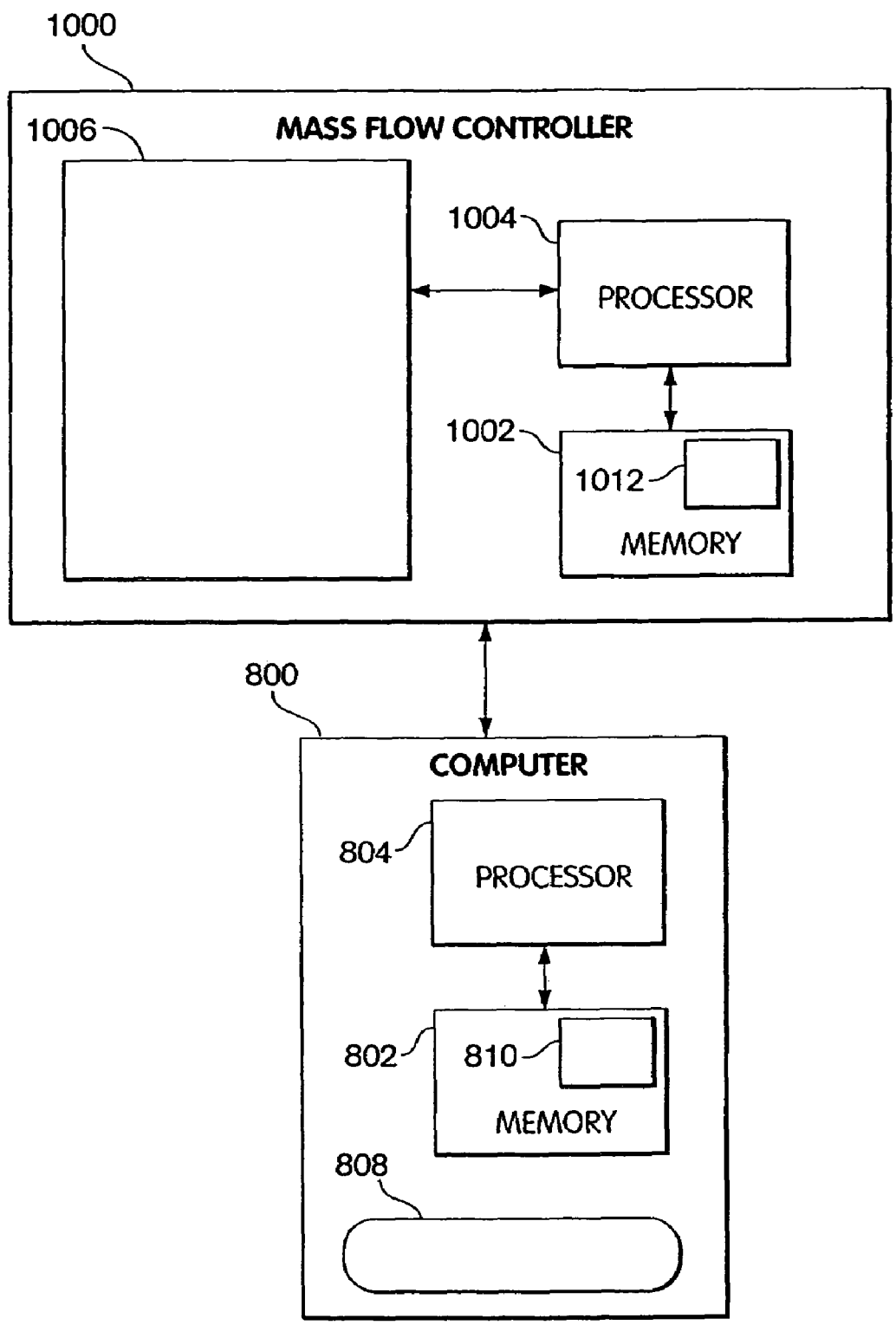
FIG. 14 illustrates a system that facilitates automatic configuration of a mass flow controller according to one embodiment of the invention.

FIG. 14 illustrates a system that facilitates automatic configuration of a mass flow controller on arbitrary process fluids and/or process operating conditions. The system includes a mass flow controller 1000 and a computer 800.

The mass flow controller 1000 includes a memory 1002, a processor 1004, and the various components of the mass flow controller 1006 illustrated and described with respect to FIG. 1. The processor is coupled to the memory and may be connected to at least some of the components of the mass flow controller. As described above, operation of a mass flow controller may be implemented under the control of a processor, such that the GLL controller 150 is implemented by the processor 1004. The mass flow controller 100 further includes configuration data 1012 obtained during production of the mass flow controller and stored in memory 1002.

The computer 800 includes a memory 802, a processor 804, an input device, and a program 810 stored in memory 802. The program 810 includes instructions, that when executed on processor 804, carry out various steps involved in configuring a mass flow controller for operation on a process fluid and/or process operating conditions (e.g., step 712 in FIG. 7a, steps 60 and 70 in FIGS. 7b, 7e, and 7f, etc.).

It should be appreciated that computer 800 may be any of a number of computing devices known in the art. For example, computer 800 may be a personal computer, a laptop, a hand held device, or any other computing device capable of executing a program. Furthermore, computer 800 may be connected to and communicate with the mass flow controller in any number of ways known in the art. For example, computer 800 may be connected via a cable using any number of standard communication methods including, but not limited to, standard parallel port communication, serial port communication, Universal Serial Bus (USB), etc. Alternatively, the computer 800 may have a wireless connection with the mass flow controller. Accordingly, it should be appreciated that the present invention is not limited to a particular type of computing device, input device, connection type, or communication method, as a variety of types of computing devices, connection types, and communication methods may suitably be used.

According to one embodiment of the present invention, the computer 800 may be connected to the mass flow controller in order to configure the mass flow controller on a process fluid and/or process operating condition. The program 810 may then be executed on processor 804. Configuration input may be provided to the input device 808. The configuration input may include, but is not limited to, process fluid species information, process operating conditions, and/or other information relevant to the configuring of the mass flow controller. The input device may be any of a number of devices capable of receiving information, including, but not limited to, a keyboard or keypad, interface software for receiving input from a mouse, pointer, etc.

The program 810 may then obtain configuration data 1012 stored in memory 1002 of the mass flow controller. From the configuration data and configuration input, program 810 determines control parameters for the mass flow controller that facilitate operation of the mass flow controller with the process fluid and/or process operating conditions. The program 810 may then apply the control parameters to the mass flow controller by either modifying existing control parameters accordingly, or by adding additional control parameters to the mass flow controller. In this manner, the mass flow controller may be automatically configured for operation with the process fluid and/or process operating conditions.

Figure 15:
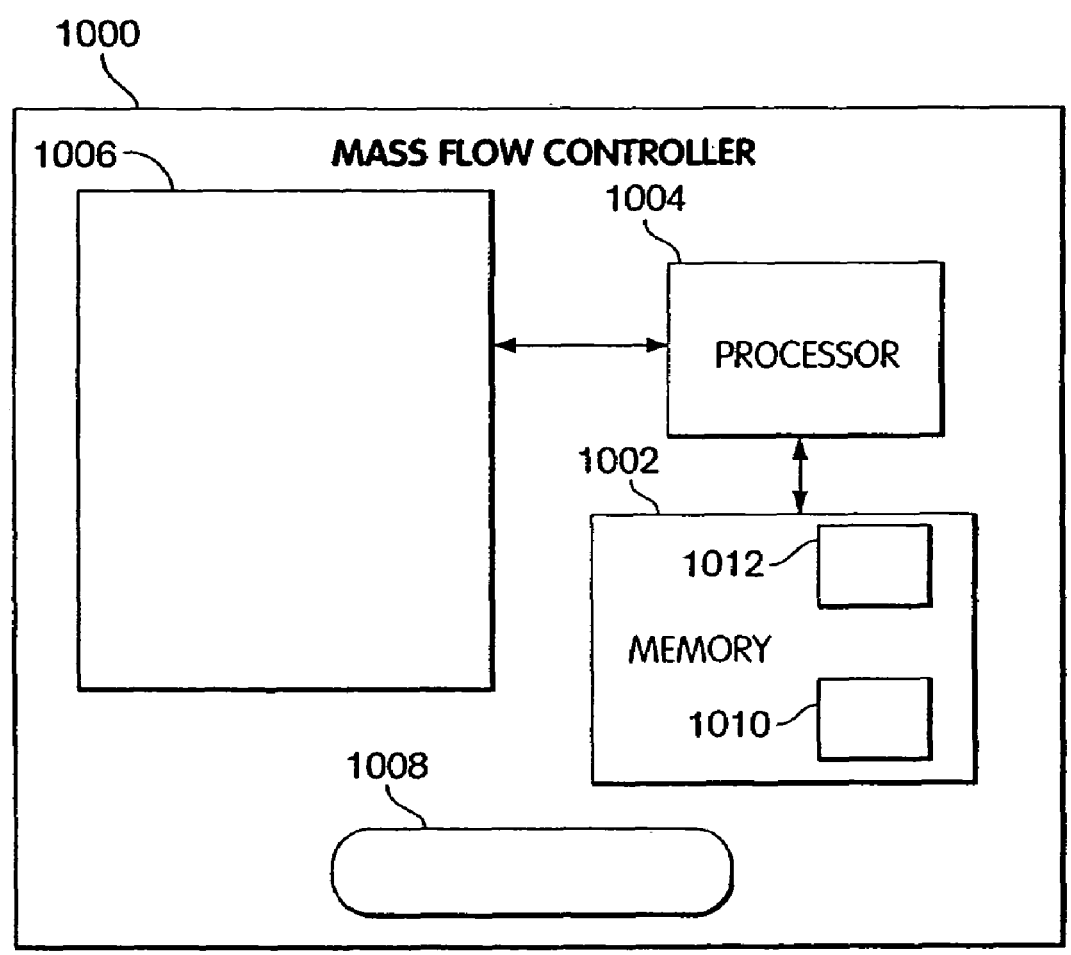
FIG. 15 illustrates another system that facilitates automatic configuration of a mass flow controller according to one embodiment of the invention.

In an alternative embodiment illustrated in FIG. 15, the program 810 may be stored in memory 1002 of the mass flow controller and may be executed on processor 1004 which may also be used to implement the GLL controller 150. An input device 1008 may be added to the mass flow controller to enable the mass flow controller to receive configuration input. Accordingly, the mass flow controller 1000 illustrated in FIG. 15 is auto-configurable.

D. Physical Valve Model

According to another aspect of the present invention, Applicants have physically modeled the flow of fluid at different inlet and outlet pressures as predominately consisting of two components: the viscous pressure drop and the inviscid (dynamic) pressure drop. By summing the contributions of each of these components where the effective displacement of the valve for each component is equal, the effective displacement of the valve may be empirically determined using the following methodology. As noted above, the determination of the effective displacement of the valve at a particular fluid flow rate on a particular fluid enables the gain term associated with the valve (e.g., gain term D) to be determined, and thus the determination of the gain term associated with the valve actuator (e.g., gain term C).

Figure 16:
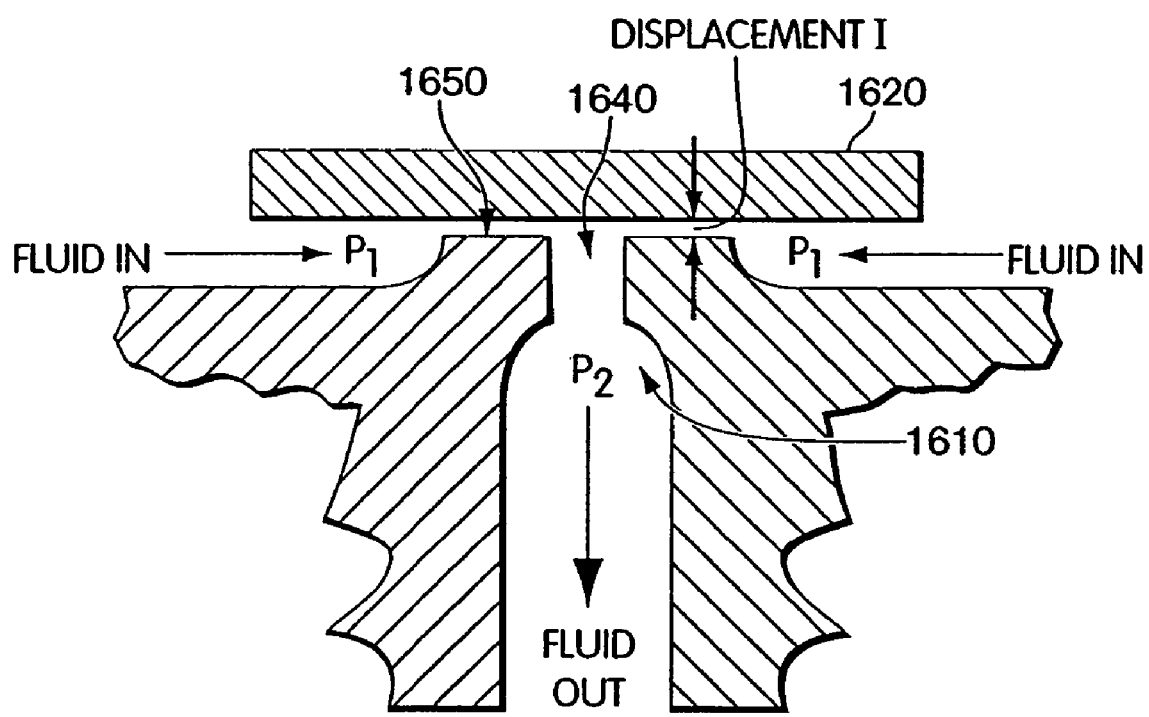
FIG. 16 illustrates a cross-sectional view of a valve.

Referring to FIG. 16, allowing the upstream or inlet pressure to be represented by $P_1$ and the downstream or outlet pressure to be represented by $P_2$, then at a mass flow rate represented by Q, the valve-lift is represented by H, and the viscous effect alone reduces the pressure from $P_1$ to some intermediate pressure $P_x$. The inviscid compressible flow further reduces the pressure from an intermediate pressure $P_x$ to $P_2$. Modeling the viscous pressure drop across the valve 170 based upon a physical model of viscous flow of fluid between two parallel plates (e.g., between the valve seat and the jet surface), the distance H between the two parallel plates (e.g., the displacement of the valve 170) is provided by the following equation:

$$H^3 = \frac{24 \cdot \mu Q L R T}{w(P_1^2 - P_x^2)} \cdot 1.654 \times 10^{-18} \text{ (ft}^3\text{)} \quad \text{(equation 1)}$$

where:

$P_1$, $P_x$: Pressure upstream and downstream of the viscous surface (psi);
Q: Mass flow rate (sccm);
L: length of the flow path (ft);
H: distance between the two parallel surfaces (ft);
w: the breadth of the flow path, w equals $\pi \cdot \phi$, and $\phi$ is the mean diameter of plateau 1650, $\phi$ is equal to 0.040" based upon the tested valve;
μ: dynamic viscosity of the gas (centi-Poise);
T: Absolute temperature (deg. Rankine);
$\hat{R}$: universal gas constant, 1545.33 (ft-lbf/lb-mole-deg. R); and
R: gas constant (ft-lbf/lbm-deg. R).

Modeling the inviscid pressure drop across the valve 170 based upon a physical model of inviscid flow of fluid through an orifice or jet provides $$\frac{Q}{A} = 1.2686 \times 10^6 P_{x,0} \left(\frac{2}{\gamma+1}\right)^{\left(\frac{\gamma+1}{2(\gamma-1)}\right)} \sqrt{\frac{\gamma}{M_w T_{1,0}}} \quad \text{(equation 2)}$$

for choked flow; and:

$$\frac{Q}{A} = 1.2686 \times 10^6 P_{x,0} \left(\frac{P_2}{P_{x,0}}\right)^{\left(\frac{\gamma+1}{2\gamma}\right)} \quad \text{(equation 3)}$$

$$\sqrt{\frac{2\gamma}{(\gamma-1)M_w T_{1,0}} \left\{ \left(\frac{P_{x,0}}{P_2}\right)^{\left(\frac{\gamma-1}{\gamma}\right)} - 1 \right\}}$$

for unchoked flow; where the flow is choked if $$\frac{P_2}{P_{x,0}} \leq \left(\frac{2}{\gamma+1}\right)^{\frac{\gamma}{\gamma-1}} \quad \text{(equation 4)}$$

and unchoked otherwise, and where
Q=flow through the valve (sccm);
A=$\pi \cdot \phi \cdot H$=valve effective area (sq. in,);
$\phi$=diameter of orifice 1640;
$M_w$=gas molecular weight (gm/mol);
$P_{x,0}$=upstream total pressure (torr);
$P_2$=downstream static pressure (torr);
$T_{1,0}$=gas temperature (K);
$\gamma$=ratio of specific heats.

From the above viscous and inviscid equations, the effective displacement (i.e., H) of the valve 170 may be readily determined. Although some of the units used for the above inviscid calculations appear to be different from those used in the viscous calculation, there are no generic difference between the equations and the unit conversion factors were already built into the numerical constants in each equation.

To determine the effective displacement of the valve, assuming the measured mass flow rate to be Q and the measured upstream and downstream pressure to be $P_1$ and $P_2$ respectively, and neglecting the contribution of the velocity head to the total pressure, a method of calculating the effective displacement of the valve 170 may be performed. One exemplary method of calculating the effective displacement is to estimate the intermediate pressure Px by trial-and-error, where one calculates the values of H from both the viscous flow theory (Hv, Eq. 1) and the inviscid theory (Hi, Eq. 2 or 3), depending on whether the flow is choked or not, (Eq. 4). Thus, if the intermediate pressure is approximately twice the outlet pressure, choked flow may be assumed, and equation 2 is used for the inviscid component of the calculation, whereas if the inlet pressure is less than approximately twice the outlet pressure, equation 3 is used for the inviscid component of the calculation. For a given Q, P1, and P2, the correct Px is obtained when Hv and Hi become equal to each other. Thus, the computational scheme involves successive iteration to obtain $P_x$. The calculation begins by choosing $P_x$ to be mid-way between $P_1$ and $P_2$. Then the viscous valve-lift (Hv) and the inviscid valve-lift (Hi) are calculated. If it is determined that Hv is greater than Hi, meaning that there is not enough differential pressure for the viscous flow to deliver the required flow than for the inviscid flow, then during the next iteration a somewhat lower pressure $P_x'$ will be chosen, i.e., between the downstream pressure $P_2$ and the previous pressure $P_x$. The iteration continues until the two calculated valve-lift Hv and Hi come within 0.1% of each other. According to a further aspect of the present invention, this iterative process may be performed in software. The software for performing this iterative calculation may readily be performed by one of ordinary skill in the art and implemented on a computer. Accordingly, based upon the above method, the effective displacement of the valve 170 may be determined for each of a number of different flow rates.

As discussed previously, based upon empirical testing with a variety of different fluids or gases, Applicants have determined how the fractional contribution of the gain A of the mass flow meter changes from one gas to another, as it is primarily dominated by the specific heat of the fluid or gas being used. Accordingly, once the mass flow controller 100 has been calibrated with a known fluid or gas, how this gain changes for other types of gases is known. Further, the fractional contribution of the gain B of the GLL controller 150 is known to the mass flow controller 100, as the various constants that determine this gain may be stored in a memory of the mass flow controller 100, and the fractional contribution of the gain C of the valve actuator 160 is effectively constant or known. Accordingly, what remains is a way of determining how the fractional contribution of the gain D of the valve 170 and gas path changes for different gases and for different operating conditions, and how to compensate for changes in the range of the mass flow controller 100 for a different fluid or gas than that with which the mass flow controller 100 was initially calibrated.

According to a further aspect of the present invention, a method of configuring a mass flow controller that has been tuned at under known conditions and with a known fluid or gas is provided that may be used to tune the mass flow controller to have a nearly identical response on a different fluid or gas, or with a different operating range that that with which it was tuned. As discussed above, mass flow controller 100 is initially tuned on a known gas (for example, Nitrogen) with a known inlet pressure and a known outlet pressure. For simplicity, one embodiment of the present invention selects the known inlet pressure to be greater than two atmospheres and the outlet pressure at ambient. This selection of inlet and outlet pressure is advantageous for two reasons. First, use of inlet and outlet pressures relating to choked flow facilitate the physical modeling of the valve and valve gas path, as only choked flow conditions can be used for the inviscid pressure drop equations. Second, this type of operation (i.e., a pressure drop of approximately two atmospheres) is typical of the type of operation used by end-users. Under these conditions, the gain of the gas path may be defined as:

$$\text{gain} = \frac{(\text{change of gas flow})/(\text{full scale flow range})}{(\text{change of valve drive})/(\text{Max valve drive})} \quad \text{(Equation 5)}$$

To operate this same mass flow controller on gas "x" with a new full-scale flow range, the closed-loop gain of the mass flow controller 100 may be expected to change as follows:

$$\frac{\text{new gain on gas } x}{\text{old gain on } N_2} = \left(\frac{1}{Cfc_x}\right)^{0.4} \left(\frac{Mw_{N2}}{Mw_x}\right)^{0.2} \left(\frac{\text{old } N_2 \text{ range}}{\text{new } N_2 \text{ range}}\right) \quad \text{(equation 6)}$$

where $Cfc_x$=conversion factor "C" for gas x

Mw=molecular weight of gas

The above equation is approximate, as there is an additional term which is a function of inlet pressure, temperature, and the ratio of specific heats. However, the effect of this additional term is to the 0.4 power and can normally be neglected. For example, assuming that the calibration of the mass flow controller 100 was initially performed with Nitrogen as the known fluid or gas, the value of this additional term ranges from 0.684 for Nitrogen and other diatomic gases, up to 0.726 for monatomic gases, and down to 0.628 for polyatomic gases, then raised to the 0.4 power. Thus, the difference from Nitrogen is at most about 3.5% and may ordinarily be neglected. To compensate for the above change in gain with a different gas and or different operating conditions than those used in calibration, the gain term G may be changed by the inverse of the above ratio to provide a constant closed-loop gain for the mass flow controller, irrespective of set point, irrespective of operating conditions, and irrespective of the type of fluid or gas that is used. That is, if the closed-loop gain of the mass flow controller is A*B*C*D, then the gain term G is set to a constant time 1/(A*C*D) to provide a constant closed-loop gain that is the same as that used during calibration.

E. Force Valve Model

One suitable force model will be described in connection with a valve using a free floating plunger as illustrated in FIG. 10. The position of the plunger 1020 which is controlled by a balance of several forces. The first force is a spring force that attempts to restore the plunger to its reset position. A second force is a magnetic force from the solenoid which attempts to move the plunger away from its rest position, under control of the electronics. A third force is a pressure differential between the back of the plunger and the face of the plunger, over the jet orifice and plateau, that attempts to force the plunger toward (for forward flow valves) or away from (for reversed flow valves) the jet. A fourth force is a flow dependent pressure differential between the back of the plunger and the face of the plunger outside the jet plateau area. This effect can be adequately controlled by the jet design.

The magnetic force on the plunger depends on the valve mechanics (structure and materials), the valve drive current, and the valve displacement. At zero pressure drop, the relationship between drive current and displacement can be calculated. This can be done by utilizing a magnetic model of a nominal valve. It should be appreciated that the relationship between drive current and displacement could also be calculated from valve gain measurements at specified fluid flows, or it could be measured directly by a laser interferometer peering up through the jet.

At any given displacement and drive current, the derivative of magnetic force with respect to drive current, dF/dL, can be calculated. This can calculated from a magnetic model of a nominal valve.

Fg(p) is the force exerted on the plunger by a pressure drop p

Fm(d, l) is the force exerted on the plunger by valve drive d at lift l

Fs(l) is the force exerted on the plunger by the spring at lift l

L=valve lift

D=valve drive required at zero pressure drop to provide lift L

Dd=small change in valve drive

D'=valve drive required at pressure drop P to provide lift L

P=pressure drop across the valve

For a given valve, we know (from a magnetic model of the valve):

Fm(D, L)

Fs(L)

At equilibrium and zero pressure drop, we have:

Fm(D, L)+Fs(L)=0

This allows us to calculate L(D) at zero pressure drop.

We wish to have, for any valve lift L:

Fm(D, L)=Fm(D', L)+Fg(P)

We will assume that Fm is linear for small Dd:

Fm(D+Dd, L)=Fm(D, L)+Dd*dFm/dD

This gives us:

Fm(D, L)=Fm(D, L)+Dd*dFm/dD+Fg(P)=>Dd=−Fg(P)/dFm/dD

Since Fg is proportional to P, we can re-write this as:

Dd=Kp*P/(dFm/dD)

This allows us to make plunger position independent of P by running the valve driver from D' instead of D:

D'=D+Kp*P/(dFm/dD)     (Equation 11)

Accordingly, Equation 11 can be used by displacement compensation as described in the foregoing (e.g., displacement compensation as described in FIGS. 9 and 13. In particular, the pressure drop P may be determined from pressure measurements in the valve environment. A pressure signal indicative of the pressure drop may be input to displacement compensation block. The displacement compensation signal may be related to Kp*P/(dFm/dD). For instance, the displacement compensation signal may be a drive level necessary to achieve the displacement as described in Kp*P/(dFm/dD). This displacement compensation signal may then be added to a drive signal issued from a control loop in order to compensate for pressure induced valve displacement.

For example, a mass flow control valve actuator or driver may receive a valve drive signal D from the GLL controller, converts that to a desired current I, then converts that value to a required PWM setting. We need to calculate a corrected valve drive signal D' as follows:

$$D'=D+Kp*(Pi-Po)/dF(D)$$

where:
Kp is a valve drive attribute,
Pi is the inlet pressure,
Po is an assumed or measured outlet pressure, and
dF(D) is an arbitrary function of D, dFm/dD evaluated at D.

Accordingly, a displacement compensation can be implemented to compensate for valve displacement caused by the pressure gradient between the inlet and outlet pressure as seen by the valve.

The term dF(D) may be fixed for a given controller/valve combination and it may be possible to determine dF(D) for a particular type of valve and utilized for each mass flow controller having a valve of that type. As such, dF(D) may be valve dependent and may therefore need to be determined for different valve types. One method for determining dF(D) is described below.

A magnetic model of a valve can be used to determine dF(D) for a particular valve. Magnetic force on the valve plunger is a function of both valve drive and lift. Lift, at zero pressure drop, is a function of both magnetic force and spring constant, and is thus also a function of valve drive.

Given a valve geometry and spring constant, a finite-element magnetic model of a nominal valve can give us force vs. lift curves for various valve drive levels. Similarly, the spring constant gives us a spring-force vs. lift line for the spring.

The intersection of the force vs. lift curve (for a given drive level) and the spring-force vs. lift line gives us a nominal lift at that drive level. The intersections of several force vs. lift curves (at different drive levels) and the spring-force vs. lift line gives us nominal lift as a function of drive, L(D).

By definition, dF(D) is the derivative of magnetic force on the valve plunger with respect to valve drive D, given the fixed lift expected for valve drive D at zero pressure drop.

For each of several drive levels, we can calculate the nominal lift L(D). For each lift, the same finite-element magnetic model of the valve can give us a force vs. current curve. dF(D) is simply the derivative of the force vs. current curve calculated for L(D), evaluated at D.

Matched pairs of D and dF(D) can thus be tabulated for use by the controller. For example, dF(D) may be a piecewise approximation to the behavior of the valve driver, solenoid, and valve. One embodiment involves forming a piecewise-liner approximation specified by (D, dF) value pairs. The set of point pairs may be stored in the mass flow controller as the magnetic model of the valve. The point pairs may be indexed in order to calculate a displacement compensation signal as described in the foregoing.

$K_p$ is a valve attribute gain term that may be measured in production of a mass flow controller. One method of determining $K_p$ proceeds as follows:

1. Select 2 pairs of (inlet pressure, setpoint) meeting the following requirements:
   a. Both pairs require the same valve opening per the combined viscous/inviscid valve model.
   b. The pressure drop at high inlet pressure is at least 2 times (and preferably 4 or more times) the pressure drop at low inlet.
   c. The valve model is least accurate when both viscous and inviscid models are contributing equally to the result. For both pairs, the flow should be largely determined by the same model (either viscous or inviscid flow). When this is true, the valve model will give an intermediate pressure near the same extreme (either inlet or outlet) in both cases.
   d. Flow is highly sensitive to valve opening. For viscous flow, this occurs at the highest setpoint. For inviscid flow, this occurs at the lowest setpoint.
2. Set Kp=0 in the controller.
3. Cycle the inlet pressure and setpoint between the selected pairs of values at least 4 (preferably 10) times. Each time, record both the indicated inlet pressure Pi and valve drive D signals, after flow stabilization, under both high and low inlet pressure.
4. Average the recorded values to give:
   Pi1=average indicated inlet pressure under low inlet pressure
   Pi2=average indicated inlet pressure under high inlet pressure
   D1=average valve drive D under low inlet pressure
   D2=average valve drive D under high inlet pressure
5. Define:
   Po=average outlet pressure during test, converted to same units as Pi1 and Pi2
6. Calculate:

$$Pd1=Pi1-Po$$

$$Pd2=Pi2-Po$$

$$D0=D1-(D2-D1)*(Pi1-Po)/(Pi2-Pi1)$$

$$Kp=((D2-D1)/(P2-P1))/dF(D0)$$

As such, $K_p$ must be tuned for each unit during production.

Other improvements and variations may be made according to various aspects of the invention. For example, according to one aspect of the invention, feed-forward compensation may be performed on the system using pressure information. Because pressure transients (and even static pressure of different value) affect valve operation, a prediction of the effect of pressure on valve operation may be made and compensated for. For instance, effects of pressure on the valve may be determined, and a valve drive signal may be compensated for to reduce any induced valve motion due to pressure and pressure transients. In one embodiment, a change in valve drive signal can be predicted which is needed to maintain a plunger of the valve stationary.

In one embodiment, feed-forward compensation may be performed by creating a model of the valve to be used, choosing at least two sets of flow rates/pressure states that require the same valve opening, and measuring the valve drive signal to produce a calibration value that may be used to generate parameters for operating the system. In particular, a model of the valve may be created from force vs. displacement vs. drive current curves. Using a physics-based model of the valve itself, at least two flow rates are chosen and at least two corresponding pressure states that require the same valve opening for the modeled valve. The pressure and set point is cycled between these selected pairs of operating conditions, and the valve drive setting is recorded at each operating condition. This valve drive setting provides a calibration constant that can be used in conjunction with the valve model to generate appropriate operational parameters for the device. To obtain a satisfactory measurement, a good electronic pressure controller may be used to cycle the pressure appropriately. Further, there may be some time and effort needed to develop force vs. displacement vs. drive current curves for each valve configuration used.

In one embodiment, the calibration constant may be derived by measuring the valve pedestal (the current it takes to just barely begin opening the valve) at two different inlet pressures, and making the assumption (albeit false) that the actuator gain is a constant. The valve pedestal adjustment, combined with the proper valve model, is a significant improvement over other compensation methods.

According to another embodiment of the invention, a dead volume compensation tuning process may be performed that also uses the pressure information (e.g., the pressure signal). More particularly, the pressure signal may be used to adjust the gain in a GLL controller to provide a constant gain. It is realized that pressure transients affect the physical valve model, and therefore, the gain may be adjusted to compensate for these pressure effects.

In one embodiment, compensation may be performed using the following process:

1. Run a pressure step into the controller. In one example, the inlet pressure may be stepped from approximately 30 PSIG to approximately 32 PSIG. Other pressures would work as well, but it is realized that too large a step in pressure provides misleading results. The testing apparatus used to provide the inlet pressure may be modified to provide as close to a square-wave step of pressure as possible.

2. Record the output of both the pressure transducer and flow sensor during the step.

3. Run the recorded pressure transducer output through a model of the compensation filter (including the differentiator), and compare the output of the transducer with the recorded flow sensor output. Adjust filter parameters to minimize the difference between the two signals, re-running the model each time. When the difference is within a satisfactory level, the filter adjustment may be stopped, the test conditions recorded, and final filter parameters may be set in the device.

Although the above minimization method may be used, it should be appreciated that any number of minimization methods may be used, and the invention is not limited to any particular method. For example, one method may include using default filter parameters determined from typical units, adjusting filter parameters to match up the leading edge, freezing the parameters, adjusting other parameters to match the peak, freezing them, then adjusting the remaining parameters to match the falling edge. At each step, for example, various linear-least-squares fits may be used to adjust the parameters. Further, other minimization algorithms are equally usable.

Also, dead volume compensation may be configured for each process gas. In this embodiment, there is a gain adjustment that is part of the differentiator (e.g., differentiator 820 of FIG. 8). Differentiator gain is equal to a gain constant divided by the ambient temperature (e.g., in Kelvin), and the gain constant may be set (nominally) to the gain requested by the tuning software described above, multiplied by the ambient temperature (in Kelvin) when the tuning data was collected, divided by the conversion factor from the tuning gas to the process gas.

1. If the unit is to operate over a wide temperature range, performance may be improved at the ends of that range by selecting an overall gain proportional to 1/T, where T is the absolute temperature, because the total mass flow for an ideal gas due to a change in pressure is proportional to 1/T, and the sensors generally used are mass flow sensors.

2. The gas species affects the gain of the flow sensor. If the unit is to be used on a different gas than the unit was tuned with, the overall gain needs to be adjusted appropriately. If the gain is not adjusted accordingly, dead-volume compensation can actually make performance worse than it would have been without dead volume compensation.

3. The gas species also affects the response of the flow sensor. Performance of the algorithm may be improved if the filter parameters are adjusted as a function of gas species.

4. The gain of the flow sensor also varies with flow rate, with gain (typically) decreasing at high flow rates. Performance at high flow levels may be improved by making the overall gain a function of flow rate. Gain may be related as:

$$\text{gain}=g0+kG*\text{setpoint}$$

where kG is a small (relative to g0), and is typically negative value. Assuming that setpoint is a reasonable analog of flow rate, this relation above effectively reduces the gain as a function of flow rate. Alternatively, the actual indicated flow rate may be used instead.

Further, other improvements may be made, including making gain a more complex function of flow rate, or subtracting the false-flow signal after linearizing the sensor.

5. Response of the flow sensor also varies with flow rate. For current hardware the change is small, however, so minor improvements in performance may be made by making filter cascade parameters a function of either setpoint or flow rate.

Having described several embodiments of the invention in detail, various modifications and improvements will readily occur to those skilled in the art. Such modifications and improvements are intended to be within the scope of the invention. Accordingly, the foregoing description is by way of example only, and is not intended as limiting. The invention is limited only as defined by the following claims and the equivalents thereto.

The invention claimed is:

1. A method of controlling a valve, comprising acts of:
   receiving a set point corresponding to a desired flow rate of fluid through the valve;
   determining a valve drive signal to be provided to the valve that corresponds to the desired flow rate, the valve drive signal corresponding to a first displacement of the valve under a first set of pressure conditions;
   measuring at least one pressure in an environment of the valve that corresponds to a second set of pressure conditions that is different than the first set of pressure conditions; and
   modifying the valve drive signal to compensate for a difference in a displacement of the valve due to a difference between the first set of pressure conditions and the second set of pressure conditions.

2. The method of claim 1, wherein the act of measuring comprises an act of measuring an outlet pressure.

3. The method of claim 1, wherein the act of measuring comprises an act of measuring an inlet pressure.

4. The method of claim 3, further comprising an act of determining a pressure gradient based upon a difference between the inlet pressure and an outlet pressure.

5. The method of claim 4, wherein the act of modifying includes an act of modifying the valve drive signal based upon the pressure gradient and the set point.

6. The method of claim 5, further comprising acts of:
detecting a pressure transient in the environment of the valve; and
determining a predicted displacement of the valve based upon the detected pressure transient.

7. The method of claim 6, wherein the act of modifying the valve drive signal further includes an act of modifying the valve drive signal based upon the pressure gradient, the set point, and the predicted displacement.

8. The method of claim 7, wherein the act of determining the predicted displacement includes an act of determining the predicted displacement using a force model of the valve, and wherein the act of modifying the valve drive signal includes an act of providing a displacement compensation signal corresponding to the predicted displacement.

9. The method of claim 8, further comprising an act of combining the valve drive signal and the displacement compensation signal to modify the valve drive signal.

10. The method of claim 4, wherein the act of modifying the valve drive signal further includes an act of changing the valve drive signal based upon the pressure gradient.

11. The method of claim 4, further comprising an act of generating a signal corresponding, at least in part, to the pressure gradient.

12. The method of claim 1, further comprising acts of:
detecting, responsive to the act of measuring, a pressure transient in the environment of the valve; and
determining a predicted displacement of the valve based upon the detected pressure transient.

13. The method of claim 12, wherein the valve has a controlled portion that is disposed in a flow path of the fluid flowing through the valve, wherein the act of modifying the valve drive signal further includes an act of modifying the valve drive signal to move the controlled portion of the valve an amount having an opposite sign of and substantially equal in magnitude to the predicted displacement, and wherein the predicted displacement is a predicted displacement of the controlled portion of the valve.

14. The method of claim 12, wherein the act of modifying the valve drive signal further includes an act of providing a valve drive signal sufficient to substantially counter-act the predicted displacement.

15. The method of claim 14, further comprising an act of moving the valve to substantially counter-act the predicted displacement.

16. The method of claim 14, further comprising an act of preventing the predicted displacement from occurring.

17. The method of claim 12, wherein the act of determining the predicted displacement includes an act of determining the predicted displacement using a force model of the valve.

18. The method of claim 17, wherein the act of modifying further comprises an act of providing a displacement compensation signal corresponding to the predicted displacement.

19. The method of claim 18, further comprising an act of combining the valve drive signal and the displacement compensation signal to modify the valve drive signal.

20. The method of claim 19, wherein the act of combining includes an act of adding the displacement compensation signal to the valve drive signal to modify the valve drive signal.

21. A system for flow control, comprising:
a controller to generate a first valve drive signal to move a controlled portion of a valve to a position generally corresponding to a desired flow rate;
a compensation module to generate a compensation signal to adjust the position of the controlled portion of the valve based upon at least one pressure signal;
a circuit to generate a second valve drive signal by combining the first valve drive signal and the compensation signal; and
a valve actuator adapted to move the controlled portion of the valve in response to the second valve drive signal.

22. The system of claim 21, wherein the circuit generates the second valve drive signal by adding the compensation signal to the first valve drive signal.

23. The system of claim 22, wherein the compensation module generates the compensation signal based upon a pressure gradient that is based upon a difference between an inlet pressure measured at an inlet of the valve and an outlet pressure at an outlet of the valve.

24. The system of claim 23, wherein the system is a mass flow control system having an inlet and an outlet, and wherein the inlet pressure is a pressure at the inlet of the mass flow control system and the outlet pressure is a pressure at the outlet of the mass flow control system.

25. The system of claim 23, wherein the at least one pressure signal includes at least one pressure signal indicative of a pressure transient.

26. The system of claim 25, wherein the compensation signal generated by the compensation module is further based upon a predicted displacement of the controlled portion of the valve caused by the pressure transient.

27. The system of claim 26, wherein the valve actuator moves the controlled portion of the valve an amount that counteracts the predicted displacement of the controlled portion of the valve.

28. The system of claim 26, wherein the valve actuator maintains the controlled portion of the valve substantially stationary.

29. The system of claim 22, wherein the at least one pressure signal includes at least one pressure signal indicative of a pressure transient, and wherein the compensation module generates the compensation signal based upon a predicted displacement of the controlled portion of the valve caused by the pressure transient.

30. The system of claim 29, wherein the predicted displacement is based, at least in part, on a force model of the valve.

31. A system for flow control comprising:
a flow path comprising a fluid inlet and a fluid outlet;
a flow sensor to measure a flow rate of a fluid flowing in the flow path;
a controller to receive a set point corresponding to a desired flow rate and generate a first valve drive signal to move a controlled portion of a valve to a position generally corresponding to the desired flow rate;
at least one pressure sensor to measure at least one pressure in the flow path;
means for generating a compensation signal to adjust the position of the controlled portion of the valve based upon the at least one pressure;
a circuit to generate a second valve drive signal by combining the first valve drive signal and the compensation signal; and
a valve actuator to move the controlled portion of the valve in response to the second valve drive signal.

32. The system of claim 31, wherein the means for generating the compensation signal includes means for generating a compensation signal that adjusts the position of the controlled portion of the valve based upon a pressure gradient between an inlet pressure of the flow path and an outlet pressure of the flow path.

33. The system of claim 31, wherein the means for generating the compensation signal includes means for generating a compensation signal that adjusts the position of the controlled portion of the valve based upon a pressure gradient between an inlet pressure of the flow path and an outlet pressure of the flow path and that compensates for a predicted displacement of the controlled portion of the valve caused by a pressure transient.

34. The system of claim 31, wherein the circuit is an electronic circuit.

35. The system of claim 31, wherein the means for generating the compensation signal includes means for generating a compensation signal that compensates for a predicted displacement of the controlled portion of the valve caused by a pressure transient.

36. The system of claim 35, wherein the means for compensating incorporates at least one force provided by a force model of the valve.

* * * * *